(12) United States Patent
Lindberg et al.

(10) Patent No.: US 11,841,172 B2
(45) Date of Patent: Dec. 12, 2023

(54) GEOTHERMAL POWER FROM SUPERHOT GEOTHERMAL FLUID AND MAGMA RESERVOIRS

(71) Applicant: EnhancedGEO Holdings, LLC, St. Petersburg, FL (US)

(72) Inventors: Greg Lindberg, Thonotosassa, FL (US); Kimberly C. Conner, Wetumpka, AL (US)

(73) Assignee: EnhancedGEO Holdings, LLC, St. Petersburg, FL (US)

( * ) Notice: Subject to any disclaimer, the term of this patent is extended or adjusted under 35 U.S.C. 154(b) by 0 days.

(21) Appl. No.: 18/099,514

(22) Filed: Jan. 20, 2023

(65) Prior Publication Data

US 2023/0272946 A1   Aug. 31, 2023

Related U.S. Application Data

(60) Provisional application No. 63/315,063, filed on Feb. 28, 2022.

(51) Int. Cl.
*F24T 10/13* (2018.01)
*E21B 36/00* (2006.01)
(Continued)

(52) U.S. Cl.
CPC ............ *F24T 10/13* (2018.05); *E21B 36/003* (2013.01); *E21B 41/0085* (2013.01);
(Continued)

(58) Field of Classification Search
CPC . F24T 10/10; F24T 10/13; F24T 10/15; F24T 10/17; F24T 2010/53; E21B 36/003; E21B 41/0085
(Continued)

(56) References Cited

U.S. PATENT DOCUMENTS 3,498,381 A   3/1970   Earlougher, Jr.
3,613,806 A   10/1971   Malott
(Continued)

FOREIGN PATENT DOCUMENTS

AU   2018308861 A1   1/2020
AU   2017268378 B2   9/2021
(Continued)

OTHER PUBLICATIONS

Boehm, R.F. et al, Modelling of a Magma Energy Geothermal Power Plant, presented at ASME Winter Annual Meeting, Boston MA, Dec. 1987, SAND-87-0564C, DE88 003793, 11 pages.
(Continued)

*Primary Examiner* — Tho V Duong
(74) *Attorney, Agent, or Firm* — Stephen Y. Liu; James H. Ortega; Carstens, Allen & Gourley, LLP

(57) ABSTRACT

System, method, and apparatus for harnessing geothermal power from superhot geothermal fluid (SHGF) and magma reservoirs. An exemplary embodiment is directed to a cased wellbore includes a well casing suspended within a borehole that extends between a surface and an underground reservoir of magma and a boiler casing housed within the well casing and extending between the surface and the underground reservoir of magma. The boiler casing has a first end submerged within the underground reservoir of magma and a terminal end opposite to the first end. The cased wellbore also includes a fluid conduit housed within the boiler casing and configured to deliver a liquid-phase fluid to the terminal end of the boiler casing. A temperature and a pressure at the terminal end of the boiler casing converts the liquid-phase fluid into a gas-phase fluid that travels through the boiler casing towards the surface. The cased wellbore also includes a well head connected to the first end of the boiler casing.

11 Claims, 44 Drawing Sheets

(51) Int. Cl.
  *E21B 41/00* (2006.01)
  *F24T 10/20* (2018.01)
  *E21B 43/08* (2006.01)
  *E21B 43/10* (2006.01)
  *F24T 10/00* (2018.01)

(52) U.S. Cl.
  CPC ............ *E21B 43/08* (2013.01); *E21B 43/101* (2013.01); *F24T 10/20* (2018.05); *F24T 2010/53* (2018.05)

(58) Field of Classification Search
  USPC .......................................................... 165/45
  See application file for complete search history.

(56) References Cited

U.S. PATENT DOCUMENTS

| | | | |
|---|---|---|---|
| 3,757,516 A | 9/1973 | Mc | |
| 3,765,477 A | 10/1973 | Van | |
| 3,864,208 A | 2/1975 | Van | |
| 3,950,949 A | 4/1976 | Martin et al. | |
| 3,957,108 A | 5/1976 | Huisen | |
| 3,967,675 A | 7/1976 | Georgii | |
| 4,043,129 A | 8/1977 | McCabe et al. | |
| 4,047,093 A * | 9/1977 | Levoy .................... | F24T 10/20 |
| | | | 976/DIG. 417 |
| 4,054,176 A | 10/1977 | Huisen | |
| 4,057,108 A | 11/1977 | Broussard | |
| 4,116,285 A | 9/1978 | Guerber | |
| 4,140,184 A | 2/1979 | Bechtold et al. | |
| 4,492,083 A * | 1/1985 | McCabe ................ | F24T 10/20 |
| | | | 166/371 |
| 4,642,987 A * | 2/1987 | Csorba .................... | F24T 10/20 |
| | | | 165/45 |
| 4,665,705 A | 5/1987 | Bonham, Jr. | |
| 4,776,169 A | 10/1988 | Coles, Jr. | |
| 4,929,348 A | 5/1990 | Rice | |
| 5,513,573 A | 5/1996 | Sutton | |
| 5,860,279 A | 1/1999 | Bronicki et al. | |
| 5,911,684 A | 6/1999 | Shnell | |
| 6,708,494 B1 | 3/2004 | Hamann | |
| 7,124,584 B1 | 10/2006 | Wetzel et al. | |
| 8,047,285 B1 | 11/2011 | Smith | |
| 8,201,409 B1 | 6/2012 | Zakiewicz | |
| 8,524,787 B2 | 9/2013 | Ermolaev et al. | |
| 9,006,298 B2 | 4/2015 | Leviness et al. | |
| 9,108,858 B2 | 8/2015 | McDonald et al. | |
| 9,150,423 B2 | 10/2015 | Hosono et al. | |
| 9,182,149 B2 | 11/2015 | Gilaberte et al. | |
| 9,298,756 B1 | 3/2016 | Johnson | |
| 9,359,271 B2 | 6/2016 | Leviness et al. | |
| 9,388,797 B2 | 7/2016 | Bronicki | |
| 9,574,551 B2 | 2/2017 | Parrella et al. | |
| 9,738,835 B2 | 8/2017 | Schrauwen | |
| 9,765,605 B2 | 9/2017 | Williamson et al. | |
| 10,017,395 B2 | 7/2018 | Kageyama et al. | |
| 10,058,848 B2 | 8/2018 | Lipiec et al. | |
| 10,131,545 B2 | 11/2018 | Sekine et al. | |
| 10,173,202 B2 | 1/2019 | Hosono et al. | |
| 10,203,162 B2 * | 2/2019 | Yokomine ............... | F28D 7/106 |
| 10,322,940 B2 | 6/2019 | Hosono et al. | |
| 10,344,233 B2 | 7/2019 | Lucas et al. | |
| 10,358,604 B2 | 7/2019 | Harris et al. | |
| 10,710,049 B2 | 7/2020 | Mikhajlov et al. | |
| 10,745,625 B2 | 8/2020 | Dogterom et al. | |
| 10,759,668 B2 | 9/2020 | Hosono et al. | |
| 10,792,645 B2 | 10/2020 | Hosono et al. | |
| 10,974,969 B2 | 4/2021 | Hu et al. | |
| 11,131,484 B2 | 9/2021 | McBay | |
| 11,235,310 B2 | 2/2022 | Hosono et al. | |
| 11,286,169 B2 | 3/2022 | Beach et al. | |
| 11,325,105 B2 | 5/2022 | Beach et al. | |
| 2004/0265158 A1 | 12/2004 | Boyapati et al. | |
| 2006/0026961 A1 | 2/2006 | Bronicki | |
| 2006/0180537 A1 | 8/2006 | Loftis et al. | |
| 2008/0213157 A1 | 9/2008 | McGrady et al. | |
| 2009/0226308 A1 | 9/2009 | Vandor | |
| 2010/0045042 A1 | 2/2010 | Hinders et al. | |
| 2012/0144829 A1 * | 6/2012 | Wiggs ..................... | F24T 10/30 |
| | | | 60/641.2 |
| 2013/0234444 A1 | 9/2013 | Rogers et al. | |
| 2013/0333383 A1 | 12/2013 | Schwarck | |
| 2014/0262137 A1 | 9/2014 | McBay | |
| 2015/0128931 A1 | 5/2015 | Joshi et al. | |
| 2015/0300327 A1 | 10/2015 | Sweatman et al. | |
| 2015/0368565 A1 | 12/2015 | Schrauwen | |
| 2015/0377211 A1 | 12/2015 | Occhiello | |
| 2016/0097376 A1 | 4/2016 | Wasyluk et al. | |
| 2016/0115945 A1 | 4/2016 | Barsi et al. | |
| 2016/0363350 A1 | 12/2016 | Tahara | |
| 2017/0253492 A1 | 9/2017 | Beach et al. | |
| 2018/0106138 A1 | 4/2018 | Randolph | |
| 2018/0224164 A1 | 8/2018 | Lakic | |
| 2020/0040267 A1 | 2/2020 | Willigenburg et al. | |
| 2020/0072199 A1 * | 3/2020 | Fontana ................. | F24T 10/17 |
| 2020/0231455 A1 | 7/2020 | Beach et al. | |
| 2020/0325030 A1 | 10/2020 | Cussler et al. | |
| 2020/0353518 A1 | 11/2020 | Chandran et al. | |
| 2021/0114005 A1 | 4/2021 | Tao et al. | |
| 2021/0122656 A1 | 4/2021 | Willberg et al. | |
| 2023/0130169 A1 | 4/2023 | McIntyre | |

FOREIGN PATENT DOCUMENTS

| | | |
|---|---|---|
| AU | 2016398360 B2 | 1/2022 |
| CN | 108952650 A | 12/2018 |
| CN | 113494273 A | 10/2021 |
| EP | 0236640 A1 | 9/1987 |
| EP | 0326736 A2 | 8/1989 |
| EP | 2792010 B1 | 1/2018 |
| EP | 3583321 A1 | 12/2019 |
| GB | 2592695 A | 9/2021 |
| JP | 107286760 A | 10/1995 |
| JP | 2011052621 A | 3/2011 |
| JP | 2014202149 A | 10/2014 |
| JP | 2020067027 A | 4/2020 |
| WO | 2009116873 A1 | 9/2009 |
| WO | 2012079078 A2 | 6/2012 |
| WO | 2012037571 A3 | 7/2012 |
| WO | 2013025640 A2 | 2/2013 |
| WO | 2016204287 A1 | 12/2016 |
| WO | 2020150245 A1 | 7/2020 |
| WO | 2020160500 A1 | 8/2020 |
| WO | 2021257944 A9 | 4/2022 |
| WO | 2022211643 A1 | 10/2022 |

OTHER PUBLICATIONS

Colp, John L., Final Report—Magma Energy Research Project, Sandia Report, Sand82-2377, Unlimited Release, JC-66, prepared by Sandia National Laboratories under contrace DE-AC04-76DP00789, Printed Oct. 1982, 42 pages.

* cited by examiner

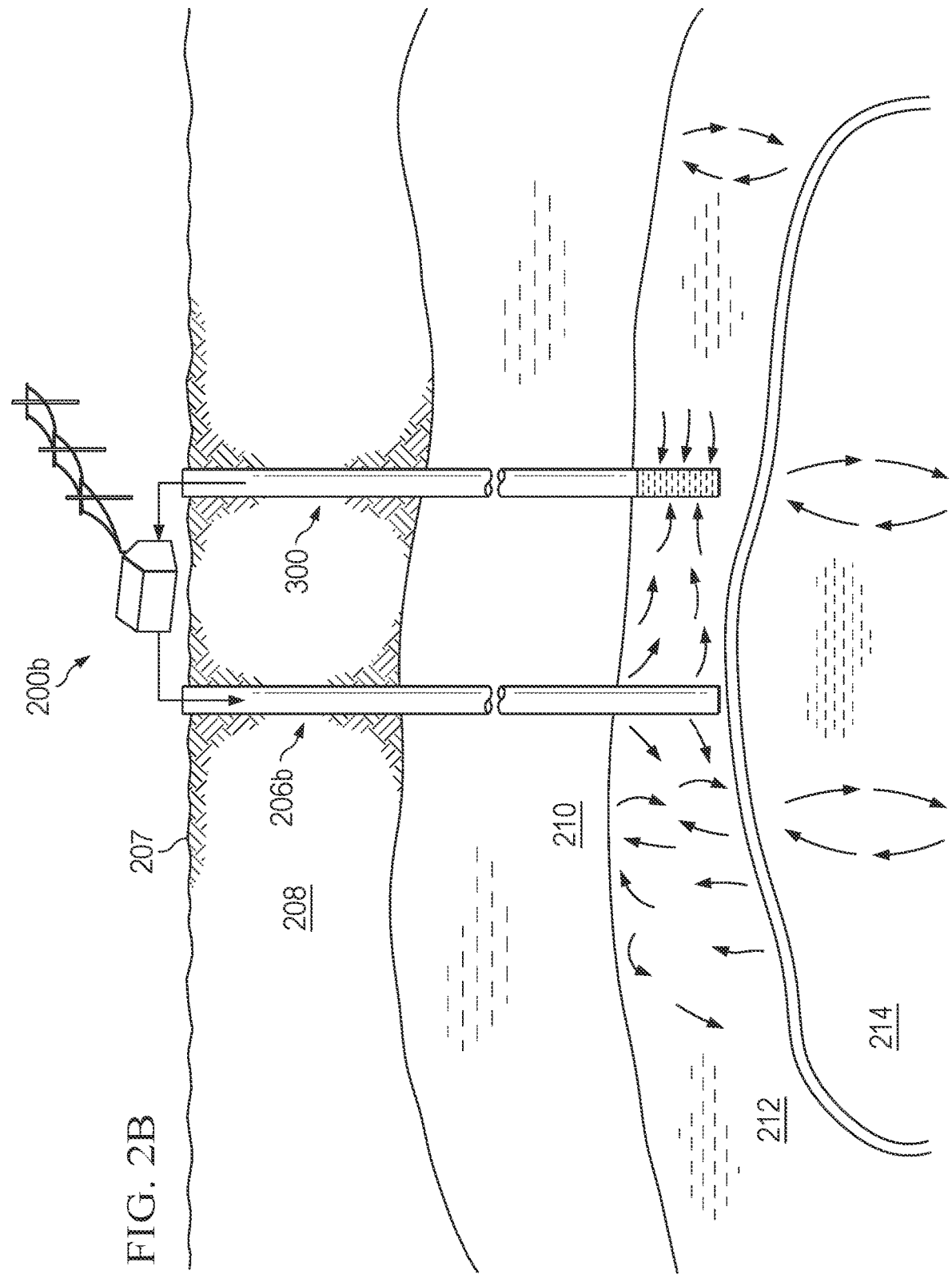

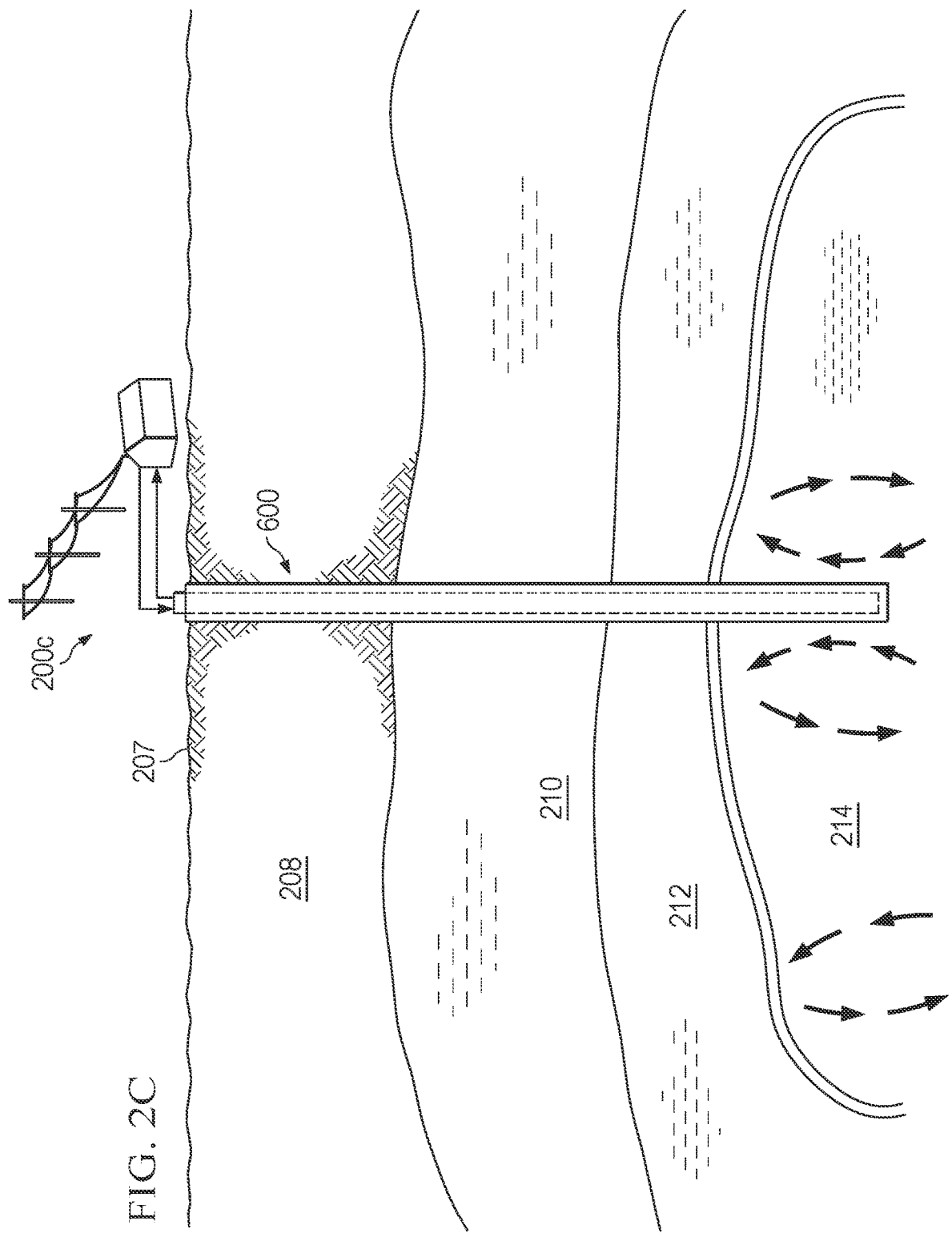

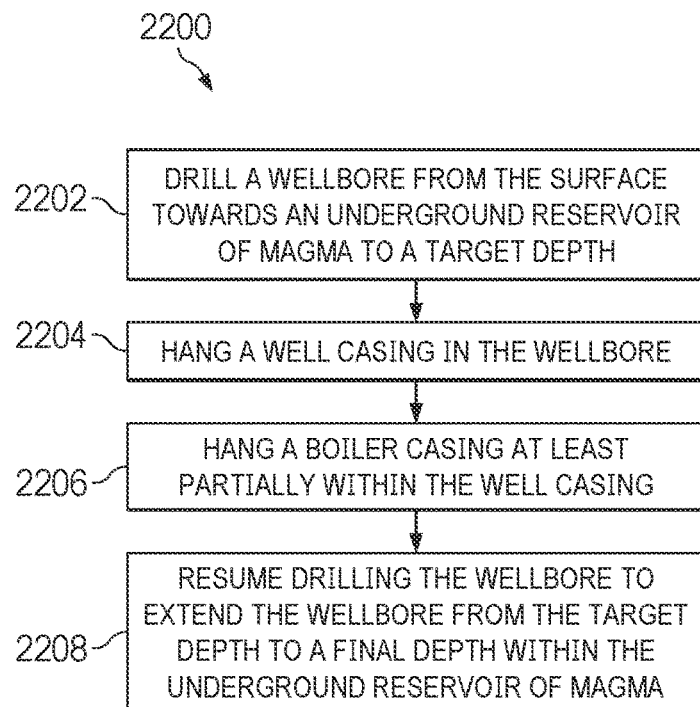
FIG. 22
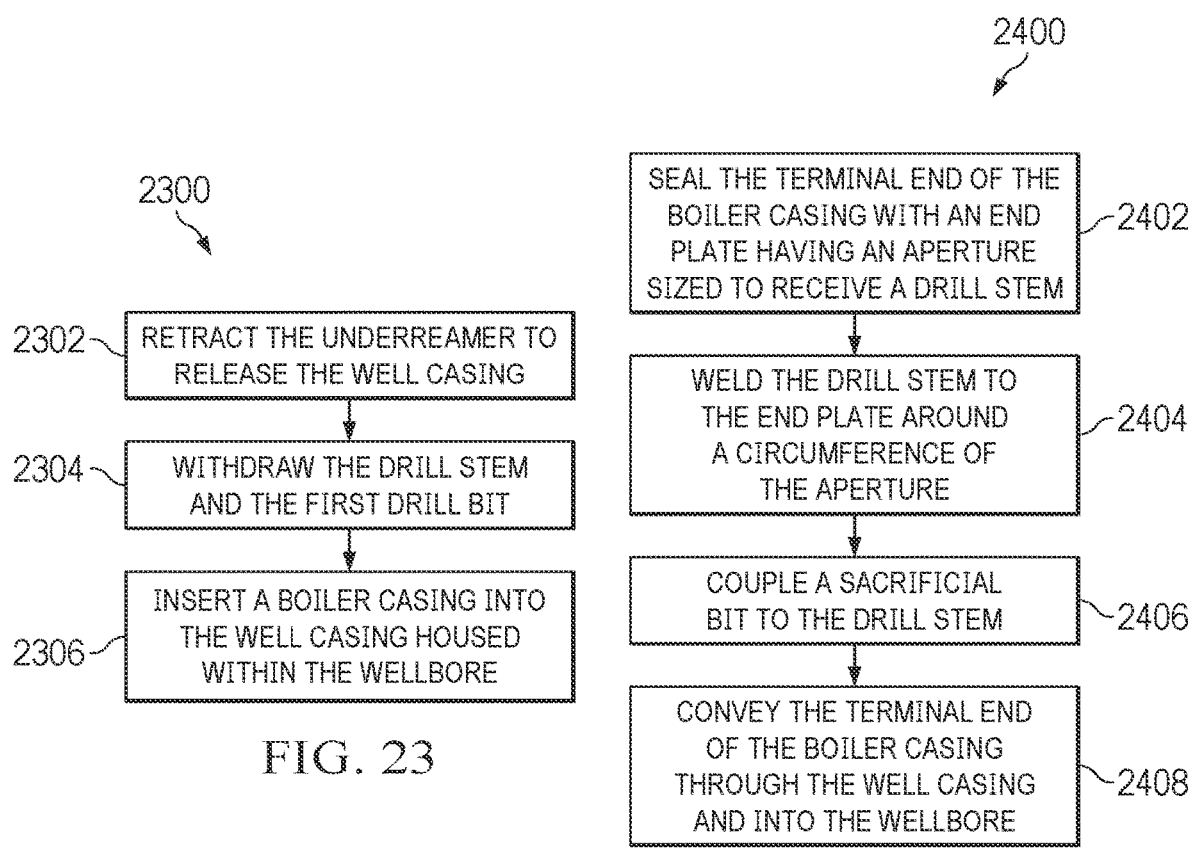
FIG. 23
FIG. 24

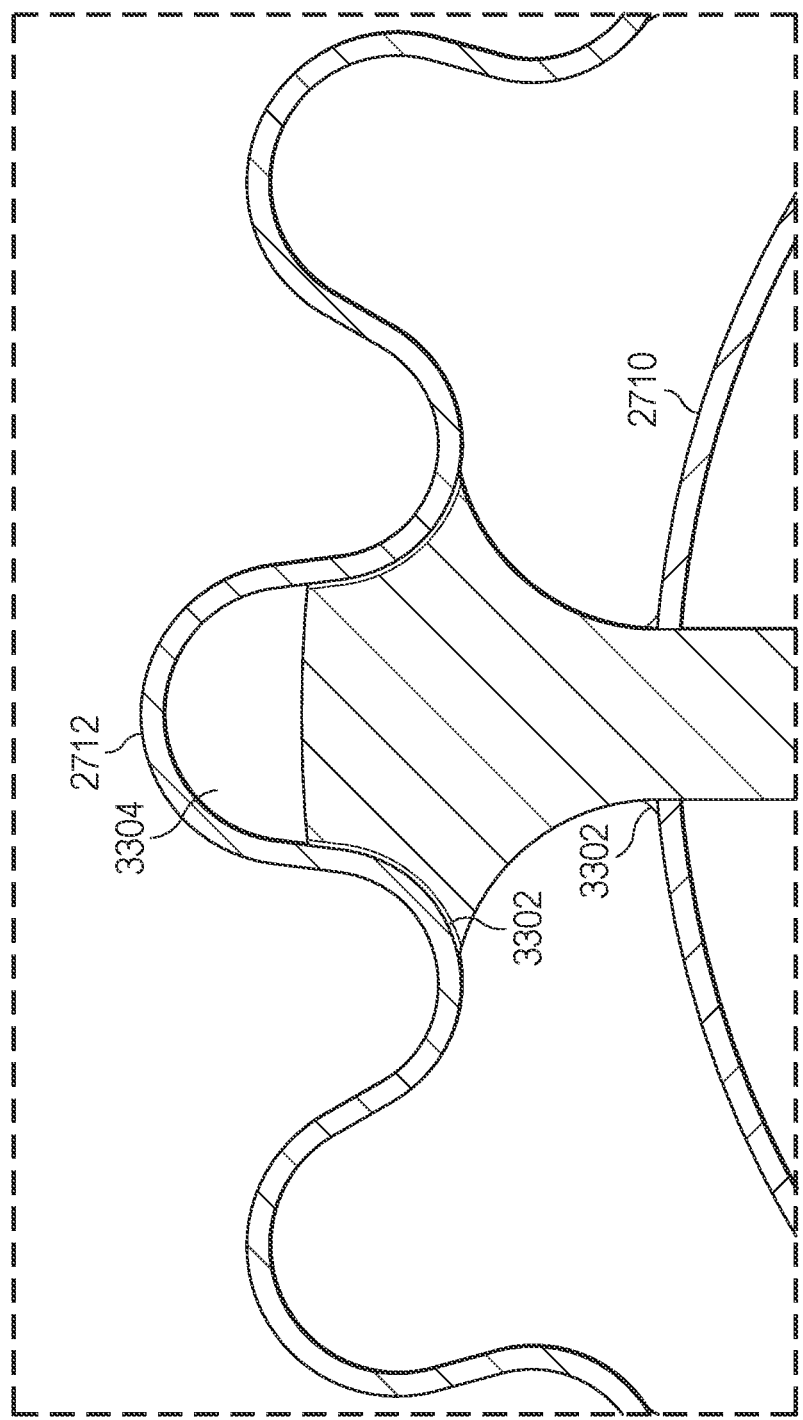

GEOTHERMAL POWER FROM SUPERHOT GEOTHERMAL FLUID AND MAGMA RESERVOIRS

CROSS-REFERENCE TO RELATED APPLICATIONS

This application claims priority to U.S. Provisional Application No. 63/315,063, filed on Feb. 28, 2022, which is hereby incorporated herein by reference in its entirety.

BACKGROUND

Technical Field

Aspects of the present disclosure relate to geothermal power systems and related methods, and more particularly to systems and methods for generating geothermal power from underground resources, such as reservoirs of magma.

Background

Solar power and wind power are the most commonly available sources of renewable energy, but both are notoriously unreliable and have relatively poor power densities. In contrast, geothermal energy has high power density and is capable of operating despite weather conditions or time of day. However, the lack of necessary technological advances renders geothermal energy an impractical substitute.

SUMMARY

One or more aspects of the present disclosure are directed to a pumping apparatus for SHGF systems. The pumping apparatus includes a well screen coupled to an end of a casing string. The well screen, which is at least partially submerged within the underground reservoir, defines a volume in the underground reservoir configured to be at least partially filled by SHGF through a set of apertures in the well screen. The pumping apparatus also includes a slidable casing with a first end and a second end. The slidable casing defines an opening at the first end that leads into a cavity bounded by a sidewall and an end wall at the second end. Additionally, the slidable casing is suspended within the borehole and aligned coaxially with the well screen. The pumping apparatus also includes a draw pipe extending through the end wall of the slidable casing and into the volume defined by the well screen. The draw pipe is configured to convey the SHGF from the underground reservoir towards the surface in response to the slidable casing being slidably repositioned to obstruct more of the set of apertures in the well screen, and an increase in pressure within the cavity of the slidable casing.

One or more aspects of the present disclosure are also directed to a method for operating the pumping apparatus for SHGF systems. The method includes a first step of repositioning a slidable casing within the borehole from an initial position between the surface and the underground reservoir to a final position at least partially within the underground reservoir. The slidable casing has an opening at a first end that leads into a cavity bounded by a sidewall and an end wall at a second end. The slidable casing is aligned coaxially with a well screen at an end of a casing string and at least partially submerged within the underground reservoir and the well casing includes a set of apertures permitting SHGF to flow into a volume defined by the well screen. At the final position, the cavity of the slidable casing substantially coincides with the volume defined by the well screen to prevent flow of SHGF through the set of apertures, and the cavity is filled with the SHGF from the volume defined by the well screen. The method includes additional steps of securing the slidable casing at the final position within the borehole, increasing a pressure within the cavity of the slidable casing to cause the SHGF in the cavity to flow into a draw pipe extending through the end wall of the slidable casing and into the cavity, and conveying the SHGF to the surface through the draw pipe.

One or more aspects of the present disclosure are also directed to a system for generating power from an underground reservoir of magma. The system includes a steam separator connected directly to a cased wellbore extending between a surface and the underground reservoir of magma. The steam separator separates a gas-phase fluid from condensate formed from the gas-phase fluid. The system also includes a first set of turbines connected to the steam separator and a condensate tank fluidically connected to the steam separator and the first set of turbines. The first set of turbines is configured to generate electricity from the gas-phase fluid received from the steam separator and the condensate tank is fluidically connected to a fluid conduit that supplies condensate to a terminal end of the cased wellbore.

Aspects of the present disclosure are also directed to a method for generating power from the underground reservoir of magma. The method includes a first step of supplying a liquid-phase fluid to a cased wellbore extending from a surface to an underground reservoir of magma. Heat supplied from the magma causes the liquid-phase fluid to change into a gas-phase fluid conveyed up the cased wellbore and to the surface. The method also includes the steps of separating the gas-phase fluid from condensate formed from the gas-phase fluid, operating a set of turbines with the gas-phase fluid to generate electricity, accumulating at least some of the condensate formed from the gas-phase fluid, and supplying the accumulated condensate as the liquid-phase fluid to the cased wellbore Aspects of the present disclosure are also directed to a cased wellbore for use in generating power from an underground reservoir of magma. The cased wellbore includes a well casing suspended within a borehole that extends between a surface and an underground reservoir of magma and a boiler casing housed within the well casing and extending between the surface and the underground reservoir of magma. The boiler casing has a first end submerged within the underground reservoir of magma and a terminal end opposite to the first end. The cased wellbore also includes a fluid conduit housed within the boiler casing and configured to deliver a liquid-phase fluid to the terminal end of the boiler casing. A temperature and a pressure at the terminal end of the boiler casing converts the liquid-phase fluid into a gas-phase fluid that travels through the boiler casing towards the surface. The cased wellbore also includes a well head connected to the first end of the boiler casing.

Aspects of the present disclosure are also directed to a method of forming the cased wellbore for use in generating power from an underground reservoir of magma. The method includes the steps of drilling a wellbore from the surface towards the underground reservoir of magma, hanging a well casing in the wellbore, hanging a boiler casing within the well casing in response to the wellbore reaching a target depth, and resume drilling of the wellbore from the target depth to a final depth within the underground reservoir of magma. The boiler casing extends from the surface to the final depth within the underground reservoir to form the cased wellbore.

One or more aspects of the present disclosure are also directed to a cased wellbore for use in generating superheated steam. The cased wellbore includes a first end at a surface, a second end at an underground reservoir of magma, and a fluid pathway extending from an inlet at the first end to the second end and then from the second end to an outlet at the first end. The fluid pathway is configured to receive saturated steam at the inlet and expel superheated steam from the outlet, and the saturated steam is transformed into superheated steam in the fluid pathway at the second end of the cased wellbore.

One or more aspects of the present disclosure are also directed to a system for power generation using superheated steam. The system includes a cased wellbore extending between a surface and an underground reservoir of magma. The cased wellbore includes a first end at a surface, a second end at an underground reservoir of magma, and a fluid pathway extending from an inlet at the first end to the second end and then from the second end to an outlet at the first end. The fluid pathway is configured to receive saturated steam at the inlet and expel superheated steam from the outlet. The saturated steam is transformed into superheated steam in the fluid pathway at the second end of the cased wellbore. The system also includes a set of turbines configured to generate electricity from the superheated steam provided from the cased wellbore.

One or more aspects of the present disclosure are also directed to a method for power generation using superheated steam. The method includes steps of receiving saturated steam from a steam source and conveying the saturated steam into a cased wellbore that extends from a surface to an underground reservoir of magma to expose the saturated steam to heat from the underground reservoir of magma. The heat from the underground reservoir of magma converts the saturated steam to the superheated steam. The method also includes the steps of conveying the superheated steam back towards the surface.

Other aspects, embodiments and features of the disclosure will become apparent from the following detailed description of the disclosure when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the disclosure shown where illustration is not necessary to allow those of ordinary skill in the art to understand the disclosure.

BRIEF DESCRIPTION OF THE FIGURES

The features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying figures, wherein:

FIG. 2B illustrates a theoretical super-hot geothermal system (SHGS);

FIG. 2C illustrates a magma-based geothermal power generation system ("magma system") according to an illustrative embodiment;

FIG. 22 is a flowchart of a method for forming a cased wellbore according to an illustrative embodiment;

FIG. 23 is a flowchart of a method for hanging a boiler casing according to an illustrative embodiment;

FIG. 24 is a flowchart of a method for inserting a boiler casing into a well casing housed within a wellbore according to an illustrative embodiment;

FIGS. 33A and 33B present a more detailed view of a casing plate in accordance with an illustrative embodiment;

DETAILED DESCRIPTION

Geothermal power is generated by complicated systems that can require significant expenditure of finances, manpower, and equipment. Further, most conventional geothermal systems tap into low temperature resources of less than 194° F., such as low temperature geothermal water, which yields low power output. The inability to efficiently and reliably access high-temperature geothermal resources renders conventional geothermal systems financially impractical.

One or more aspects of the present disclosure are based on the following unexpected observations:
magma can be relative shallow at a depth of about 2.1-2.5 km;
the top layer of magma has few crystals with no mush zone;
rock is not ductile and can support fractures;
no decline in thermal output over a two-year period;
eruptions at drill sites are unlikely (e.g., eruptions have not happened at the African and Icelandic drill sites in over 10,000 years and it is believed the Kilauea, Hawaii drill site has never erupted); and
drilling into magma is reasonably safe, and that rising magma can be quenched with water to form a rock plug.

Some aspects of this disclosure recognize the need for a geothermal power system that takes advantage of a geothermal resource with a sufficiently high temperature that can provide high-temperature, high-pressure steam, which avoids problems associated with conventional wells that have to contend with low permeability. Geothermal water is contained in the rock and permeability is critical for sufficient flow of geothermal water to meet demand.

Figure 1:
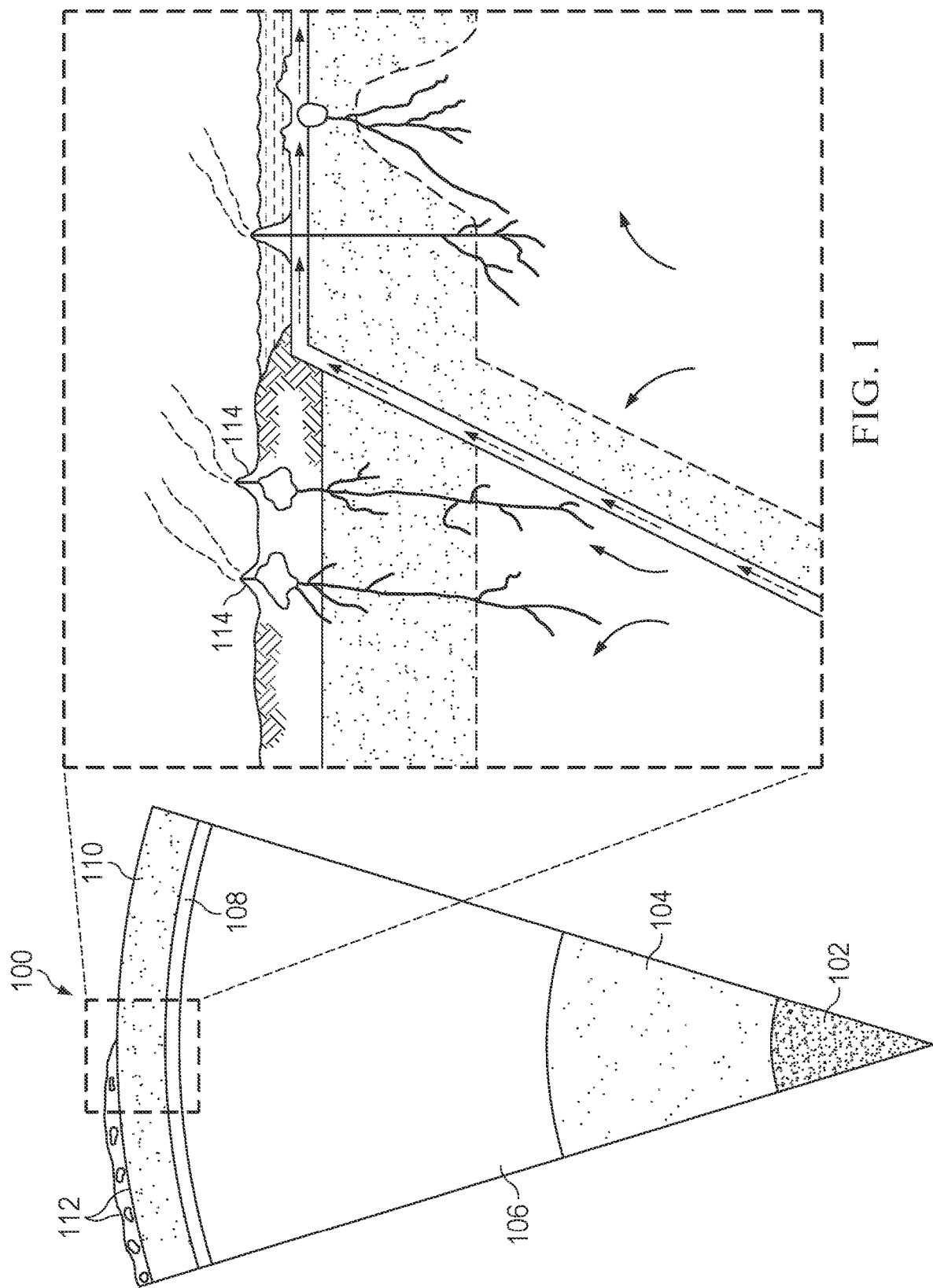
FIG. 1 is a partial cross-sectional diagram of the Earth depicting underground formations that can be tapped for generating geothermal power according to an illustrative embodiment.

FIG. 1 is a partial cross-sectional diagram of the Earth depicting underground formations that can be tapped for generating geothermal power according to an illustrative embodiment. Geothermal energy originates from deep within the Earth. The Earth's composition is made up of an inner core 102, outer core 104, lower mantle 106, transition zone 108, upper mantle 110, and crust 112. There are places on the Earth where magma reaches the surface of the crust 112 forming volcanos 114. Most of the time magma approaches within a few miles or less from the surface and heats ground water sufficient for geothermal power production.

Pure water has a total dissolved solids (TDS) concentration of 0 ppm. Laboratory and pharmaceutical grade water will be less than 10 ppm TDS. Public drinking water in the United States is typically less than 100 ppm and seawater is between 22,000-29,000 ppm. A relatively clean geothermal resource will measure 6,000-7,000 ppm TDS, but most are far higher. For comparison, California's Salton Sea geothermal water is over 240,000 ppm TDS. The high TDS content can be attributed to the high heat and pressure that chemically dissociates the rock into the water. This results in geothermal fluid with high TDS that is polybaric and amphoteric having both acidic and basic qualities, which can quickly cause failure of the geothermal equipment, such as the well screen, motor, and pump, by either corrosion or scale clogging due to calcium carbonate and the like.

Geothermal water is also full of dissolved gasses such as carbon dioxide and sulfur dioxide, which are both greenhouse gasses that can cause acid rain. These dissolved gasses must be removed from the steam before reaching the turbine as they will reduce pressure. Incomplete removal of gasses can cause corrosion of turbine blades, which must then be specially treated to resist corrosion. In fact, the high concentration of TDS and gasses in geothermal water and its relatively low heat of 300-450° F. result in 70% of all that is pumped to the surface is never used for steam going to the turbine, but instead is rejected and pumped back down an injection well. This combined with the many parasitic loads due to sourcing many wells due to the low temperature and having to separate solids, fluids and gasses creates low efficiencies of 5-12%. Some plants have ceased operation due to excessive parasitic loads combined with reduced heat output.

Figure 2A:
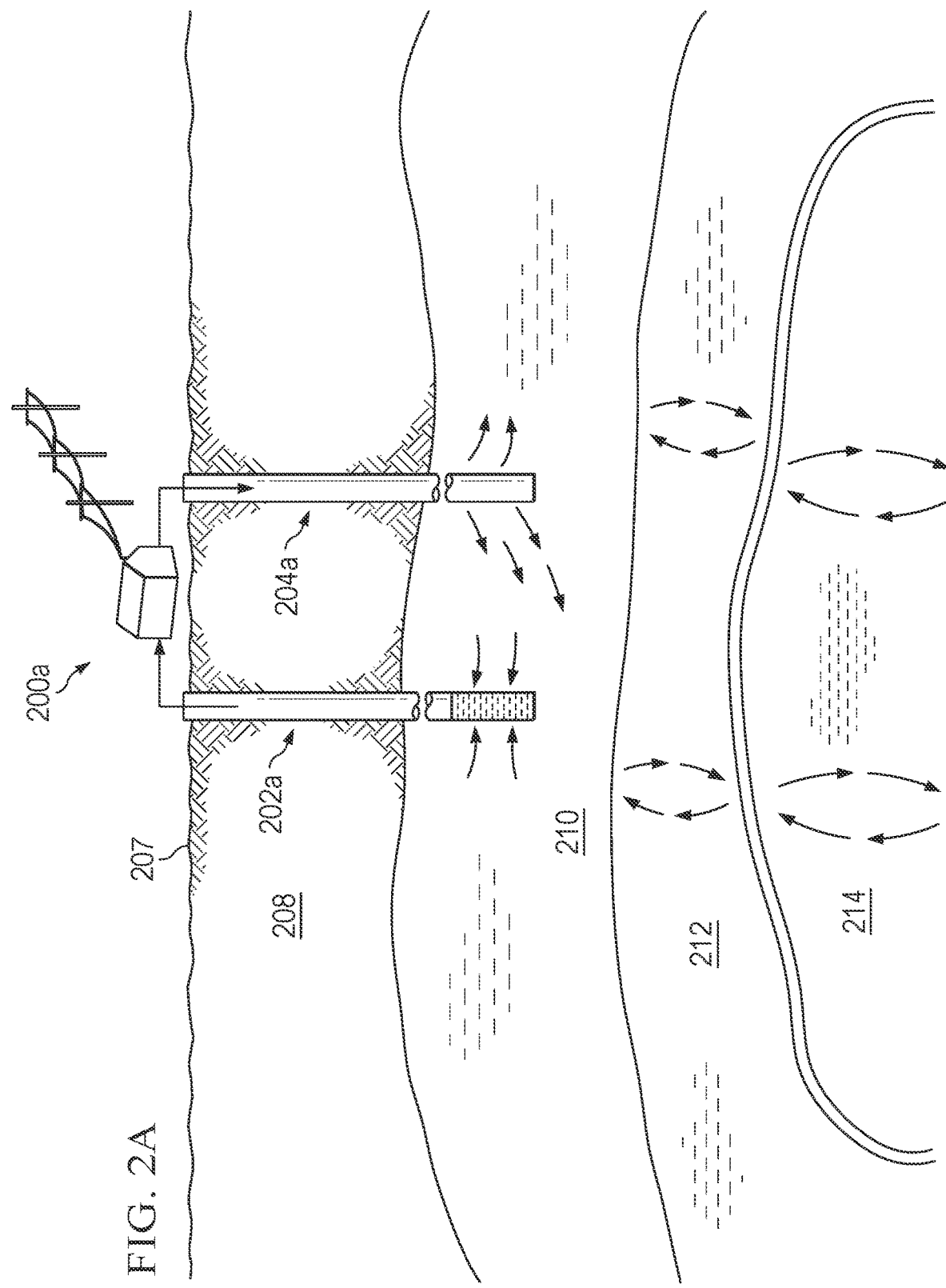
FIG. 2A illustrates a conventional geothermal power generation system.

FIG. 2A illustrates a geothermal power generation system. The geothermal system 200a is a "flash-plant" that generates power from a high-temperature, high-pressure geothermal water extracted from a production well 202a. The production well 202a is drilled through rock layer 208 and into the superhot geothermal fluid (SHGF) layer 210 that serves as the source of the high-temperature, high-pressure geothermal water. The geothermal water is heated by convective current currents in the dry rock layer 212, which is in turn heated by magmatic convective currents in the magma reservoir 214. In FIG. 2A, convective currents are represented by arrows indicating that hotter fluids rise to the upper portions of their respective layers before cooling and sinking, then rising again ad infinitum.

As the geothermal water approaches the surface 207, the reduced temperature and pressure causes most of the geothermal water to flash to steam. Water changes phase from liquid to gas at 212° F. at 14.7 psi (1 atm). But at 250 psia this phase change does not happen without a corresponding temperature of 400.97° F. Because the geothermal water is a polyphase fluid, i.e., not pure water, the geothermal water flashes at various points along its path up to the surface, creating water hammer and tremendous noise. A rock muffler is typically used as a silencer and chemicals are added to control for scale and corrosion. This complex mixture arrives at a phase separator where some precipitation likely occurs due to pressure change, and the liquid and solids are sent to injection wells 204*a* while the steam is sent through a steam separator to separate steam from condensate. The steam is received by a turbine, which can produce electrical power with its kinetic energy creating rotational motion of the rotor within the stator, the steam is condensed into the liquid state for reinjection into the injection well 204*a*. This is a significant difference over fossil fuel and nuclear fueled steam driven plants that reuse most of their steam through superheating. This results in geothermal plants cooling towers being up to 8 times larger than their counterparts.

FIG. 2B illustrates a theoretical super-hot geothermal system (SHGS) power generation system. The SHGS power generation system 200*b* includes a production well 300 and injection well 206*b*, each of which are drilled from the surface 207 to the dry rock layer 212. Geothermal power generated from SHGS power generation system 200*b* has been previously documented at the various sites of the International Deep Drilling Project (IDDP). The superhot geothermal fluid (SHGF) tapped by the SHGS 200*b* is between 660-1472° F. and seems to be flowing in convective currents under direct influence of magmatic convective currents located below them, as opposed to heat of convection that creates conventional geothermal water. This observation suggests that SHGF in the dry rock layer 212 will never run out.

The challenges associated with harvesting SHGF are the same as those of conventional geothermal flash plants but on levels of magnitude greater. From the IDDP, it is clear that improvements and innovations must be made to make this SHGF resource accessible and reliable, as discussed in more detail in FIG. 3 that follows.

FIG. 2C illustrates a magma-based geothermal power generation system ("magma system") according to an illustrative embodiment. The magma system 200*c* includes a single wellbore 600 that extends from the surface 207 to the magma reservoir 214. Importantly, the magma system 200*c* is a closed system that lacks injection wells. Thus, unlike conventional and SHGS geothermal systems 200*a* and 200*b*, respectively, the magma system 200*c* is not at risk for thermal-shock induced earthquakes, which can be attributed to the injection of cooler water injected into the hot geothermal zone.

One primary advantage of the magma system 200*c* is the simplicity of design. Because only clean steam reaches the surface 207 no solid phase separator is required. Only a steam separator is required to assure no condensate reaches the turbine. And because no polybaric fluids reach the surface no water hammer is experienced, and no rock muffler is required. Another advantage of the magma system 200*c* is due to the energy density of magma. One wellbore 600 can create the power of many wells of a conventional geothermal plant. A detailed discussion of wellbore 600 is provided in relation to FIG. 6.

Figure 3:
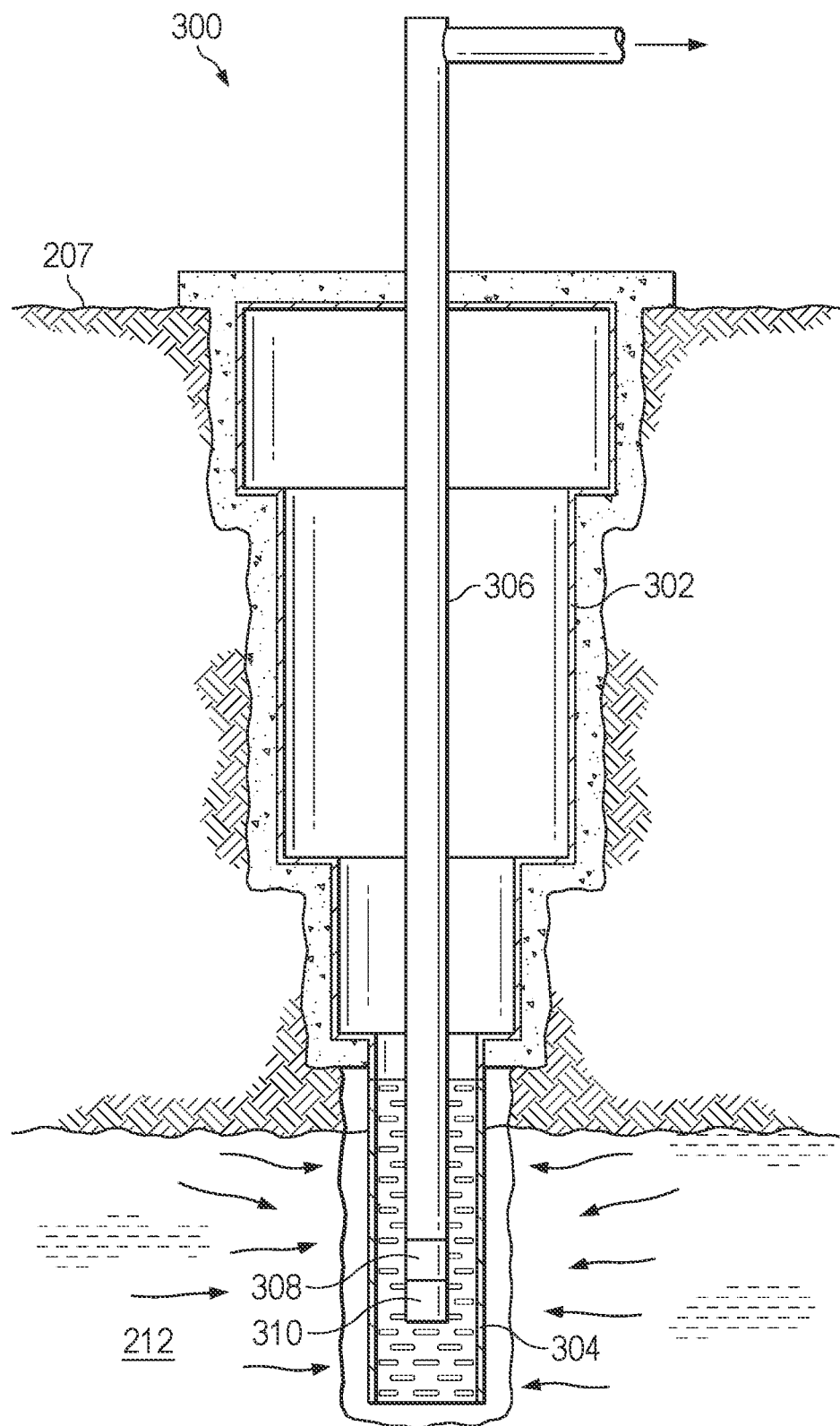
FIG. 3 is a cross-sectional view of a conventional wellbore for use in the theoretical SHGS of FIG. 2B.

FIG. 3 is a cross-sectional view of a conventional wellbore for use in the theoretical SHGS of FIG. 2B. The wellbore 300 extends from the surface 207 to the dry rock layer 212. The wellbore 300 includes a concrete-lined well casing 302 coupled to a well screen 304 at a distal end of the wellbore 300. SHGF that flows into the volume defined by the well screen 304 is conveyed to the surface 207 by a draw pipe 306. A pump 308 and a motor 310 disposed at the end of the draw pipe 306 and submerged in the SHGF pumps the SHGF to the surface 207. Conventional pumps for use in traditional oil and gas applications are rated at about 662° F. Submergence of pump 308 in SHGF, a corrosive fluid that has a temperature at about the operating temperature limit of the pump 308, is likely to cause premature equipment failure. In fact, previous attempts at tapping SHGF with wellbore 300 failed after less than two years of operation.

The SHGF extracted from the wellbore 300 can include solids, liquids, and/or gasses, which may need to be sent through one or more separators as previously discussed.

Figure 4A:
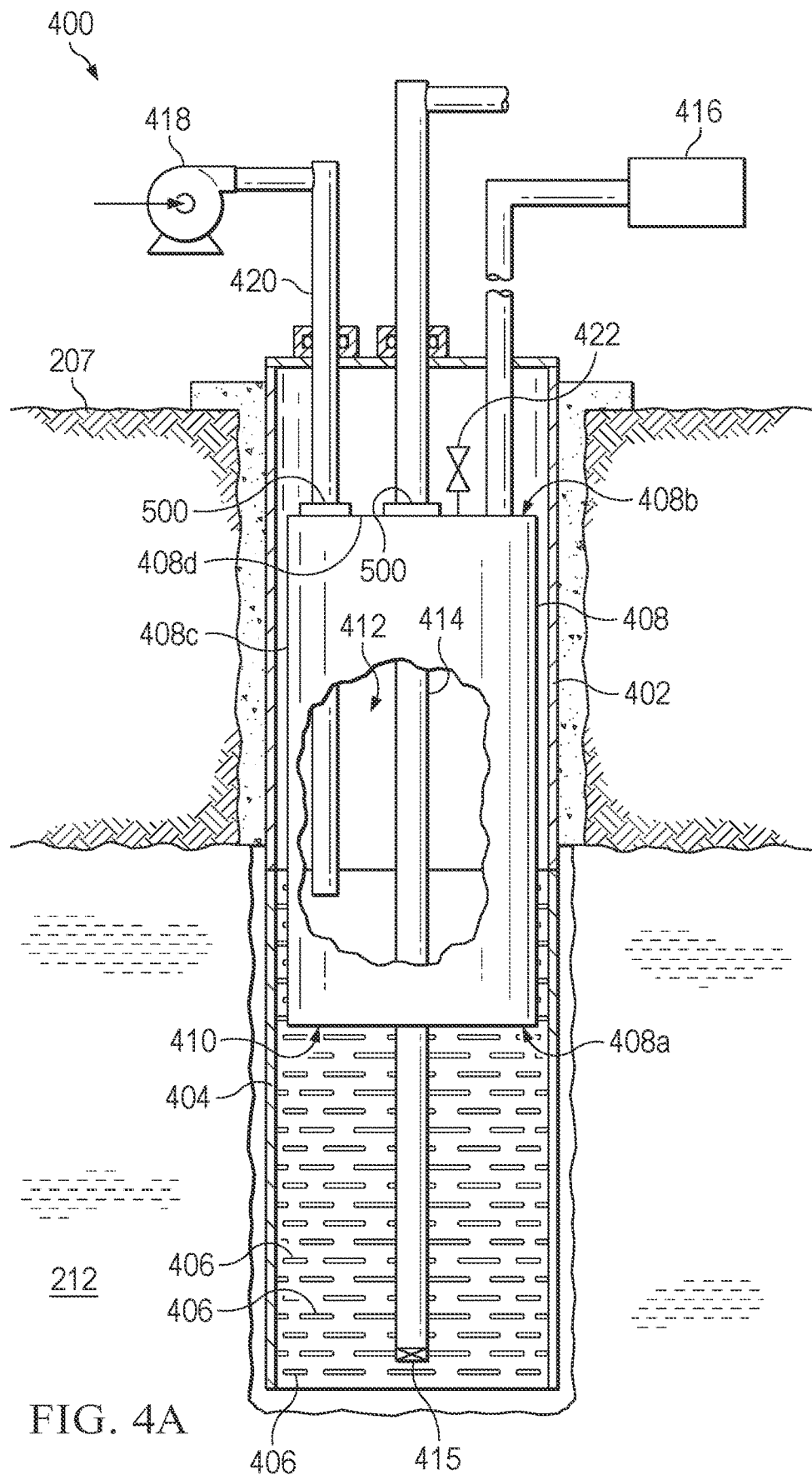
FIGS. 4A-4B are various partial cross-sectional views of a wellbore for use with the theoretical SHGS of FIG. 2B in one or more embodiments of the present disclosure.
Figure 4B:
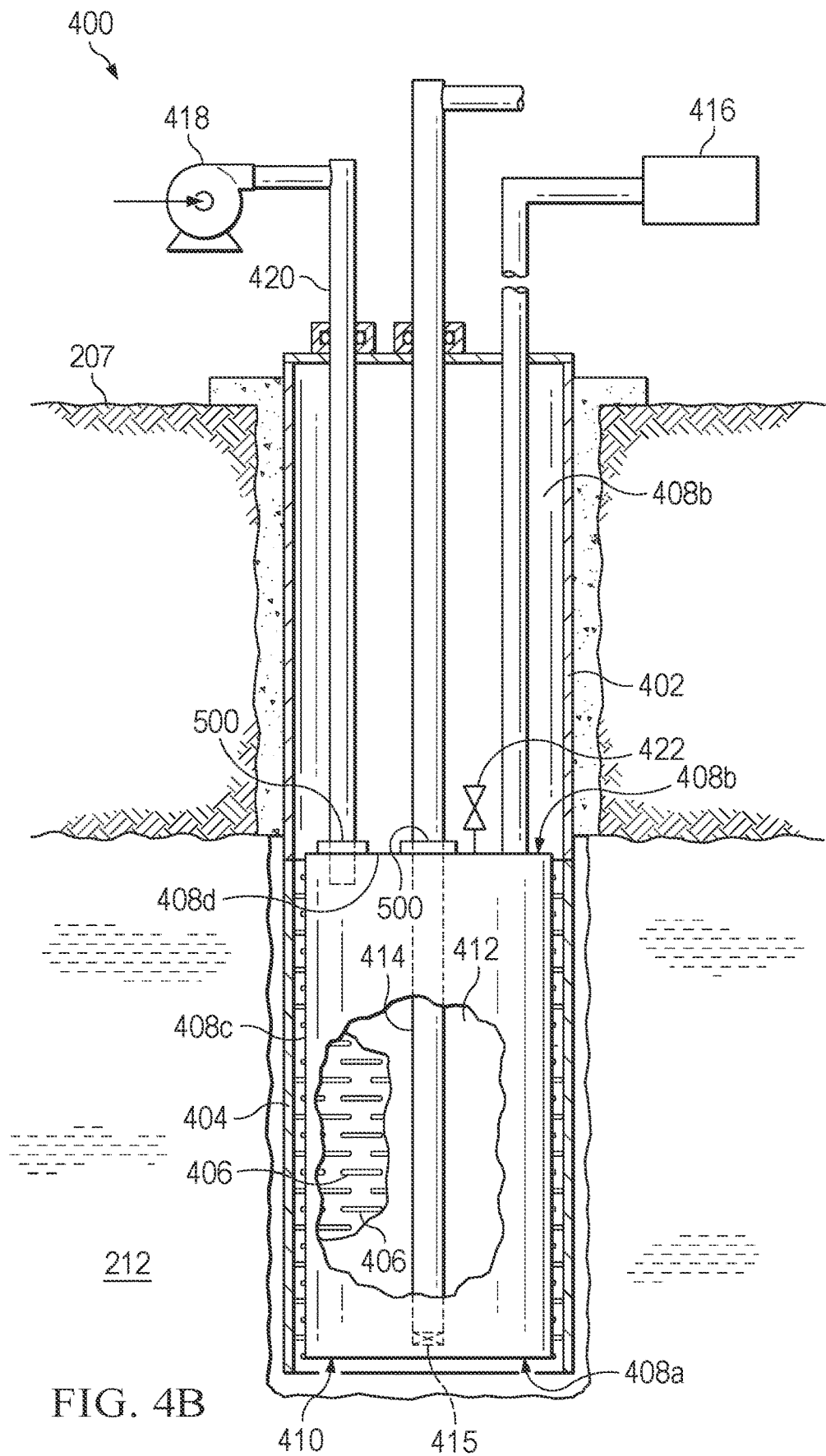

FIG. 4A is a partial cross-sectional view of a wellbore for use with the SHGS power generation system 200*b* of FIG. 2B in accordance with embodiments of this disclosure. FIG. 4A shows the wellbore with a slidable casing 408 in an initial raised position during which fluid enters the wellbore 400 to be heated, while FIG. 4B shows the slidable casing 408 in a final lowered position such that the heated fluid is driven up the draw pipe 414 to the surface 207. In particular, the wellbore 400 is meant to replace the conventional wellbore 300 shown in FIG. 2B and FIG. 3. The wellbore 400 utilizes a compressed air well pump that has the advantage of avoiding the submerged motor and pump from wellbore 300 in FIG. 3.

The wellbore 400 extends from the surface 207 to an underground reservoir of SHGF in the dry rock layer 212. The wellbore 400 includes a concrete-lined well casing string 402 coupled to a well screen 404 that is at least partially submerged within the underground reservoir. The well screen 404 defines a volume in the underground reservoir configured to be at least partially filled by SHGF through a set of apertures 406.

The wellbore 400 also includes a slidable casing 408 with a first end 408*a* and a second end 408*b*. The slidable casing 408 defines an opening 410 at the first end 408*a* that leads into a cavity 412 bounded by a sidewall 408*c* and an end wall 408*d* at the second end 408*b*. Additionally, the slidable casing 408 is suspended within the wellbore 400 and aligned coaxially with the well screen 404.

The wellbore 400 also includes a draw pipe 414 extending through the end wall 408*d* of the slidable casing 408 and into the volume defined by the well screen 404. The draw pipe 414 is configured to convey the SHGF from the underground reservoir of SHGF the surface 207 in response to the slidable casing 408 being slidably repositioned from an initial position to a final position to obstruct more of the set of apertures 406 in the well screen 404, i.e., a greater portion of the slidable casing 408 being repositioned within a volume of the well screen 404, and an increase in pressure within the cavity 412 of the slidable casing 408.

By repositioning the slidable casing 408 to the final position that at least occupies a greater volume within the well screen 404 (see FIG. 4B), the cavity 412 of the slidable casing 408 can be substantially filled with SHGF. The increased pressure within the cavity 412 causes the SHGF in the cavity 412 to be forced up the draw pipe 414 to the surface 207. The increased pressure can be maintained until the cavity 412 is substantially emptied of SHGF. Repositioning the slidable casing 408 back to the initial position (see FIG. 4A) allows the volume defined by the well screen 404 to refill with SHGF so that the process can repeat. As the slidable casing 408 is repositioned back to the initial position, the draw pipe 414 can be sealed to prevent unintended transfer of fluids between the draw pipe 414 and the volume defined by the well screen 404. In a non-limiting embodiment, the draw pipe 414 is sealed by a valve 415 at or near the terminal end of the draw pipe 414.

The slidable casing 408 can be repositioned within the wellbore 400 from the initial position to the final position by a lift 416 that is coupled to the end wall 408*d* of the slidable casing 408. Non-limiting examples of the lift 416 can include a hydraulic ram or a winch attached to the slidable casing 408 by a set of steel cables. In the embodiment in which the lift 416 is a winch connected to the slidable casing 408 by a set of cables, the slidable casing 408 should be formed with sufficient weight so that the absence of any upward force would allow the slidable casing 408 to proceed deeper into the wellbore 400.

The pressure within the cavity 412 of the slidable casing 408 can be increased by a supply of compressed air provided by a compressor 418 that is fluidically connected to the cavity 412 by an inlet pipe 420 that extends through the end wall 408*d* of the slidable casing 408. The slidable casing 408 includes a set of adjustable apertures 500 that can be sealed around fluid conduits passing through the end wall 408*d* of the slidable casing 408, such as the inlet pipe 420 and the draw pipe 414 so that the pressure within the cavity 412 can be increased. In the opened configuration, the set of adjustable apertures 500 provides a large enough gap around the fluid conduits to allow the slidable casing 408 to move without any appreciable impediment.

In some embodiments, a check valve 422 can be disposed through the end wall 408*d* of the slidable casing 408 to help regulate pressure within the cavity 412 of the slidable casing 408 in preparation for repositioning the slidable casing 408 and for pressurizing the cavity 412.

Figure 5A:
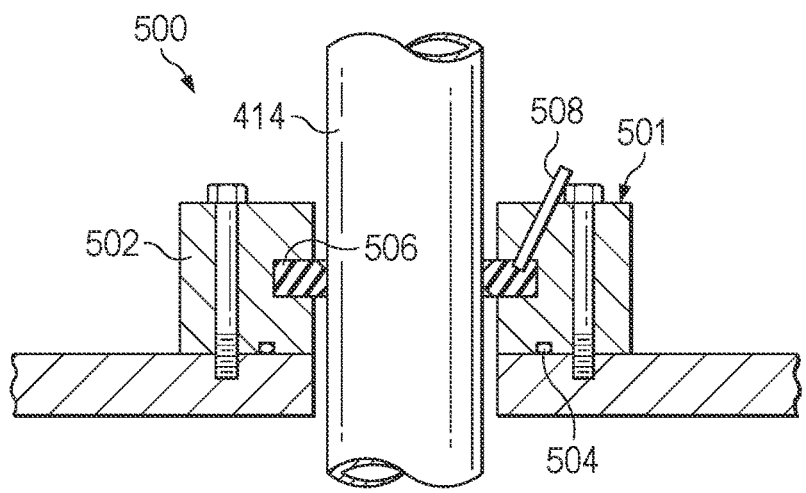
FIGS. 5A-5C are various views of a pneumatic collar seal according to an illustrative embodiment.
Figure 5B:
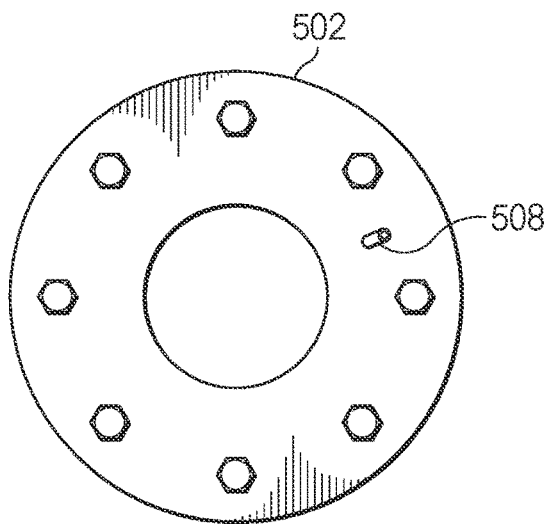
Figure 5C:
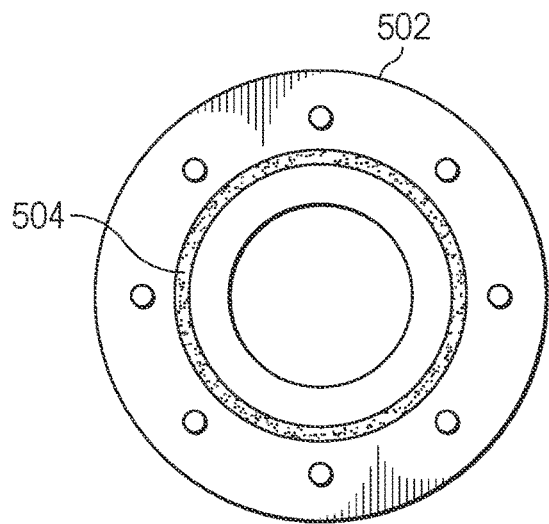

FIGS. 5A-5C are various views of an adjustable aperture according to an illustrative embodiment. The adjustable aperture 500 is formed from a collar seal 501 is disposed around an aperture 424 formed in the end wall 408*d* of the slidable casing 408 in FIGS. 4A and 4B to form the adjustable aperture 500. The collar seal 501 can be actuated to seal around a pipe passing through the aperture 424 of the end wall 408*d*, such as draw pipe 414, to create an airtight seal around the pipe. The airtight seal permits the cavity 412 to be pressurized.

FIG. 5A is a cross-sectional view of the collar seal 501. The body 502 of the collar seal 501 has a generally toroidal shape and is secured to the upper surface of the end wall 408*d* of the slidable casing 408. In this embodiment in FIG. 5A, the body 502 of the collar seal 501 is secured by a set of bolts. The body 502 can be formed from a rigid material such as steel. A gasket 504 can be disposed between the body 502 and the upper surface of the end wall 408*d* to provide an airtight seal.

Upon actuation, the sealing interface 506 extends radially inward from the body 502 of the collar seal 501 until the outer surface of the draw pipe 414 is engaged. In a non-limiting embodiment, the collar seal 501 is pneumatically actuated by a source of compressed air (not shown) coupled to an air valve 508 by a fluid conduit (not shown). The compressed air causes the sealing interface 506 to inflate to engage the draw pipe 414. In other embodiments, the collar seal 501 can be actuated by other means, such as by electro-mechanical controls. The sealing interface 506 in an illustrative embodiment is a pneumatic bladder. Release of pressure from the sealing interface 506 allows the slidable casing 408 to move between the initial and final positions illustrated in FIGS. 4A and 4B. Inflation of the sealing interface 506 may prevent the slidable casing 408 from moving and/or prevent fluid from leaking out of slidable casing 408 when it is pumped to the surface 207. For example, the sealing interface 506 may be inflated in the configuration of FIG. 4B and deflated in the configuration of FIG. 4A.

FIG. 5B is a top view of the collar seal 501 and FIG. 5C is a bottom view of the collar seal 501 according to an illustrative embodiment. In FIG. 5B, a plurality of bolts is arranged circumferentially around the body 502. In FIG. 5C, the gasket 504 is shown disposed on the surface of the body 502 that engages with the upper surface of the end wall 408*d* of the slidable casing.

Figure 6:
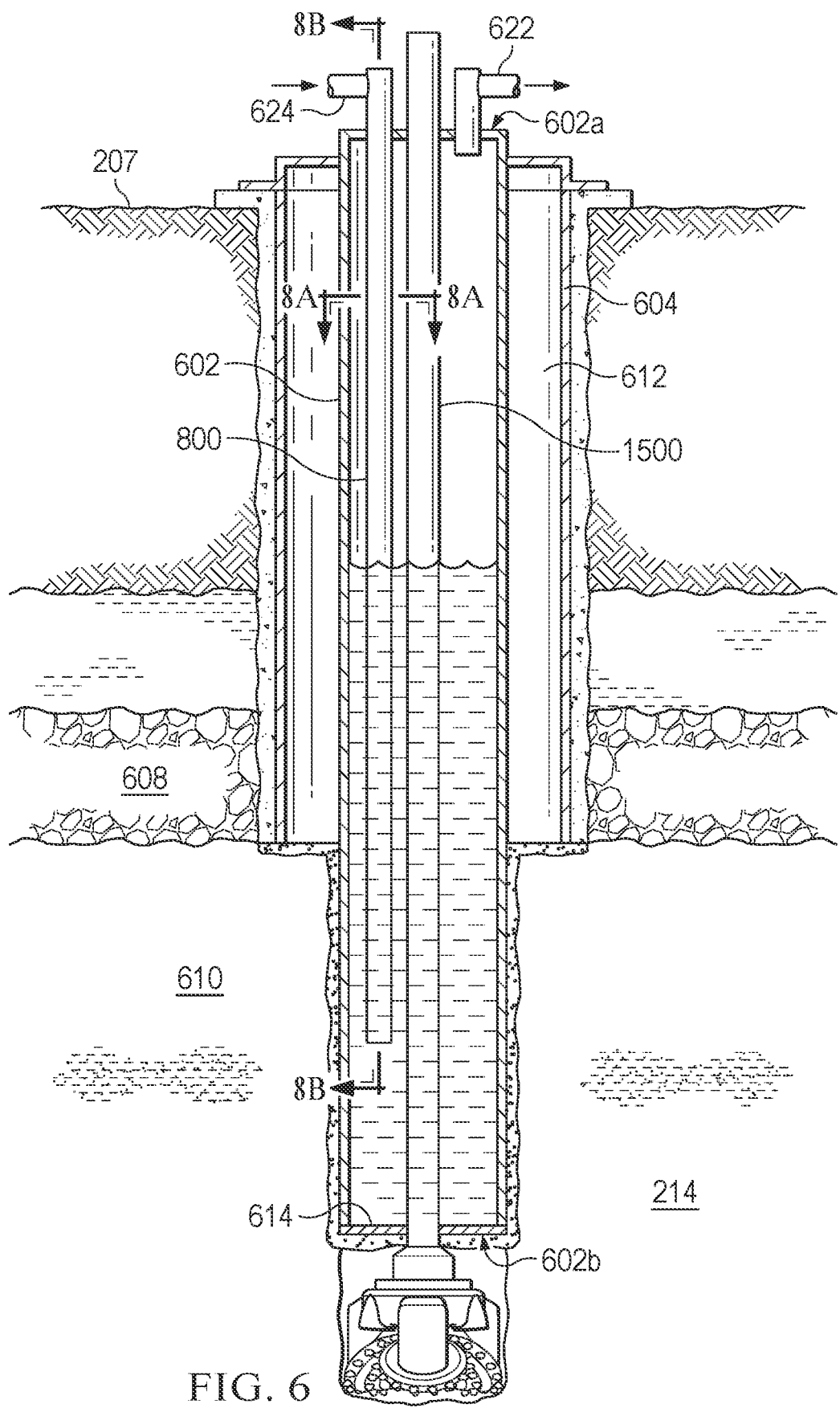
FIG. 6 is a cross-sectional view of a cased wellbore for use with the magma system of FIG. 2C, according to an illustrative embodiment.

FIG. 6 is a cross-sectional view of a cased wellbore for use with the magma system of FIG. 2C, according to an illustrative embodiment. The cased wellbore 600 is formed generally from a boiler casing 602 that passes through a well casing 604 and extends the entire length of the borehole from the surface 207 to an underground reservoir of magma 214. The boiler casing 602 houses a drill stem 1500 that is substantially coaxial and coextensive with the boiler casing 602. The boiler casing 602 also houses a fluid conduit 800 configured to deliver a liquid-phase fluid into the boiler casing 602. In one embodiment, the liquid-phase fluid is water. The liquid-phase fluid, i.e., water, is converted to steam inside the boiler casing 602 and extracted as steam, which can then be used to generate electricity via one or more turbines.

In a non-limiting embodiment, the well casing 604 only extends from the surface 207 to a predetermined depth within the borehole. In the depicted example in FIG. 6, the well casing 604 extends from the surface 207 to a boundary between a dry rock layer 608 and intrusive rock layer 610.

The boiler casing 602 has a first end 602*a* and a terminal end 602*b* that is submerged within the underground reservoir of magma 214. The boiler casing 602 can be aligned co-axially with the well casing 604 and dimensioned relative to the well casing 604 so that an inner surface of the well casing 604 and an outer surface of the boiler casing 602 define an annular void space 612. An insulation layer 700 can be disposed in the annular void space 612 to insulate the boiler casing 602 for a predetermined length L measured from the first end 602*a*. Additional detail concerning the insulation layer 700 can be found in the discussion of FIG. 7 that follows.

One end of the cased wellbore 600 is sealed by an end plate 614 that includes an aperture sized to receive the drill stem 1500. The end plate 614 prevents magma from entering the terminal end 602*b* of the boiler casing 602. The other end of the cased wellbore 600 is sealed by a well head 1000, which is depicted and described in more detail in FIG. 10.

The magma in the underground reservoir is believed to be at a temperature between 1,600-2,300° F. and is believed to be comprised of many liquid metals such as Fe. The terminal end 602*b* of the boiler casing 602 is submerged in magma, which causes the boiler casing 602 to absorb heat from the magma. The heat is transferred to water supplied by the fluid conduit 800. The water enters the wellbore through an injection pipe 624, which may be an upper portion of fluid conduit 800 or a separate fluid pipe coupled to fluid conduit 800. (In a closed system, pressure and temperature are related so that increases in temperature causes an increase in pressure, and vice versa. For example, a maximum possible temperature of saturated steam and water in the boiler casing 602 is 705.5° F. at 3,208.2 psia, which is less than half of the temperature of magma contacting the surface of the boiler casing 602.) The increase in the water temperature causes a predictable increase in pressure, which forces the water up the boiler casing towards the surface 207. As temperature and/or pressure drops, the water is transformed to steam that can be used to spin a set of turbines to create electricity in the manner previously described. The steam is removed from the wellbore using a draw pipe 622.

As an added benefit, the loss of heat by magma contacting the boiler casing 602 is believed to result in the formation of a relatively thin insulating and protective layer of intrusive rock against the boiler casing 602, which can retard corrosion.

Figure 7A:
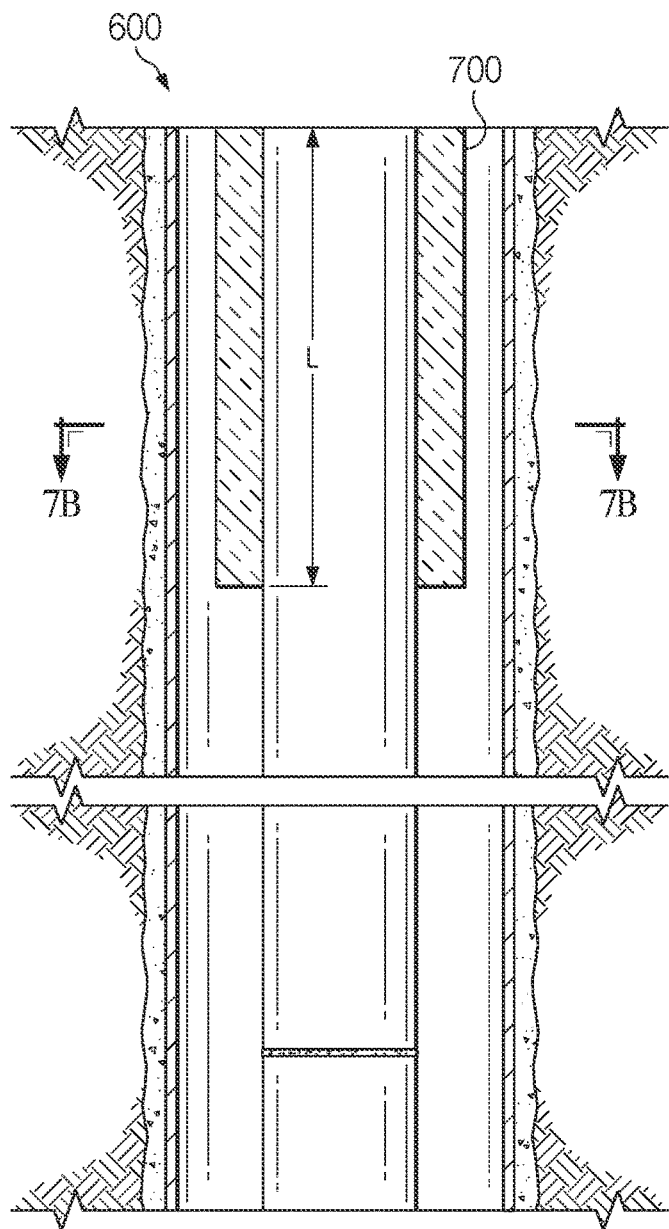
FIGS. 7A-7B are various views of a first, upper end of the cased wellbore of FIG. 6, according to an illustrative embodiment.
Figure 7B:
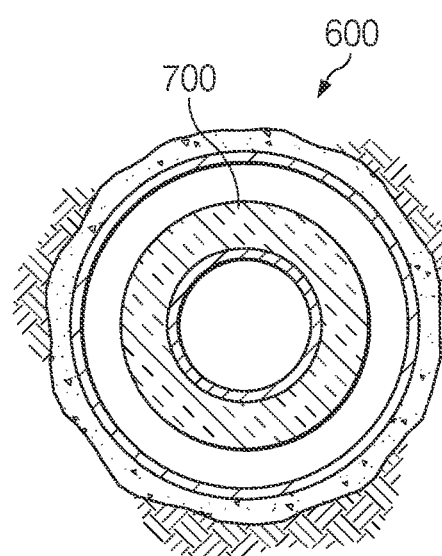

FIGS. 7A-7B are various views of a first, upper end of the cased wellbore of FIG. 6, according to an illustrative embodiment. In particular, FIG. 7A is a partial elevation view of the cased wellbore 600 from FIG. 6, and FIG. 7B is a cross-sectional view of the cased wellbore 600 taken along line 7B-7B of FIG. 7A. From FIG. 7A, it can be seen that a predetermined length L of the boiler casing 602 is insulated with an insulation layer 700, which reduces heat loss at the upper end of the boiler casing 602, which in turn prevents the transformation of steam back to condensate.

Figures 8A, 8B:
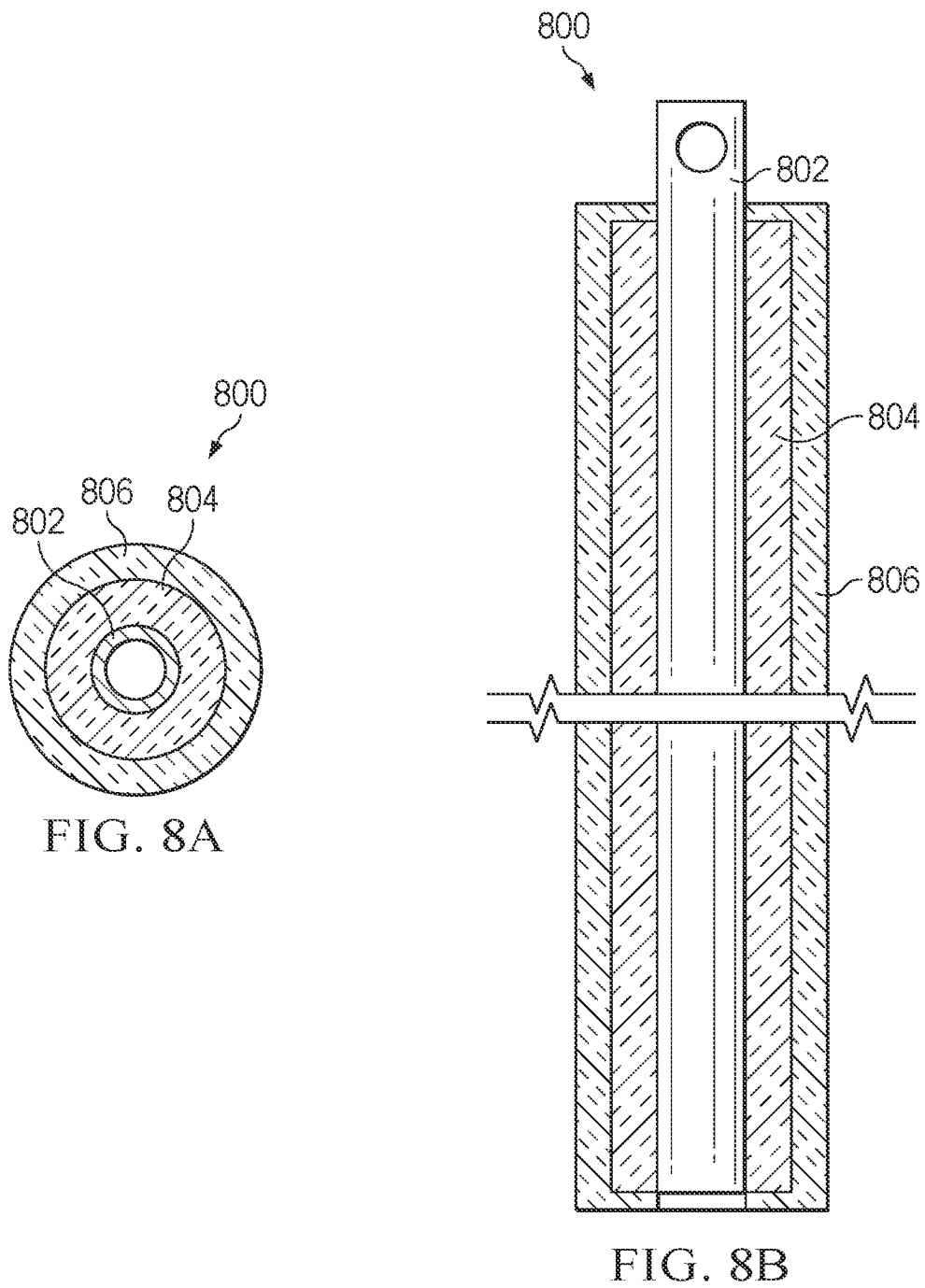
FIGS. 8A-8B are various views of a fluid injection conduit of the cased wellbore of FIG. 6, according to an illustrative embodiment.

FIGS. 8A-8B are various views of a fluid injection conduit of the cased wellbore of FIG. 6, according to an illustrative embodiment. FIG. 8A is a cross-sectional view of the fluid conduit 800 taken along line 8A-8A in FIG. 6 and FIG. 8B is a cross-sectional view of the fluid conduit 800 taken along line 8B-8B in FIG. 6.

The fluid injection conduit 800 is a layered fluid conduit insulated from the high heat and pressure inside the boiler casing 602, which prevents the liquid-phase fluid, i.e., water, from flashing to a gas-phase fluid, i.e., steam, before it reaches the terminal end 602b of the boiler casing 602. The exemplary fluid injection conduit 800 in FIG. 8 is formed from a fluid conduit 802 that is wrapped in an inner insulation layer 804, which is encased within an outer insulation casing layer 806. In a non-limiting embodiment, the outer insulation casing layer 806 is formed from a rigid material for protecting against high pressure and the inner casing layer 804 provides thermal insulation properties.

Figures 9A, 9B:
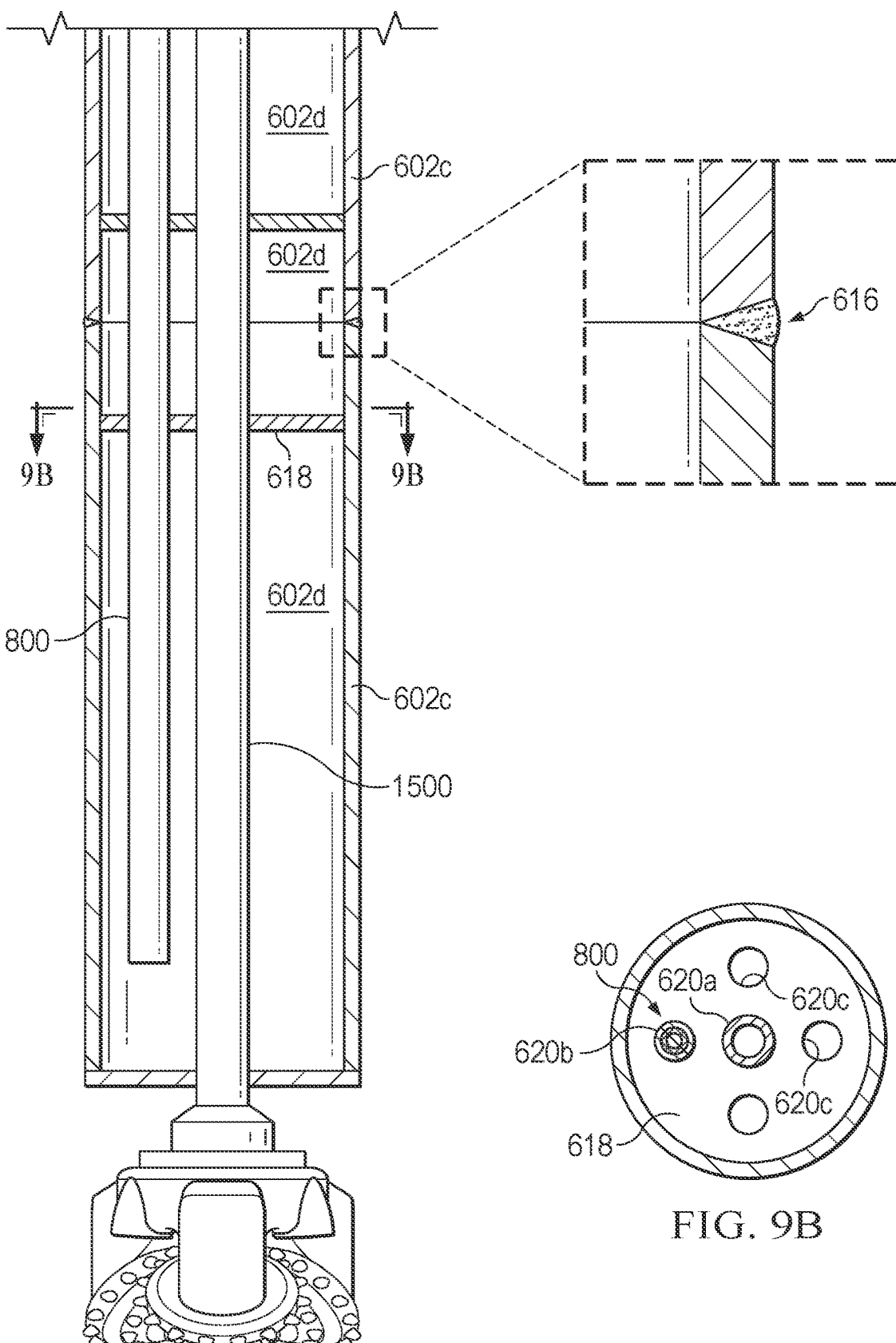
FIGS. 9A-9B are various views of a second, terminal end of the cased wellbore of FIG. 6, according to an illustrative embodiment.

FIGS. 9A-9B are various views of a second, terminal end of the cased wellbore of FIG. 6, according to an illustrative embodiment. FIG. 9A is a more detailed view of the cross-sectional view of the boiler casing 602 from FIG. 6 and FIG. 9B is a cross-sectional of the boiler casing 602 view taken along line 9B-9B in FIG. 9A.

The boiler casing 602 can be formed from a plurality of boiler casing segments 602c positioned end-to-end and welded together at a seam 616. In a non-limiting embodiment, the internal volume of the boiler casing 602 is divided into a plurality of compartments 602d by a set of casing plates 618. Each of the set of casing plates 618 includes a plurality of apertures 620 that connects each compartment 602d with one or more adjacent compartments 602d. A first aperture 620b in the plurality of apertures 620 is sized to accommodate the fluid conduit 800. A second aperture 620a sized to receive a drill stem 1500. In a non-limiting embodiment, the outer surface of the drill stem 1500 is welded to each of the set of casing plates along a circumference of the second aperture 620b. The remaining aperture(s) 620c are steam vents permitting the gas-phase fluid to travel through the plurality of compartments 602d towards the surface 207.

Figure 10A:
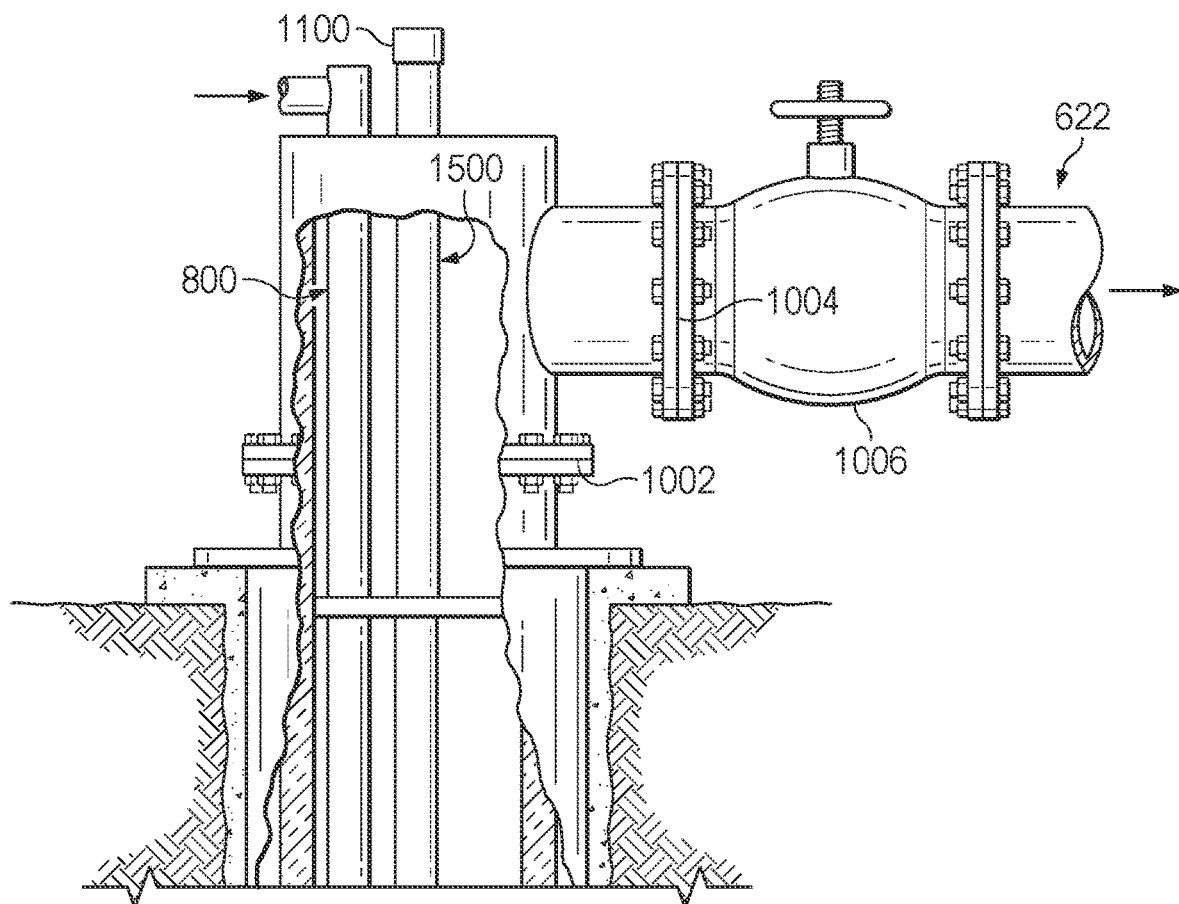
FIGS. 10A-10C are various views of a wellhead of the cased wellbore of FIG. 6, according to an illustrative embodiment.
Figure 10B:
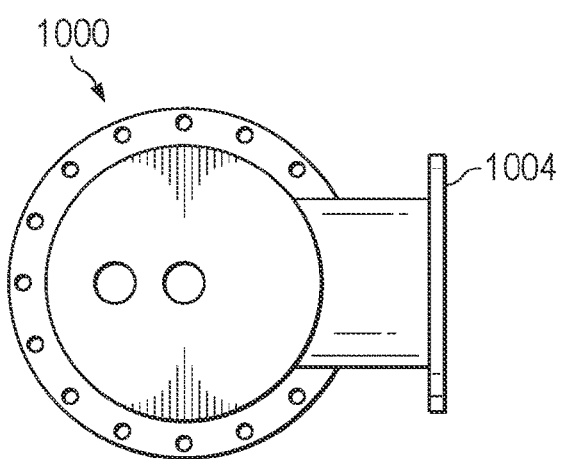
Figure 10C:
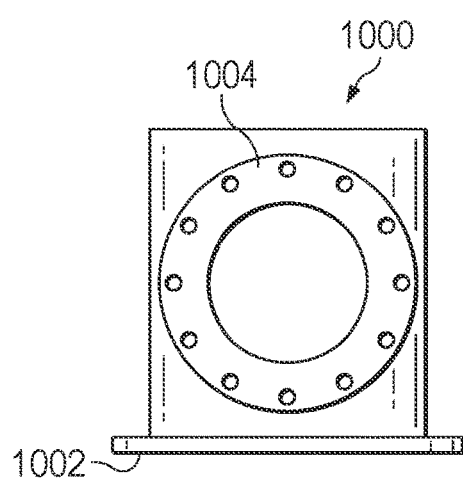

FIGS. 10A-10C are various views of a wellhead of the cased wellbore of FIG. 6, according to an illustrative embodiment. In particular, FIG. 10A is a partial cutaway view of the wellhead 1000, FIG. 10B is an upper plan view of the wellhead 1000, and FIG. 10C is an elevation view of the wellhead 1000. The wellhead includes a drill stem cap 1100 that prevents the buildup of pressure within the wellbore, which can rupture fluid conduits, such as draw pipe 622. The drill stem cap 1100 may include but is not limited to a vent cap.

The wellhead 1000 includes a first mating surface 1002 configured to mate with the first end 602a of the boiler casing 602. In a non-limiting embodiment, the first mating surface 1002 is a flange configured to be bolted to a corresponding flange of the boiler casing 602. The wellhead 1000 also includes another mating surface 1004, e.g., another flange, configured to mate with a steam valve 1006 that can isolate the cased wellbore 600 from the draw pipe 622 and any unit operations downstream. Additionally, the wellhead 1000 depicted in FIG. 10 include a plurality of apertures that allows the fluid conduit 800 and the drill stem 1500 to be exposed above the surface 207.

Figure 11A:
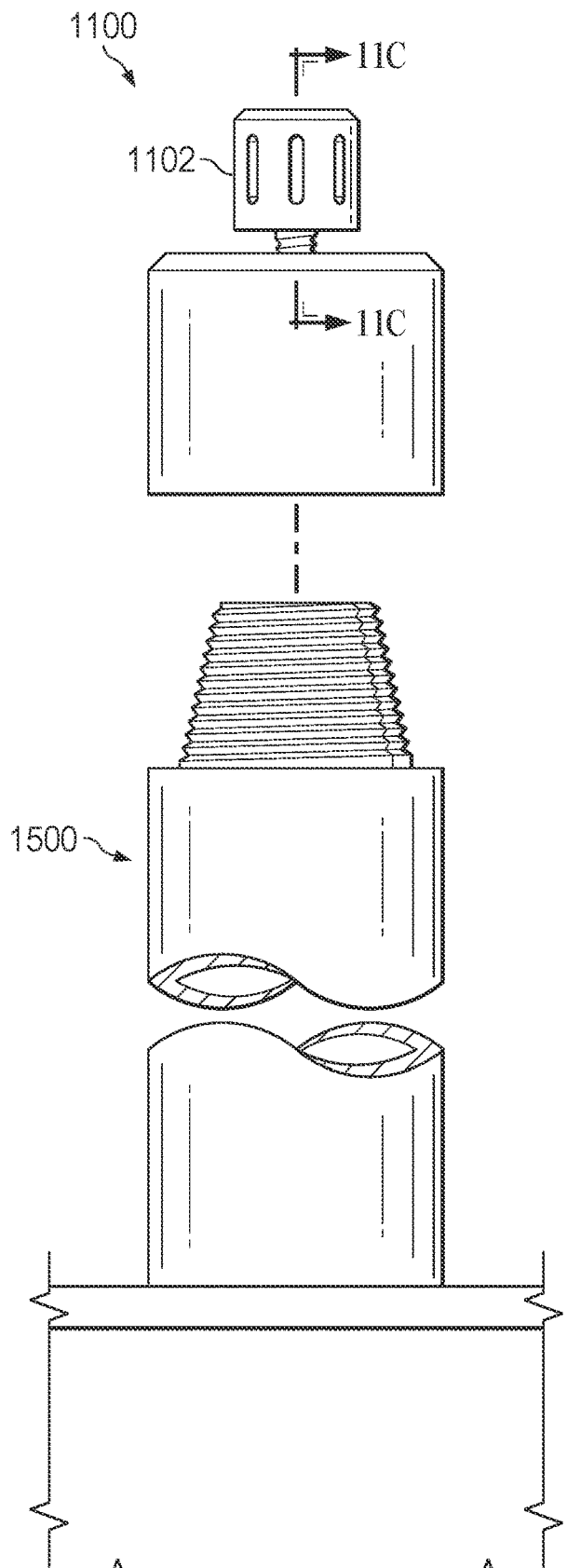
FIGS. 11A-11C are various views of a vent cap for use with the cased wellbore of FIG. 6, according to an illustrative embodiment.
Figure 11B:
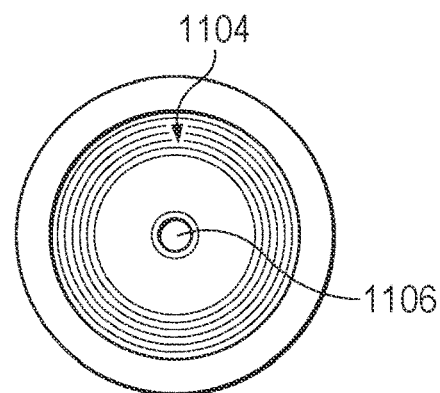
Figure 11C:
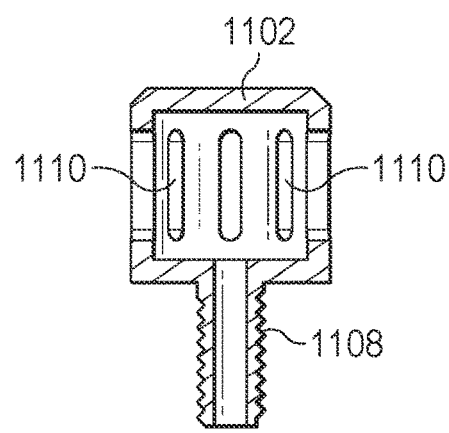

FIGS. 11A-11C are various views of a vent cap for use with the cased wellbore of FIG. 6, according to an illustrative embodiment. The drill stem cap 1100 is configured to removably engage the upper end of the drill stem 1500 to protect the threaded interface and provide a means for regulating pressure within the drill stem 1500.

FIG. 11A is a side view of the drill stem cap 1100 with a vent 1102 that can release pressure built up within the drill stem 1500. Increased pressure can be due to an intrusion of magma into the drill stem 1500 from around a sacrificial bit attached the terminal end of the drill stem 1500 after the sacrificial bit is submerged into magma.

FIG. 11B is bottom view of the drill stem cap 1100, looking up into the cavity 1104 of the drill stem cap 1100 to show the threaded receiver 1106 that couples to the vent 1102. FIG. 11C is a cross-sectional view of the vent 1102 taken along line 11C-11C in FIG. 11A. The threaded interface 1108 of the vent 1102 can be inserted into the threaded receiver 1106 of the drill stem cap 1100 to removably couple the two together. The threaded interface 1108 defines a conduit that connects the cavity 1104 of the drill stem cap 1100 with the set of outlets 1110 to prevent pressurization of the drill stem 1500.

Figure 12:
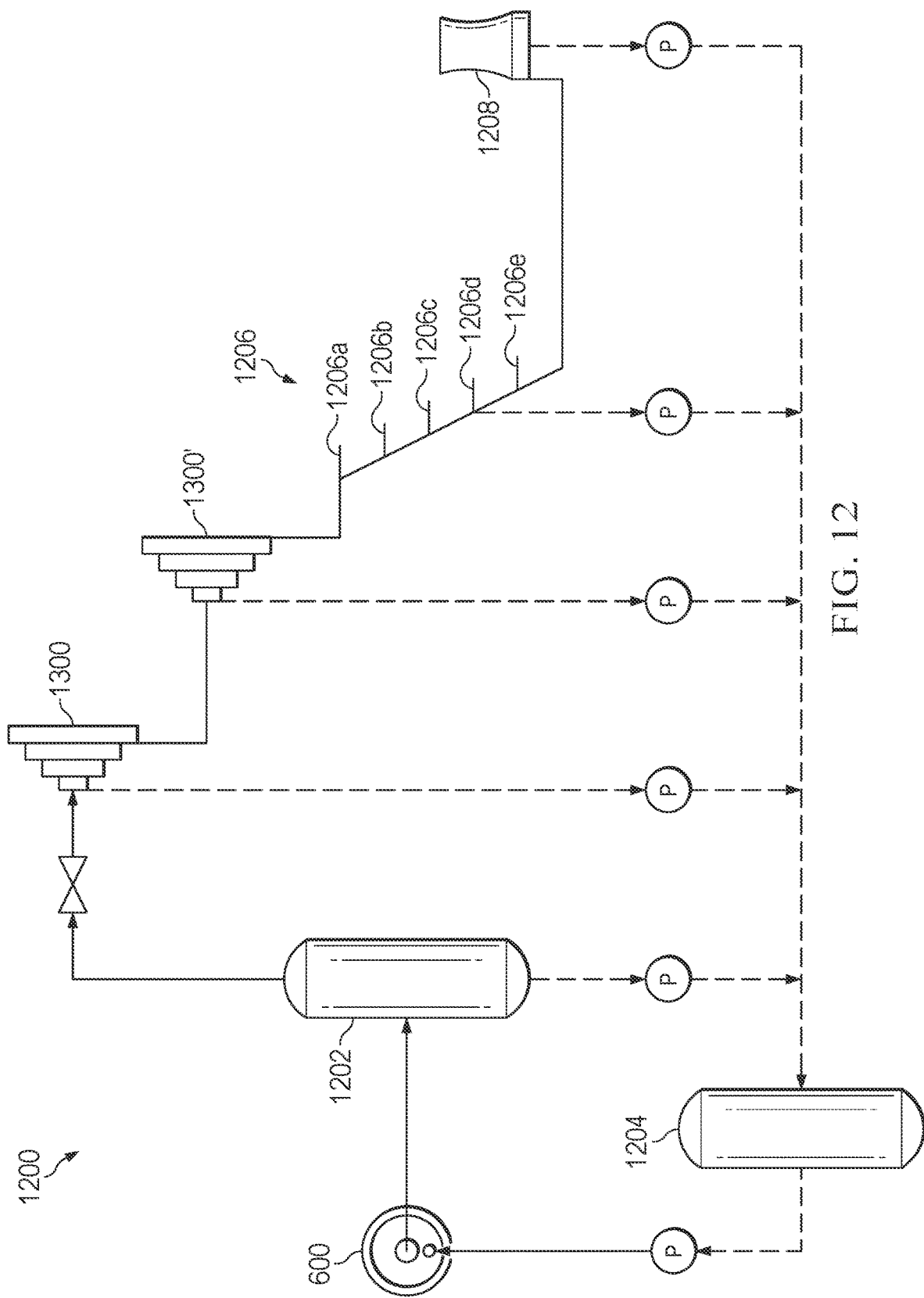
FIG. 12 is a simplified diagram of a magma system according to an illustrative embodiment.

FIG. 12 is a simplified schematic diagram of a magma power system according to an illustrative embodiment. The magma power system 1200 includes a steam separator 1202 connected directly to a cased wellbore 600 extending between a surface and the underground reservoir of magma. The steam separator 1202 separates a gas-phase fluid, i.e., steam, from condensate formed from the gas-phase fluid. A first set of turbines 1300 is connected to the steam separator and is configured to generate electricity from the gas-phase fluid received from the steam separator 1202. A condensate tank 1204 is fluidically connected to the steam separator 1202 and the first set of turbines 1300. The condensate tank 1204 is fluidically connected to a fluid conduit that supplies condensate to the cased wellbore 600.

Given the sufficiently high temperature and pressure of steam originating from the cased wellbore 600, a second set of steam turbines 1300' can be arranged in series with the first set of steam turbines 1300 to generate electricity from the steam expelled from the first set of steam turbines 1300. Resultant condensate from the second set of steam turbines 1300' can also be sent to the condensate tank 1204. As used herein, the first set of steam turbines 1300 can be referred to in the alternative as "high-pressure turbines" and the second set of turbines 1300' can be referred to in the alternative as "low-pressure turbines" operating at a lower pressure than the first set of steam turbines 1300.

The effluent from at least the second set of steam turbines 1300', and also optionally the first set of steam turbines 1300 in some embodiments, can be sent to a set of effluent recyclers 1206. Examples of effluent recyclers 1206 includes, but is not limited to, one or more of a water distillation system 1206a, a heat driven chilling apparatus 1206b, a residential HVAC system 1206c, an agriculture system 1206d, and an aquaculture system 1206e. Effluent generated by the effluent recycler 1206 can be sent to a cooling tower 1208, if necessary, before being returned to condensate tank 1204 for use in resupplying the wellbore 600.

Heat driven chillers 1206*b* can be implemented in data centers, crypto-currency mining facilities, or other locations in which undesirable amounts of heat are generated. Heat driven chillers 1206*b*, also conventionally referred to as Absorption Cooling Systems, use heat to create chilled water. These heat driven chillers 1206*b* can be designed as direct-fired, indirect-fired, and heat-recovery units. When the effluent includes low pressure steam, indirect-fired units are preferred.

Heat driven chillers 1206*b* are characterized by: simple designs with few moving parts and low maintenance requirements; low operating temperatures and pressures, e.g., 200-370° F. and 10-115 psig); low electrical consumption, e.g., 0.01-0.04 KW/ton; high rate of heat rejection, e.g., 21,000 BTU/ton-h-30,000 BTU/ton-h (1-refrigeration ton=12,000 BTUs); large physical size and weight, e.g., 1,000 ton unit refrigerant=65,000-74,000 lbs. and 20 ft L×8 ft W×12 ft. H; and use ozone-safe, low global warming refrigerants.

At least one advantage of the magma power system 1200 over the prior art is the increased efficiency, which can be attributed to a simpler plant design with fewer parasitic loads such as pumps, and a superior heat source than conventional geothermal systems, which provides a higher ratio of usable energy to entropy. Another advantage of the magma power system 1200 is the implementation of effluent recyclers 1206, which can convert much of the remaining steam to condensate without the need for sending the steam through cooling tower 1208.

Figure 13:
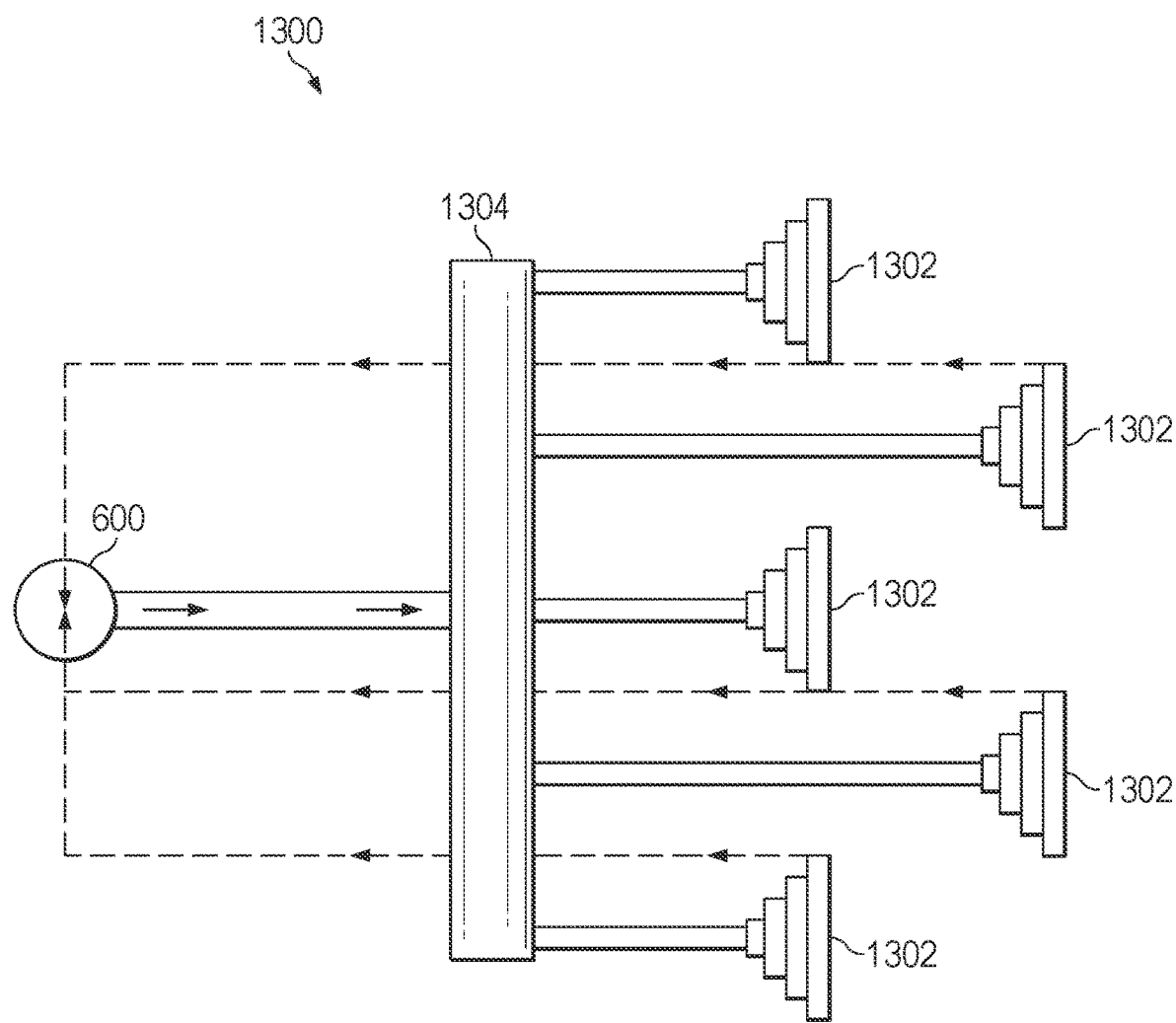
FIG. 13 is an illustration of a set of turbines for use in a magma system according to an illustrative embodiment.

FIG. 13 is an illustration of a set of turbines for use in a magma power system according to an illustrative embodiment. The set of turbines 1300 is one or more turbines 1302 connected to a steam distribution manifold 1304. Each of the set of turbines 1302 is a high-pressure steam turbine capable of generating electrical power from steam received from the steam distribution manifold 1304 given that the steam received is of sufficiently high temperature and pressure.

In this embodiment in FIG. 13, the steam received by the steam manifold 1304 originates from a cased wellbore 600. Condensate formed during operation of the set of turbines 1300 can be returned to the cased wellbore 600.

Figure 14A:
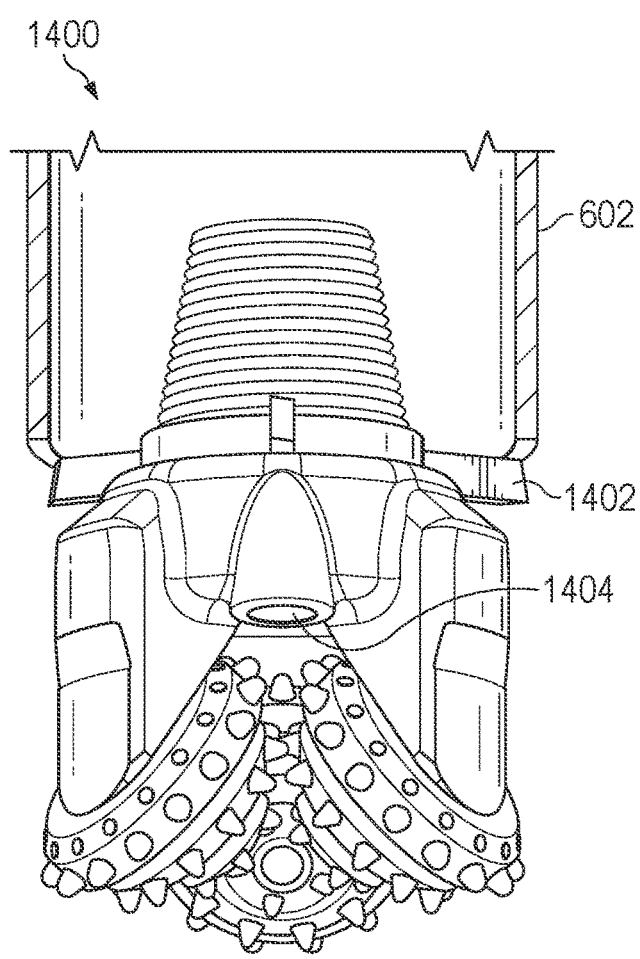
FIGS. 14A-14B are various views of a drill bit for use in drilling a wellbore for a magma system according to an illustrative embodiment.
Figure 14B:
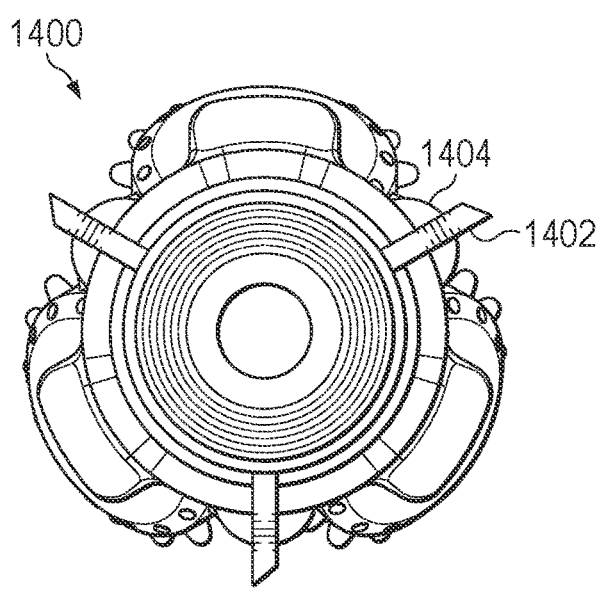

FIGS. 14A-14B are various views of a drill bit for use in drilling a wellbore for a magma system according to an illustrative embodiment. The drill bit 1400 can be attached to a drill stem for drilling a wellbore, such as wellbore 600 in FIG. 4. With particular reference to FIG. 14A, the drill bit 1400 is depicted as a tri-cone drill bit with an integrated underreamer 1402 that projects radially outward. An ejection nozzle 1404 is positioned to supply the operative interface of the drill bit 1400 with drilling fluid during drilling operations.

The underreamer 1402 engages with a terminal end of a well casing 602 so that the well casing can be carried into a borehole as the drill bit 1400 drills downwardly. As used herein, the terms "up", "down", "upwardly", "downwardly" and other similar terms are relative to the gravitational vector. Thus, drilling from the surface towards an underground reservoir of fluid is in the downwardly direction. The underreamer 1402 can be withdrawn or retracted to allow the drill bit 1400 to be extracted from the borehole without simultaneously extracting the well casing.

FIG. 14B is an upper plan view of the drill bit 1400 depicting the hollow center of the attachment interface, which allows drilling fluid carried down from a drill stem to flow out through the ejection nozzle 1404 to cool the drill bit 1400 and to lift cuttings out of the wellbore.

The drill bit 1400 depicted in FIG. 14 is exemplary and non-limiting. For example, the underreamer 1402 is depicted as integrated with the drill bit 1400 in FIG. 14 but in another embodiment the underreamer 1402 can be formed into a drill stem attached to the drill bit 1400. Additionally, the drill bit 1400 is depicted as a tri-cone bit, but other forms of currently used or later developed drill bits can be used instead.

Figure 15A:
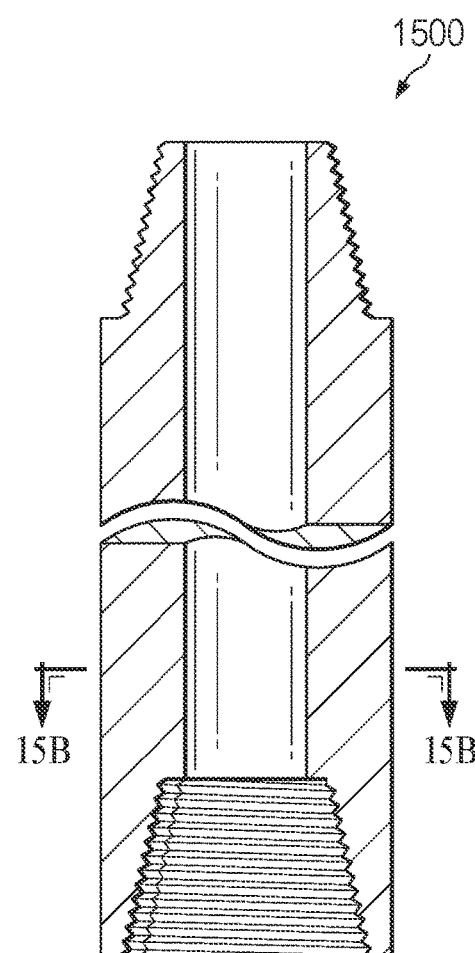
FIGS. 15A-15B are various views of a drill stem for use in drilling a wellbore for a magma system according to an illustrative embodiment.
Figure 15B:
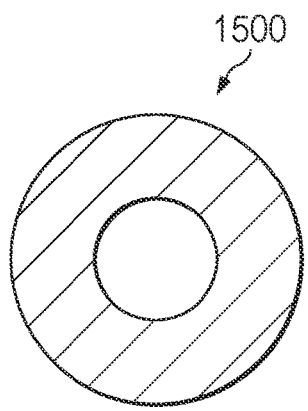

FIGS. 15A-15B are various views of a drill stem for use in drilling a wellbore for a magma system according to an illustrative embodiment. The drill stem 1500 can be coupled with a drill bit, such as drill bit 1400, for drilling a wellbore.

FIG. 15A is an elevation view of the drill stem 1500 and FIG. 15B is a cross-sectional view of the drill stem 1500 in FIG. 15A, taken along lines 15B-15B. The drill stem 1500 has a hollow center for conveying a drilling fluid down a borehole during drilling operations. The drill stem 1500 includes an attachment interface at the upper end, which is configured for receiving a drill stem cap once drilling operations have terminated. An example of the drill stem cap is described in FIG. 11.

Figure 16:
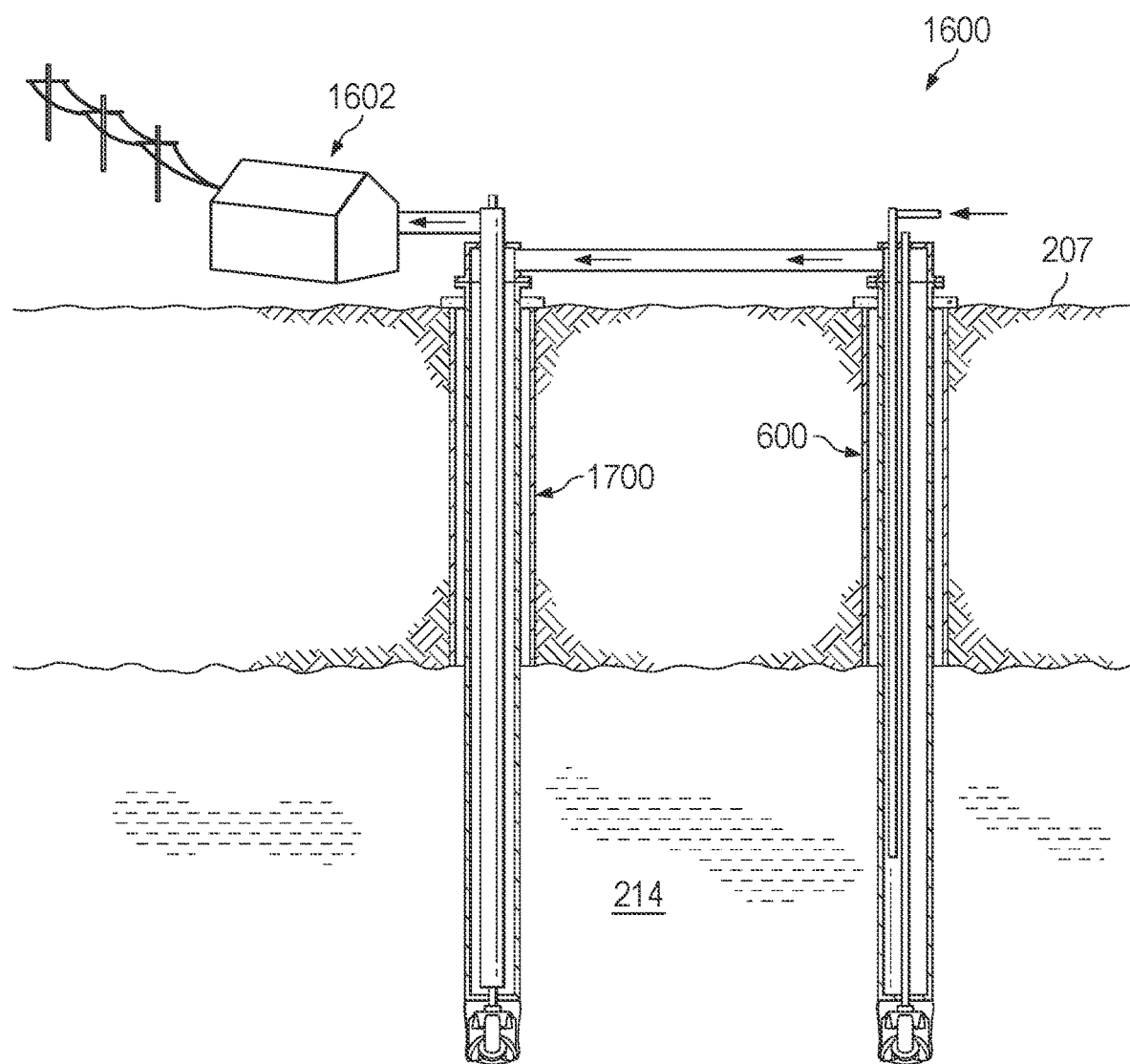
FIG. 16 is a system for generating superheated steam according to an illustrative embodiment.

FIG. 16 is a system for generating superheated steam according to an illustrative embodiment. The superheated steam system 1600 can be used to produce superheated steam that can be used in various applications, such as Fischer-Tropsch Synthesis (FTS) and the Haber process. FTS can be used to generate synthetic hydrocarbons, and the Haber process can be used for producing ammonia. Both processes require a source of steam that has temperatures and pressures greater than saturated steam. Superheated steam may be generated using one or more wells. In a preferred embodiment, the system is configured with two or more wells, as illustrated in the example of FIG. 16. The use of two or more wells may facilitate the use of simpler operations and lower cost materials.

Saturated steam is a bi-phase mixture of liquid and gas. If water is contained within a pressure vessel and heated, the temperature and pressure will increase together in predictable relationships. These pressure, temperature, volume, energy relationships are well known to engineers and published in steam tables. Within the pressurized system saturated steam is always losing energy to the environment and entropy is increased, which is expressed as condensate forming on the inside of pipe walls collecting at the gravitational bottom of the pipe or vessel. In saturated steam plants like canneries and commercial laundries all steam pipes are sloped at an angle to the Earth where steam traps collect the liquid water and return it for steam production while keeping the steam in the system to do work.

By capturing the steam and reheating it through a heat exchanger, steam can have more energy (enthalpy) than that which is associated with its pressure and volume and has no evaporation potential. This reheated steam is called superheated steam. Superheated steam is not a bi-phase mixture, but exists only as a gas. This is preferred by Rankine cycle power plant operators as any condensate droplets from saturated steam can damage turbine blades.

When saturated steam reaches 3,208.2 psi (22.089 MPa) and 705.5° F. (647.29 degree K) the volume required in cubic feet per pound of steam is zero and its potential of evaporation is zero, and its energy content of the liquid and gas phases of water are identical. Restated, water turns to steam without boiling and the two states become indistinguishable. This is called the Critical Point.

FTS and the Haber process require pressures of over 2900 psi and temperatures of over 800° F. While the pressure is within the saturated range the temperature is not. These processes will require superheated steam, which can be obtained by the superheated steam system 1600.

The superheated steam system 1600 includes a cased wellbore 1700, which is described in more detail in FIG. 17 that follows, to generate superheated steam from saturated steam received from cased wellbore 600, which was described in more detail in FIG. 6 above.

Water injected into the wellbore 600 can be extracted as saturated steam having a temperature around 650° F. The saturated steam can then be injected into the downstream wellbore 1700, which can then be extracted as superheated steam at a temperature of around 900° F. The superheated steam can then be processed in a plant 1602 to create electricity, SYNFUELS, or ammonia, as previously described.

Figure 17A:
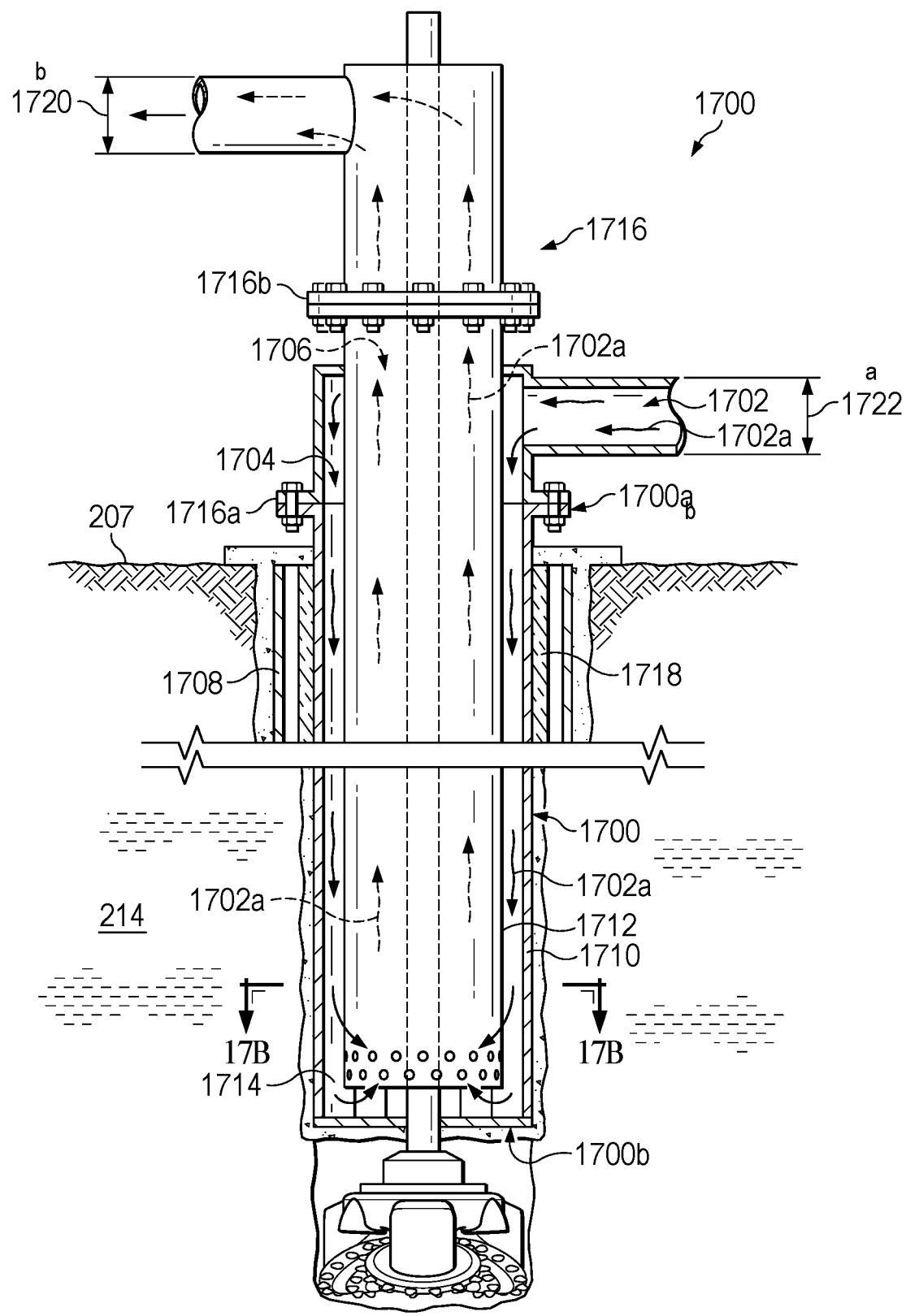
FIGS. 17A-17C are various views of a downstream wellbore for generating superheated steam according to an illustrative embodiment.
Figure 17B:
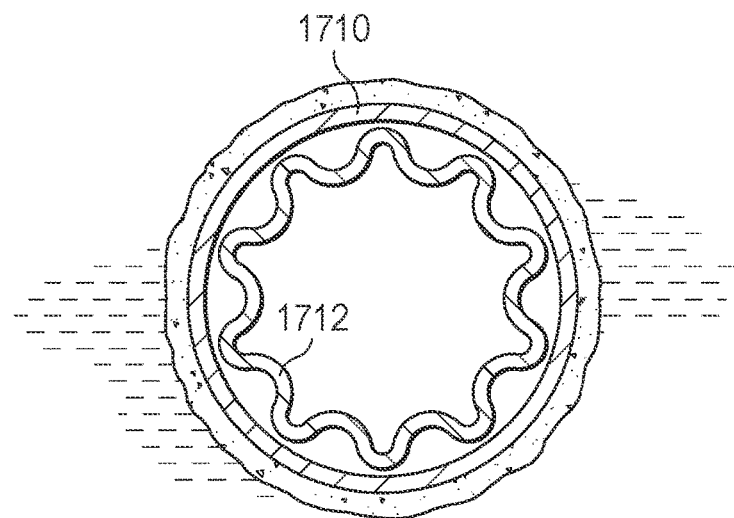
Figure 17C:
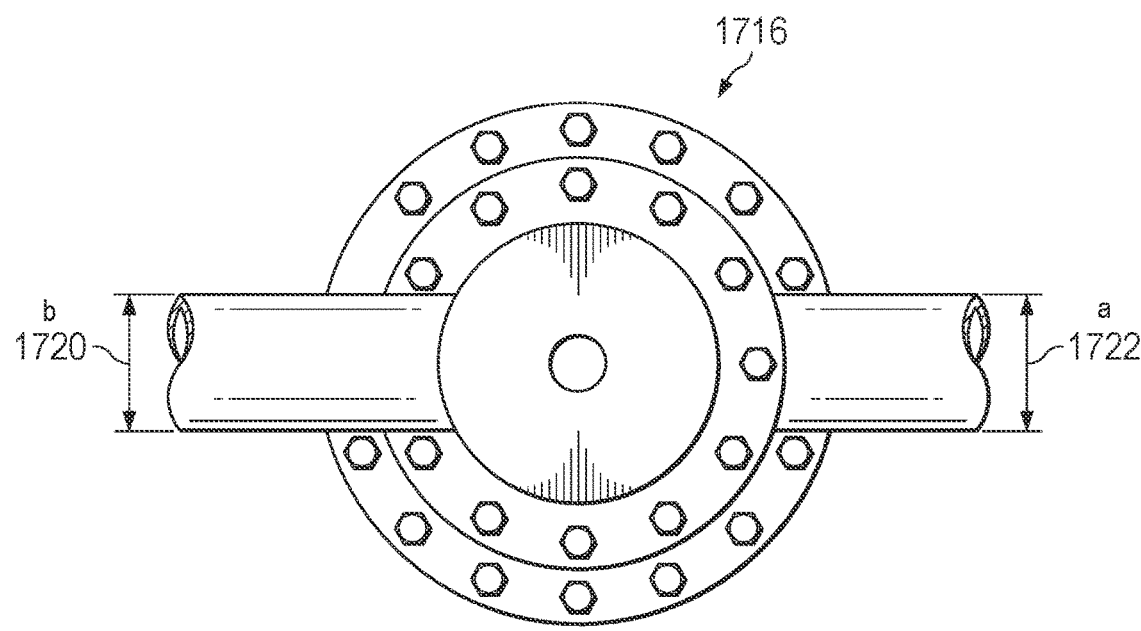

FIGS. 17A-17C are various views of a wellbore for generating superheated steam according to an illustrative embodiment. In particular, FIG. 17A is a cross-sectional view of the wellbore 1700, FIG. 17B is a cross-sectional view of the wellbore 1700 taken along lines 17B-17B in FIG. 17A, and FIG. 17C is a plan view of the top of the wellbore 1700.

The cased wellbore 1700 has a first end 1700a at a surface 207 and a second end 1700b at an underground reservoir of magma 214. The cased wellbore 1700 also includes a fluid pathway 1702 (represented by arrows 1702a) extending from an inlet 1704 at the first end 1700a to the second end 1700b and then from the second end 1700b to an outlet 1706 at the first end 1700a. The fluid pathway 1702 is configured to receive a heat transfer fluid at the inlet 1704 and expel superheated steam from the outlet 1706. Examples of heat transfer fluid include but is not limited to saturated steam. The saturated steam is transformed into superheated steam in the fluid pathway 1702 at the second end 1700b of the cased wellbore 1700. The diameter 1722 of the conduit of inlet fluid pathway 1702 has a value of "a" and the diameter 1720 of the outlet conduit has a value of "b", and the values may be the same or different, i.e., a=b or a≠b. In one or more embodiments of the present disclosure, diameter 1722 (e.g., corresponding to a volume of the inner casing of wellbore 1700) is greater than the diameter 1720 (e.g., corresponding to the volume of the annulus between the inner casing and wall of the wellbore 1700). This difference in diameter and the corresponding difference in volume creates a pressure drop to help drive flow of steam to the surface 207.

In a non-limiting embodiment, the wellbore 1700 has a well casing 1708 that extends from the surface 207 towards the underground reservoir of magma 214, and the fluid pathway 1702 is formed from a set of boiler casings extending through the well casing 1708. The set of boiler casings can include a first boiler casing 1710 defining a first fluid conduit configured to convey the saturated steam from the first end 1700a of the cased wellbore 1700 to the second end 1700b of the cased wellbore 1700. The set of boiler casings can also include a second boiler casing 1712 defining a second fluid conduit configured to convey superheated steam from the second end 1700b of the cased wellbore 1700 to the first end 1700a of the cased wellbore 1700.

In a particular embodiment, the first boiler casing 1710 has a first cross-sectional area and the second boiler casing 1712 has a second cross-sectional area that is less than the first cross-sectional area. The second boiler casing 1712 can be housed substantially co-extensively within the first boiler casing 1710 to form an elongated annular volume of space 1714 between an inner surface of a sidewall of the first boiler casing 1710 and an outer surface of a sidewall of the second boiler casing 1712. In this embodiment, the first fluid conduit is the elongated annular volume of space 1714 the second fluid conduit is an elongated volume of space bounded by the sidewall of the second boiler casing 1712.

In another particular embodiment, the first boiler casing 1710 has a first cross-sectional area and the second boiler casing 1712 has a second cross-sectional area that is greater than the first cross-sectional area. The first boiler casing 1710 can be housed substantially co-extensively within the second boiler casing 1712 to form an elongated annular volume of space 1714 between an inner surface of a sidewall of the second boiler casing 1712 and an outer surface of a sidewall of the first boiler casing 1710. In this embodiment, the first fluid conduit is the elongated annular volume of space 1714, and the second fluid conduit is the elongated volume of space 1714 bounded by the sidewall of the first boiler casing 1710.

The cased wellbore 1700 can be sealed at its upper end by a wellhead 1716. The wellhead 1716 can include a first connector 1716a configured to fluidically connect the inlet 1704 of the fluid pathway to a source of the saturated steam, e.g., cased wellbore 600 in FIG. 16, and a second connector 1716b configured to fluidically connect the outlet 1706 of the fluid pathway to a system for generating power from superheated steam.

In a non-limiting embodiment, a sidewall of the inner boiler casing 1712 is corrugated at an end closest to the second end 1700b of the cased wellbore 1700 to increase heat transfer, as can be seen in FIG. 17B. In this non-limiting embodiment, the sidewall of the inner boiler casing is non-corrugated at an end closest to the first end 1700a of the cased wellbore 1700. To further prevent heat transfer at the first end 1700a of the cased wellbore 1700, an insulation layer 1718 can be disposed around the outer boiler casing 1710 at the first end 1700a.

Figure 18:
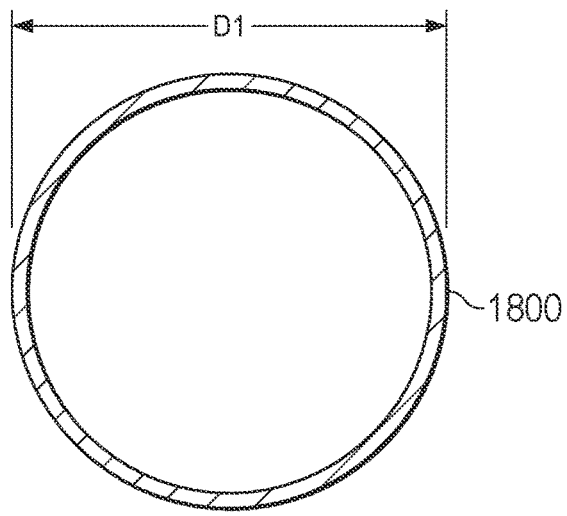
FIG. 18 is a cross-section view of a boiler casing for use in the downstream wellbore of FIG. 17A, according to an illustrative embodiment.
Figure 19A:
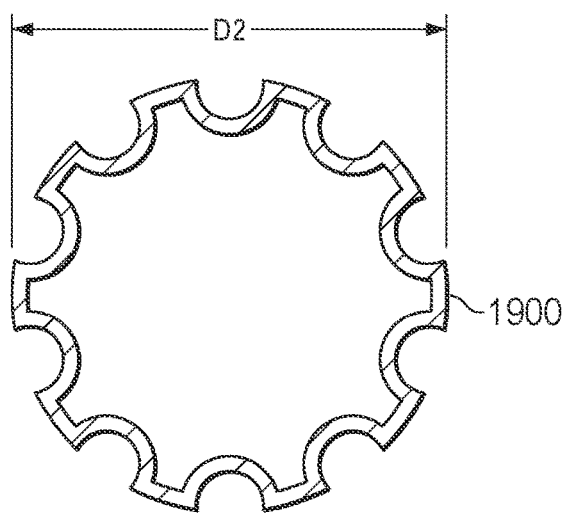
FIGS. 19A-19B are various views of another boiler casing for use in the downstream wellbore of FIG. 17A, according to an illustrative embodiment.
Figure 19B:
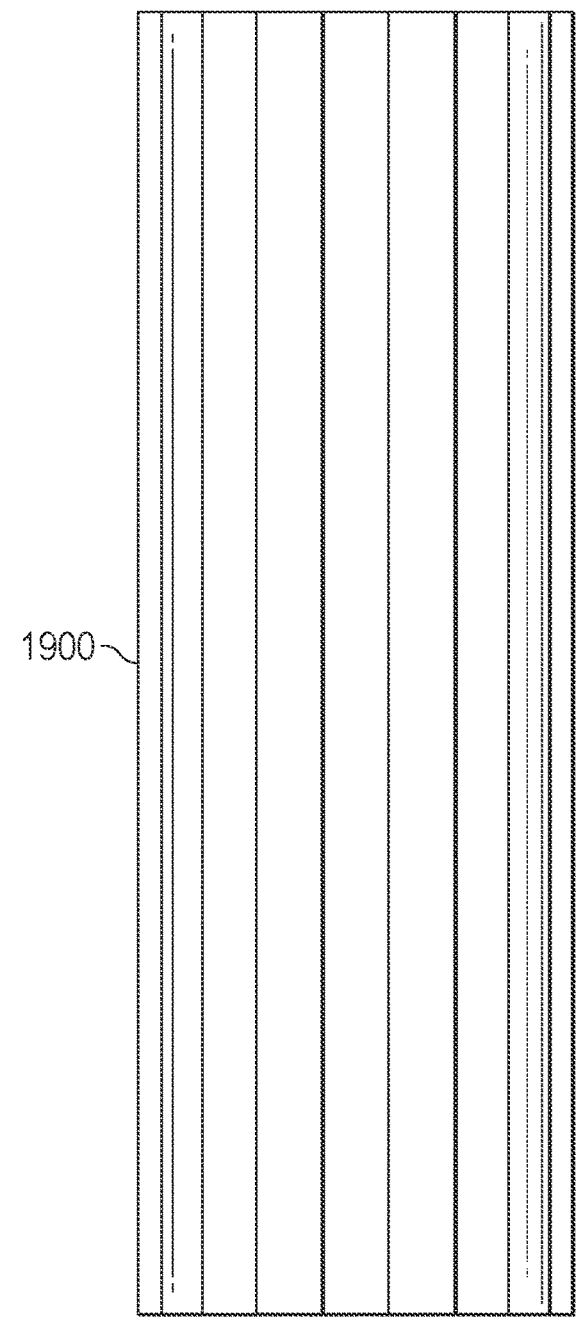

FIG. 18 is a cross-section view of a boiler casing for use in the downstream wellbore of FIG. 17A and FIGS. 19A-19B are various views of another boiler casing for use in the downstream wellbore of FIG. 17A, according to an illustrative embodiment. The boiler casing 1800 has a smooth surface and a cross-sectional area based on dimension D1. The boiler casing 1800 can envelop the corrugated boiler casing 1900 shown in FIGS. 19A and 19B, which has a cross-sectional area based on dimension D2, where D1 is greater than D2. The corrugated surface of the boiler casing 1900 increases surface area for heat transfer.

The rate of heat transfer through a material due to the changed temperature in one dimensional conduction can be expressed by Fourier's law:

$$Q_k = -KA\, dT/dx, \text{ where:}$$

$Q_k$=Rate of heat transfer by conduction
A=The area normal to the direction of flow
T=Temperature
X=Distance along the direction of heat flow
K=The thermal conductivity of the material
dT/dx=Temperature gradient The minus sign in the equation is an indication that heat flow is in the direction of decreasing temperature. However, given that intrusive rock layer will likely form against the sides of the outer conductor casing soon after installation, two heat transfer gradients will need to be accounted for, i.e., one through intrusive rock and the other through the metal casing.

Figure 20:
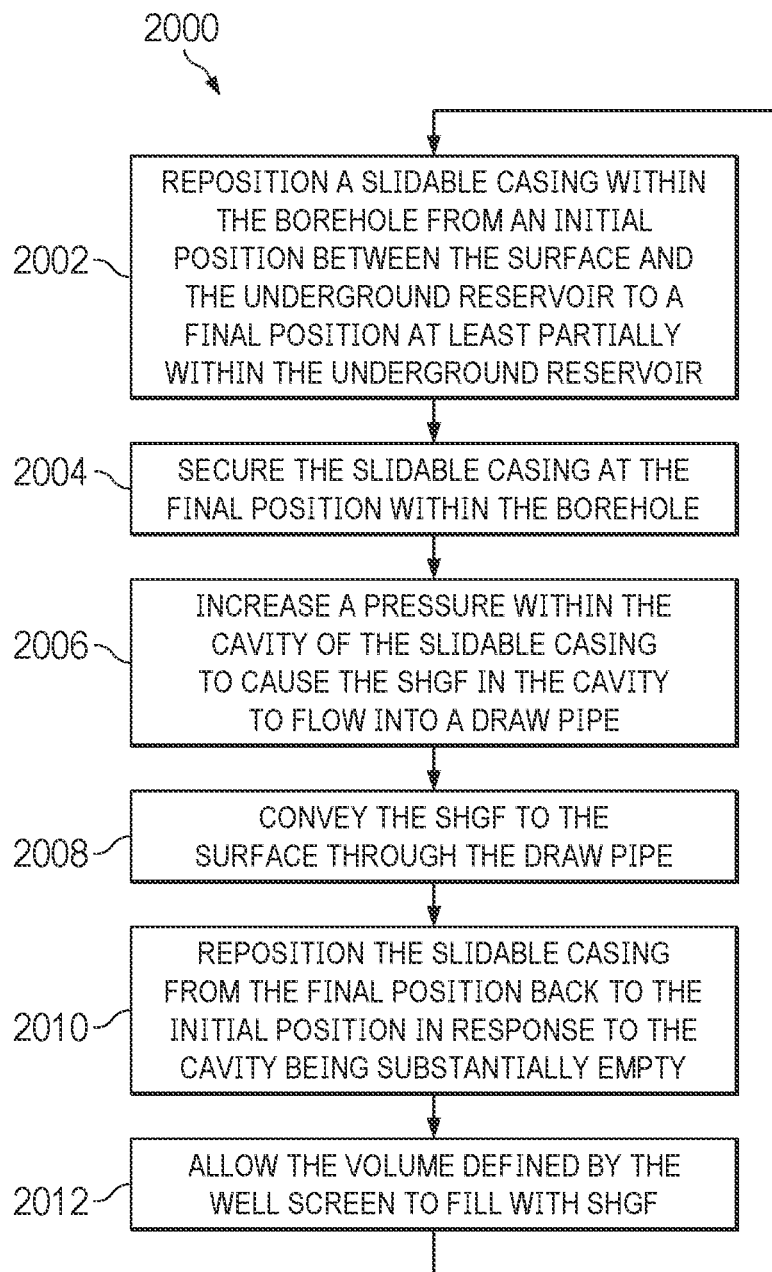
FIG. 20 is a flowchart of a method for pumping super-hot geothermal fluid (SHGF) through a cased wellbore according to an illustrative embodiment.

FIG. 20 is a flowchart of a method for pumping super-hot geothermal fluid (SHGF) through a cased wellbore according to an illustrative embodiment. Flowchart 2000 can be implemented in a cased wellbore 400 in FIG. 4, which extends from a surface of the Earth to an underground reservoir of magma.

Flowchart 2000 begins at step 2002 by repositioning a slidable casing within the borehole from an initial position between the surface and the underground reservoir to a final position at least partially within the underground reservoir. In a non-limiting embodiment, the slidable casing has an opening at a first end that leads into a cavity bounded by a sidewall and an end wall at a second end, and the slidable casing is aligned coaxially with a well screen at an end of a casing string and at least partially submerged within the underground reservoir. Additionally, the well casing includes a set of apertures permitting SHGF to flow into a volume defined by the well screen. At the final position, the cavity of the slidable casing substantially coincides with the volume defined by the well screen to prevent flow of SHGF through the set of apertures, and the cavity is filled with the SHGF from the volume defined by the well screen.

In step 2004, the slidable casing is secured at the final position within the borehole. Securing the slidable casing can include sealing the cavity by actuating a set of adjustable apertures. In an embodiment where the set of adjustable apertures is one or more pneumatically-operated pipe collar seals, sealing the cavity can include sealing the one or more pneumatically-operated pipe collar seals around a fluid conduit passing through the set of adjustable apertures.

In step 2006, a pressure within the cavity of the slidable casing is increased to cause the SHGF in the cavity to flow into a draw pipe extending through the end wall of the slidable casing and into the cavity. The pressure within the cavity can be increased by providing a compressed fluid into the cavity of the slidable casing. In an embodiment where the compressed fluid is compressed air, the compressed air can be provided by conveying the compressed air through an inlet pipe passing through the end wall of the cavity of the slidable casing. Additionally, the conveying compressed air through the inlet pipe can include the additional step of closing a pressure control valve disposed in the end wall of the slidable casing.

In step 2008 the SHGF is conveyed to the surface through the draw pipe.

In Step 2010, the slidable casing is repositioned from the final position back to the initial position in response the cavity being substantially empty of SHGF. In a non-limiting embodiment, the slidable casing is repositioned from the final position to the initial position after reducing a pressure within the cavity of the slidable casing before sliding the slidable casing. The pressure can be reduced by opening a pressure control valve and/or expanding one of a set of adjustable apertures disposed in the end wall of the slidable casing.

Then in step 2012, the volume defined by the well screen is allowed to fill with SHGF. Once filled, flowchart 2000 returns to step 2002 to allow another aliquot of SHGF to be conveyed to the surface.

In flowchart 2000, repositioning the slidable casing can be achieved by actuating a hydraulic ram and/or a winch coupled to the slidable casing.

Figure 21:
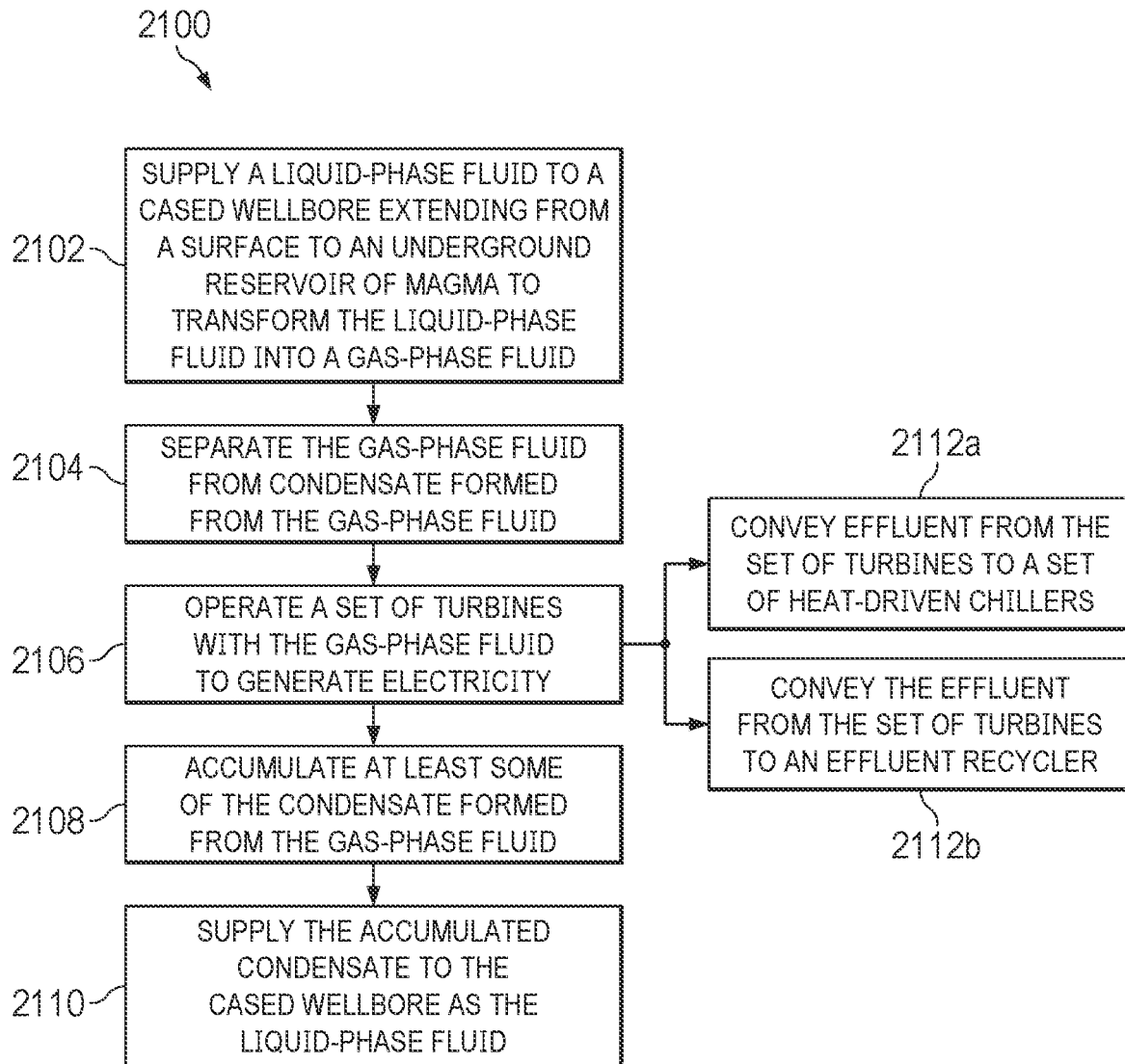
FIG. 21 is a flowchart of a method for generating power with a magma system according to an illustrative embodiment.

FIG. 21 is a flowchart of a method for generating power with a magma system according to an illustrative embodiment. Steps in flowchart 2100 can be implemented in a geothermal power plant, such as geothermal power plant 200c in FIG. 2C.

Flowchart 2100 begins at step 2102 by supplying a liquid-phase fluid to a cased wellbore extending from a surface to an underground reservoir of magma. Heat supplied from the magma causes the liquid-phase fluid to change into a gas-phase fluid conveyed up the cased wellbore and to the surface.

In step 2104, the gas-phase fluid is separated from condensate formed from the gas-phase fluid.

In step 2106, a set of turbines is operated with the gas-phase fluid to generate electricity. In an embodiment in which the set of turbines includes at least two turbines arranged in series, step 2106 can include the further steps of operating an upstream turbine with the gas-phase fluid at a first pressure, then operating a downstream turbine with the gas-phase fluid received from the upstream turbine, then accumulating at least some condensate from the upstream turbine and the downstream turbine for supplying to the cased wellbore. The downstream turbine can be operated at a second pressure that is less than the first pressure.

In step 2108, at least some of the condensate formed from the gas-phase fluid is accumulated.

In Step 2110, the accumulated condensate is supplied as the liquid-phase fluid to the cased wellbore.

The effluent from the set of turbines can still have enough heat and pressure for power additional equipment. Thus, flowchart 2100 can include an optional step 2112a of conveying the effluent from the set of turbines to a set of heat-driven chillers configured to provide air conditioning. The set of heat-driven chillers can be used to cool computing equipment, such as server rooms or even bitcoin mining operations.

Flowchart 2100 can also include the optional step 2112b of conveying the effluent from the set of turbines to an effluent recycler. The effluent recycler comprises one or more of a water distillation system, a heat driven chilling apparatus, a residential heating system, an agriculture system, and an aquaculture system.

FIG. 22 is a flowchart of a method for forming a cased wellbore according to an illustrative embodiment. The steps of flowchart 2200 can be carried out to form the cased wellbore 600 in FIG. 6, which extends from a surface to an underground reservoir of magma Flowchart 2200 begins at step 2202 by drilling a wellbore from the surface towards the underground reservoir of magma. The wellbore can be drilled from the surface to a target depth.

In step 2204, a well casing is hung in the wellbore. In a non-limiting embodiment, the wellbore is drilled from the surface towards the underground reservoir of magma with a drill bit disposed at the end of a drill stem that is continually elongated as the drill bit proceeds towards the underground reservoir. In this non limiting embodiment, the well casing is coupled to an underreamer positioned at a terminal region of the drill stem so that the well casing is elongated as the drill stem is elongated. Thus, hanging the well casing can include the step of conveying the well casing into the wellbore while advancing the drill bit towards the underground reservoir In step 2206, a boiler casing is hanged within the well casing in response to the wellbore reaching a target depth.

In 2208, drilling of the wellbore is resumed to extend the wellbore from the target depth to a final depth within the underground reservoir of magma. The boiler casing extends from the surface to the final depth within the underground reservoir to form the cased wellbore.

FIG. 23 is a flowchart of a method for hanging a boiler casing according to an illustrative embodiment. The steps of flow chart 2300 can be implemented in step 2206 of Flowchart 2200.

Flowchart 2300 begins at step 2302 by retracting the underreamer to release the well casing.

In step 2304, the drill stem and the first drill bit attached to a terminal end of the drill stem is withdrawn.

In step 2306, the boiler casing is inserted into the well casing housed within the wellbore.

FIG. 24 is a flowchart of a method for inserting a boiler casing into a well casing housed within a wellbore according to an illustrative embodiment. The steps of flowchart 2400 can be implemented in step 2306 of flowchart 2300.

In step 2402, the boiler casing can be inserted into the well casing by sealing the terminal end of the boiler casing with an end plate having an aperture sized to receive a drill stem.

In step 2404, a drill stem is welded to the end plate around a circumference of the aperture.

In step 2406, a sacrificial bit is coupled to the drill stem.

In step 2408, the terminal end of the boiler casing is conveyed into the well casing.

Figure 25:
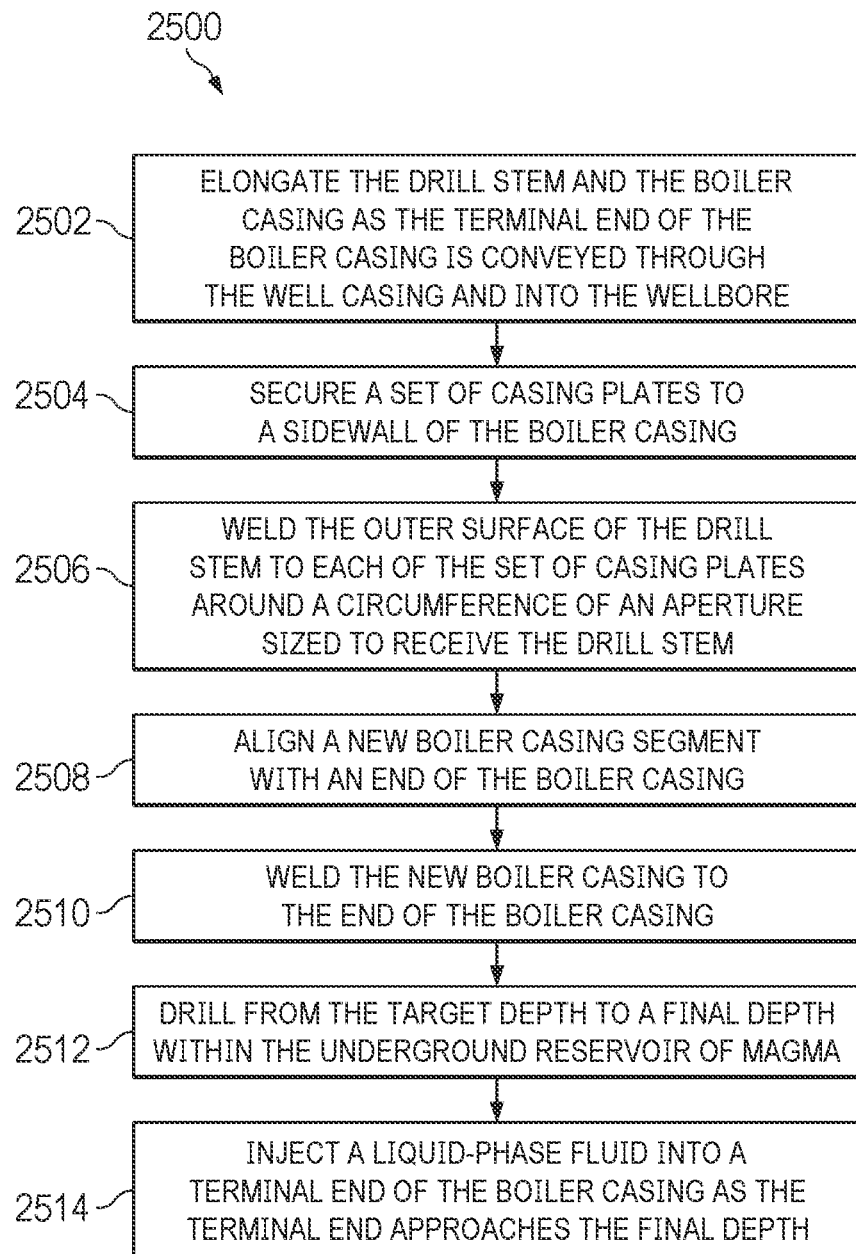
FIG. 25 is a flowchart of a method for conveying a boiler casing through a well casing and into a wellbore according to an illustrative embodiment.

FIG. 25 is a flowchart of a method for conveying a boiler casing through a well casing and into a wellbore according to an illustrative embodiment. The steps of flow chart 2500 can be implemented in step 2408 in flowchart 2400.

Flowchart 2500 begins in step 2502 by elongating the drill stem and the boiler casing as the terminal end of the boiler casing is conveyed into the well casing. The drill stem and the boiler casing are elongated from an opposite end of the boiler from the terminal end of the boiler casing.

In step 2504, the drill stem and the boiler casing can be elongated by securing a set of casing plates to a sidewall of the boiler casing and, in step 2506, an outer surface of the drill stem is welded to each of the set of casing plates around a circumference of an aperture sized to receive the drill stem.

In step 2508, the boiler casing can be elongated by aligning a new boiler casing segment with an end of the boiler casing, and then welding the new boiler casing segment to the end of the boiler casing in step 2510.

In step 2512, the boiler casing is elongated by drilling, with a sacrificial bit, from the target depth to the final depth until the sacrificial bit is submerged within the underground reservoir of magma at the final depth. Water and air pressure from the sacrificial bit will rapidly cool the magma to a solidus phase-like state allowing the sacrificial bit to cut and clear the solidus to the annular void space between for extraction at the surface.

In step 2514, a liquid-phase fluid is injected into a terminal end of the boiler casing as the terminal end of the boiler casing approaches the final depth.

Figure 26:
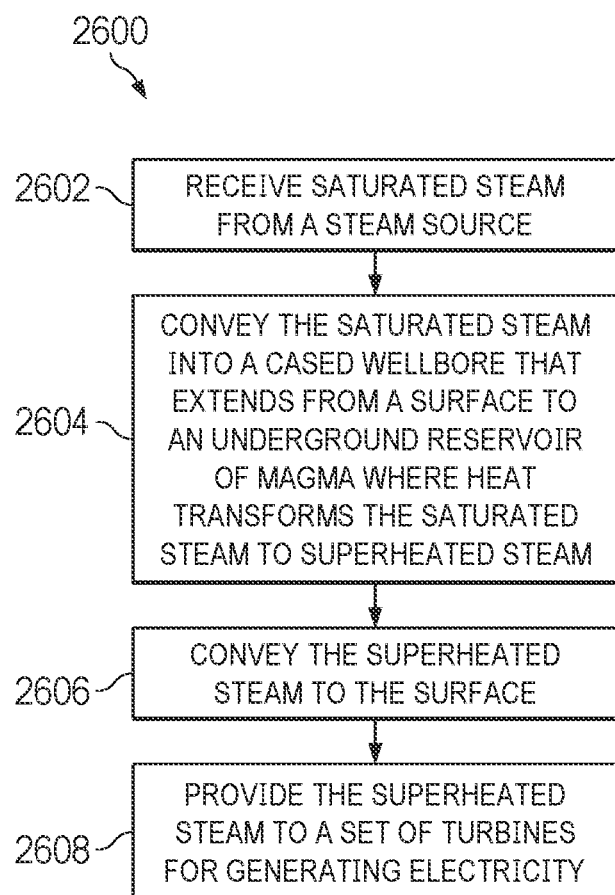
FIG. 26 is a flowchart for generating superheated steam according to an illustrative embodiment.

FIG. 26 is a flowchart of a method for generating superheated steam according to an illustrative embodiment. The steps of flowchart 2300 can be implemented in a system for generating superheated steam, such a steam system 1600 in FIG. 16.

Flowchart 2600 begins at step 2602 by receiving saturated steam from a steam source. The steam source can be an upstream wellbore extending from the surface to the underground reservoir of magma or another underground reservoir of magma, such as wellbore 600 in FIG. 6.

In step 2604, the saturated steam is conveyed into a cased wellbore that extends from a surface to an underground reservoir of magma to expose the saturated steam to heat from the underground reservoir of magma. The heat from the underground reservoir of magma converts the saturated steam to the superheated steam. In a non-limiting embodiment, the saturated steam is conveyed though an annular volume between an outer boiler casing and an inner boiler casing that is housed within the outer boiler casing. In this non-limiting embodiment, the outer boiler casing is at least partially exposed to magma in the underground reservoir, and a portion of a sidewall of the inner boiler casing is corrugated at an end closest to the underground reservoir of magma, and another portion of the sidewall of the inner boiler casing is non-corrugated at an end closest to the surface.

In step 2606, the superheated steam is conveyed back towards the surface.

In an optional step 2608, the superheated steam is provided to a set of turbines for generating electricity.

Figure 27A:
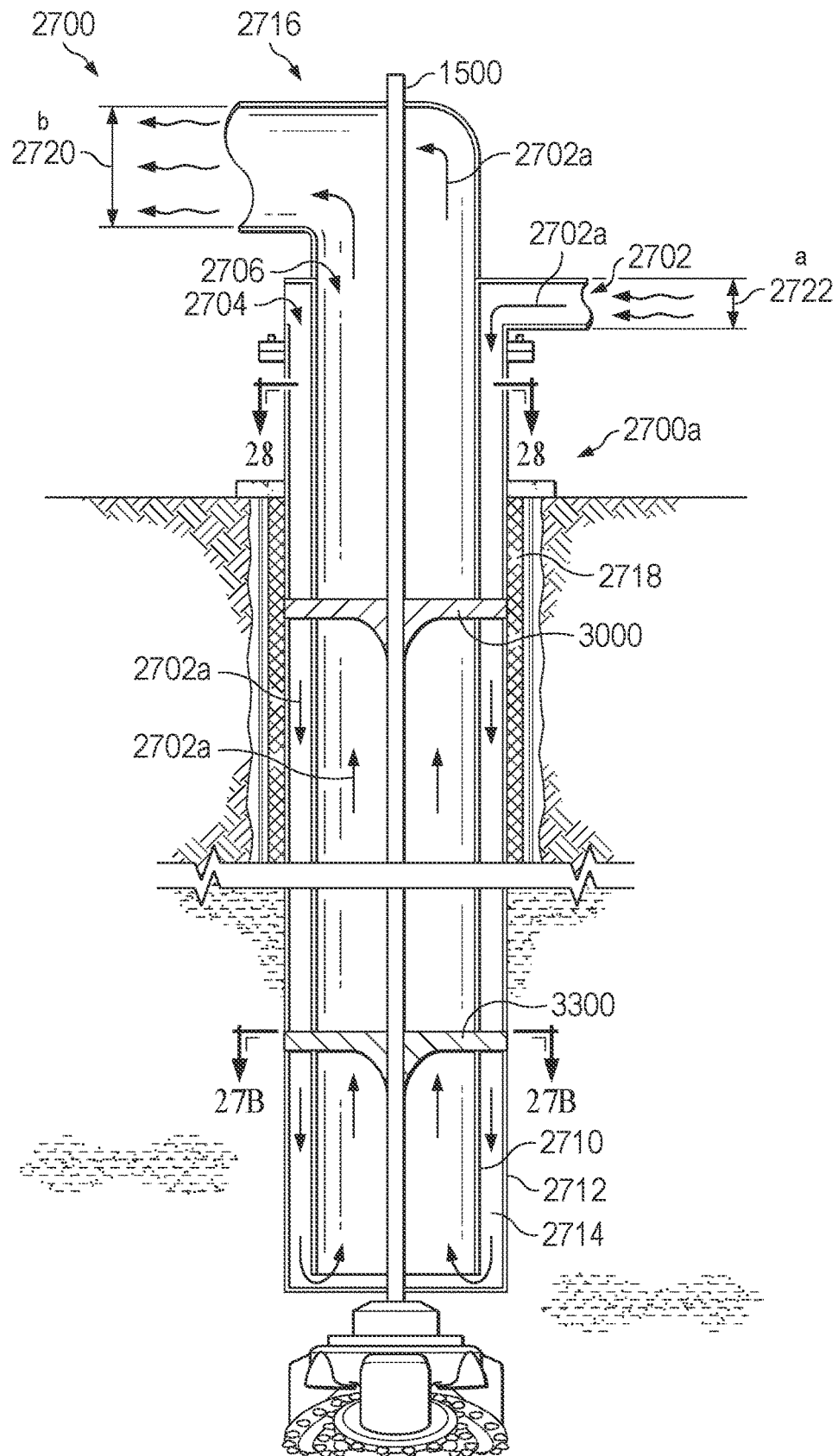
FIGS. 27A-27C are various views of a wellbore for generating superheated steam according to another illustrative embodiment.
Figure 27B:
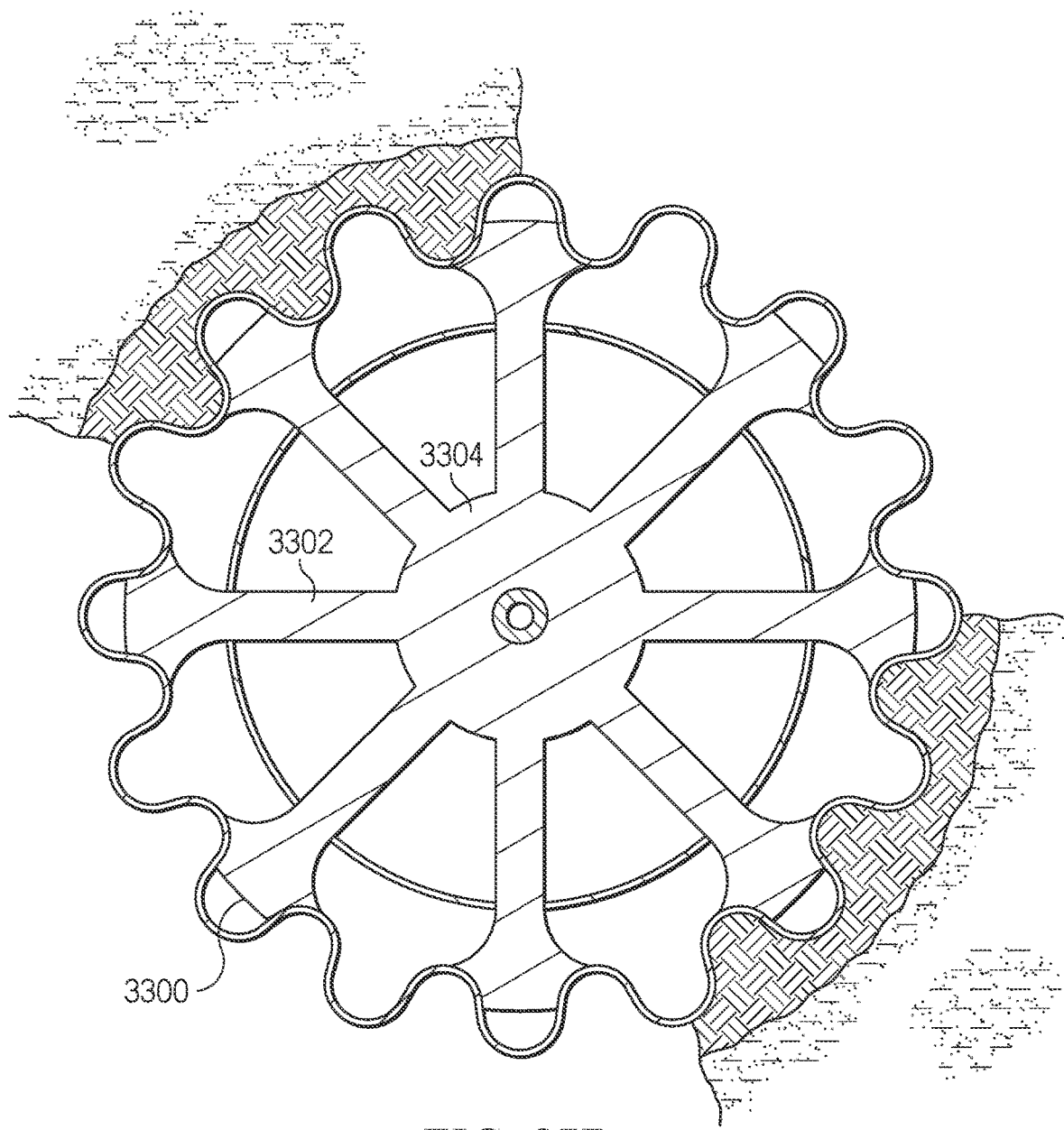
Figure 27C:
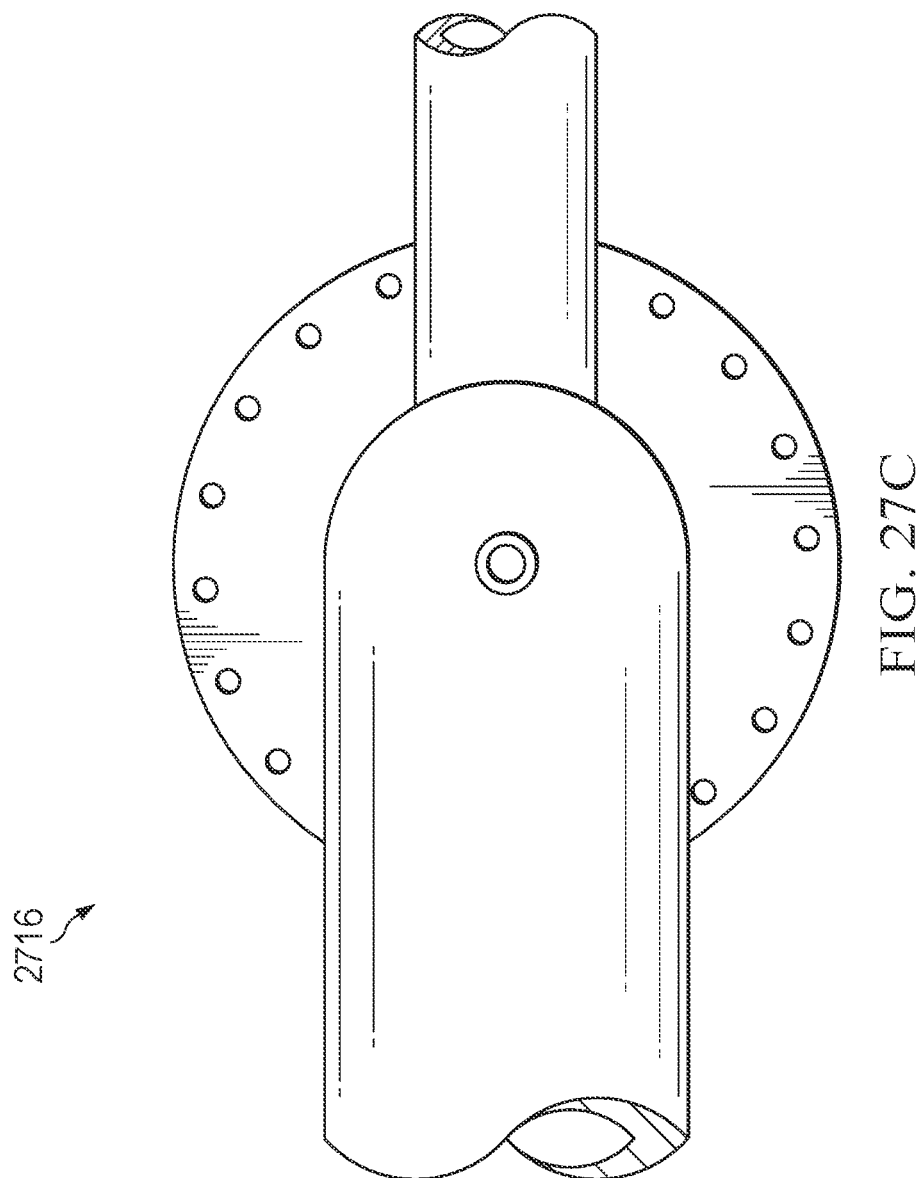

FIGS. 27A-27C are various views of a wellbore for generating superheated steam according to another illustrative embodiment. In particular, FIG. 27A is a cross-sectional view of the wellbore 2700, FIG. 27B is a cross-sectional view of the wellbore 2700 in FIG. 27A, taken along lines 27B-27B, and FIG. 27C is a plan view of the top of the wellbore 2700, i.e., of the wellhead.

The cased wellbore 2700 has a first end 2700a at a surface 207 and a second end 2700b at an underground reservoir of magma 214. The cased wellbore 2700 also includes a fluid pathway 2702 (represented by arrows 2702a) extending from an inlet 2704 at the first end 2700a to the second end 2700b and then from the second end 2700b to an outlet 2706 at the first end 2700a. The fluid pathway 2702 is configured to receive saturated steam at the inlet 2704 and expel superheated steam from the outlet 2706. The saturated steam is transformed into superheated steam in the fluid pathway 2702 at the second end 2700b of the cased wellbore 2700.

In one or more embodiments of the present disclosure, the diameter 2720 (e.g., corresponding to the volume of the outlet fluid conduit) is greater than the diameter 2722 (e.g., corresponding to the volume of annulus between the casing and wall of the wellbore 2700). This difference in diameter and the corresponding difference in volume creates a pressure drop to help drive flow of steam through the wellbore 2700.

In a non-limiting embodiment, the wellbore 2700 has a well casing 2708 that extends from the surface 207 towards the underground reservoir of magma 214, and the fluid pathway 2702 is formed from a set of boiler casings extending through the well casing 2708. The set of boiler casings can include a first boiler casing 2710 defining a first fluid conduit configured to convey the saturated steam from the first end 2700a of the cased wellbore 2700 to the second end 2700b of the cased wellbore 2700. The set of boiler casings can also include a second boiler casing 2712 defining a second fluid conduit configured to convey superheated steam from the second end 2700b of the cased wellbore 2700 to the first end 2700a of the cased wellbore 2700.

In a particular embodiment, the first boiler casing 2710 has a first cross-sectional area and the second boiler casing 2712 has a second cross-sectional area that is less than the first cross-sectional area. The second boiler casing 2712 can be housed substantially co-extensively within the first boiler casing 2710 to form an elongated annular volume of space 2714 between an inner surface of a sidewall of the first boiler casing 2710 and an outer surface of a sidewall of the second boiler casing 2712. In this embodiment, the first fluid conduit is the elongated annular volume of space 2714 the second fluid conduit is an elongated volume of space bounded by the sidewall of the second boiler casing 2712.

In another particular embodiment, the first boiler casing 2710 has a first cross-sectional area and the second boiler casing 2712 has a second cross-sectional area that is greater than the first cross-sectional area. The first boiler casing 2710 can be housed substantially co-extensively within the second boiler casing 2712 to form an elongated annular volume of space 2714 between an inner surface of a sidewall of the second boiler casing 2712 and an outer surface of a sidewall of the first boiler casing 2710. In this embodiment, the first fluid conduit is the elongated annular volume of space 2714, and the second fluid conduit is the elongated volume of space 2714 bounded by the sidewall of the first boiler casing 2710.

The cased wellbore 2700 can be sealed at its upper end by a wellhead 2716. The wellhead 2716 can include a first connector 2716a configured to the wellhead 2716 to an opposing connector of the wellbore 2700. The wellhead 2716 can receive saturated steam from a cased wellbore, such as wellbore 600 in FIG. 16, and provide superheated steam to a system for generating power from the superheated steam, such as plant 1602 in FIG. 16.

In a non-limiting embodiment, a sidewall of the outer boiler casing 2712 is corrugated at an end closest to the second end 2700b of the cased wellbore 2700 to increase heat transfer from the magma. In this non-limiting embodiment, the sidewall of the outer boiler casing 2712 is non-corrugated at the end closest to the first end 2700a of the cased wellbore 2700. The sidewall of the inner boiler casing 2710 is non-corrugated throughout a length of the wellbore 2700. To further prevent heat transfer at the first end 2700a of the cased wellbore 2700, an insulation layer 2718 can be disposed around the outer boiler casing 2710 at the first end 2700a.

Structural rigidity can be provided to the wellbore 2700 by a set of casing plates. In this illustrative embodiment, the wellbore 2700 includes at least two casing plates 3000, shown in more detail in FIG. 30, and 3300 but can include more than two disposed throughout a length of the wellbore 2700. For example, the casing plates 3000 and/or 3300 can be installed at predetermined intervals to provide the necessary support and/or rigidity, e.g., at every interface between boiler casing segments, at every other interface between boiler casing segment, or some other interval.

The cross-sectional view in FIG. 27B depicts a plan view of the casing plate 3300, which can be seen from a cross-sectional view of the wellbore 2700 taken along line 27B-27B of FIG. 27A. The casing plate 3300 has eight arms 3302 that extend radially outward from a central body 3304. In this illustrative embodiment, the central body 3304 has a generally conical form that defines a tube-shaped bore configured to receive the drill stem 1500 that drives the sacrificial bit 1400. The arms 3302 of the casing plate 3300 connect the inner boiler casing 2710 and the outer boiler casing 2712 to provide support and/or rigidity. The casing plate 3300 can be welded to the inner and outer boiler casings 2710 and 2712 as shown in more detail in FIG. 32.

Figure 28A:
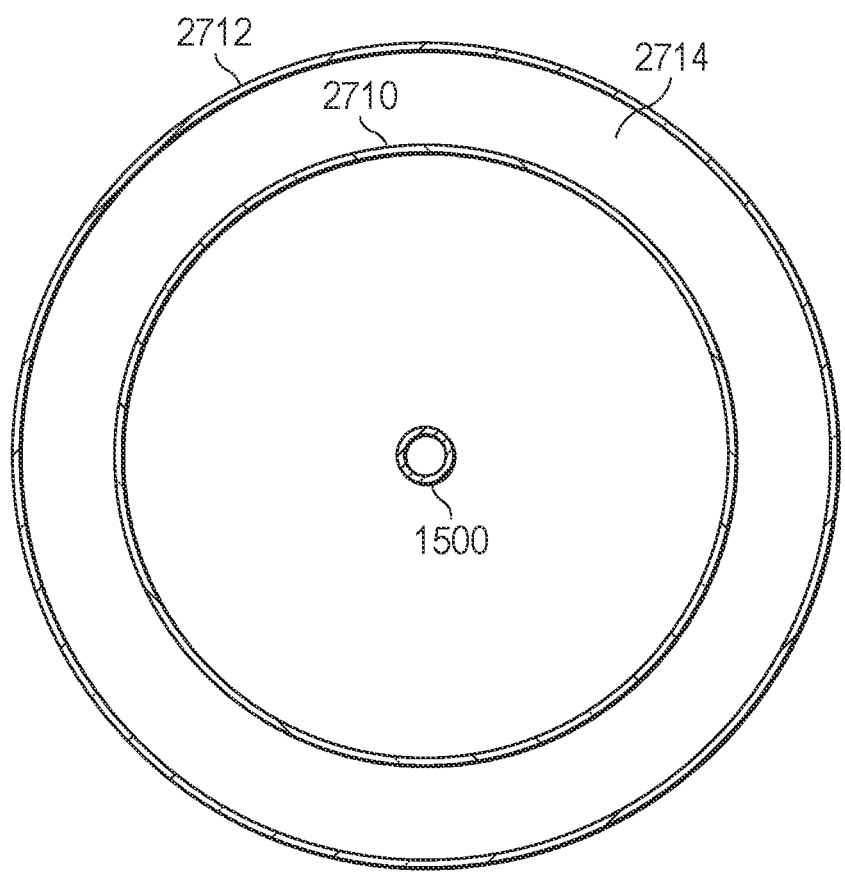
FIGS. 28A-28C are various views of the boiler casing of the wellbore 2700 according to an illustrative embodiment.
Figure 28B:
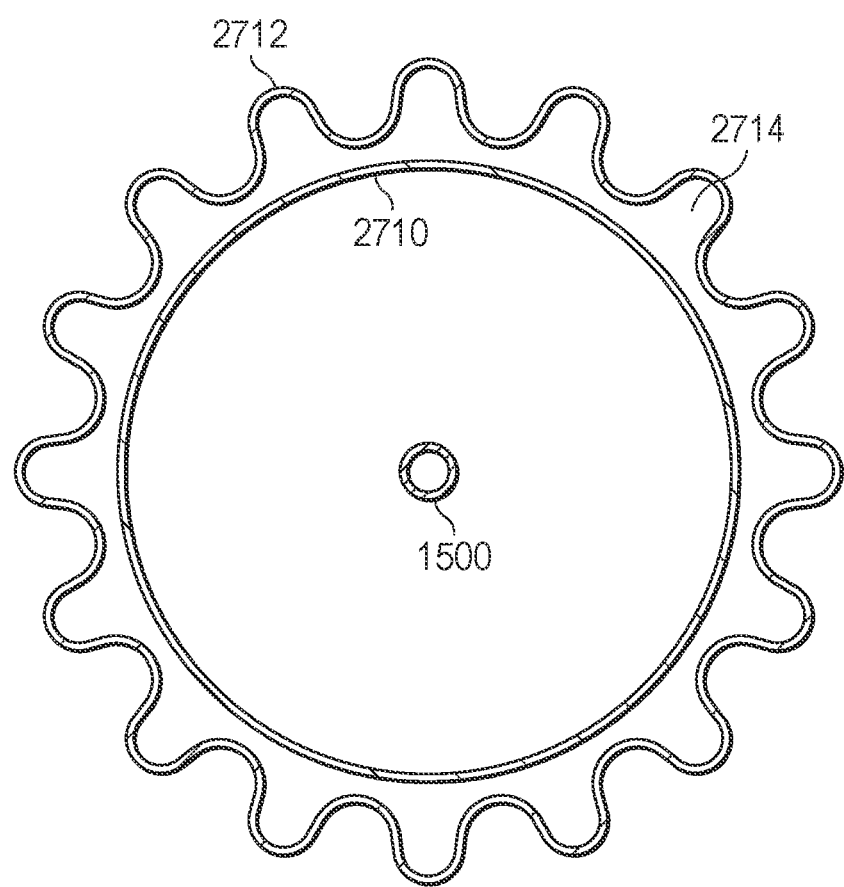
Figure 28C:
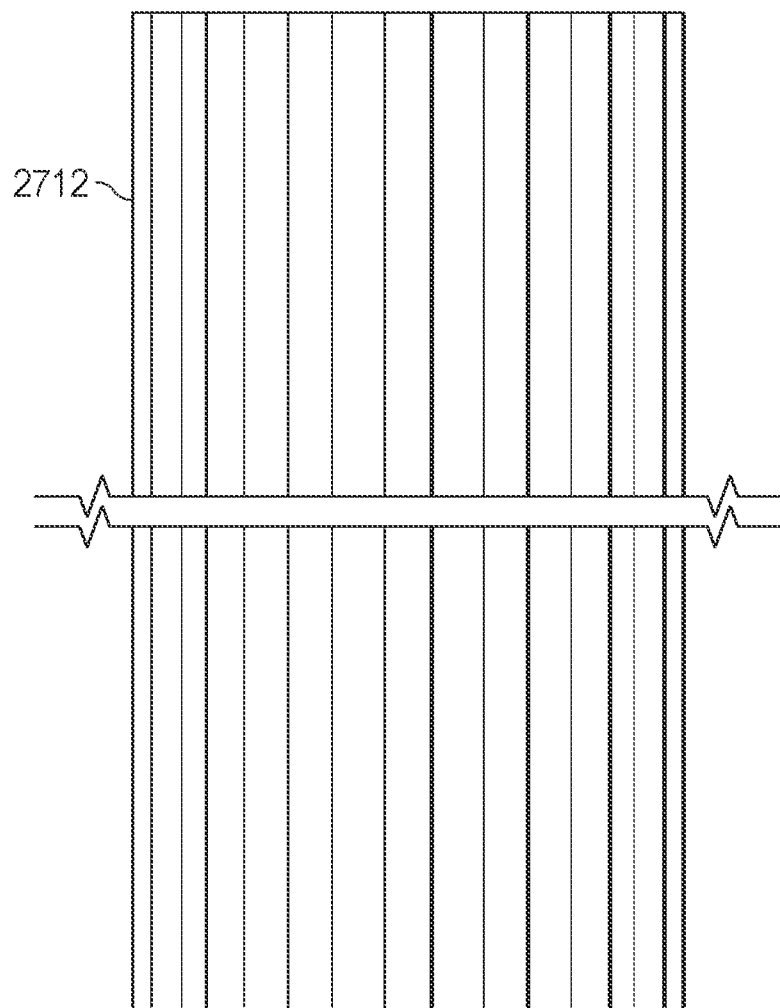

FIGS. 28A-28C are various views of the boiler casing of the wellbore 2700 according to an illustrative embodiment. FIG. 28A depicts a cross-sectional view the set of boiler casings at the upper portion of the wellbore 2700. The cross-sectional view is taken along line 28A-28A in FIG. 27. As can be seen, the arrangement of the first boiler casing 2710 and the second boiler casing 2712 forms a fluid pathway for superheated steam with a circular cross-section and a fluid pathway for saturated steam with an annular cross-section. The sidewalls of the first boiler casing 2710 and the second boiler casing 2712 are smooth.

FIG. 28B is a cross-sectional view of the set of boiler casings used in the lower portion of the wellbore 2700. The cross-sectional view is taken along line 28B-28B in FIG. 27. The arrangement of the first boiler casing 2710 and the second boiler casing 2712 forms a fluid pathway for superheated steam with a circular cross-section and a fluid pathway for saturated steam with a generally annular cross-section. The sidewall of the first boiler casing 2710 is smooth and the sidewall of the second boiler casing 2712 is corrugated. FIG. 28C depicts an elevation view of boiler casings shown in FIG. 28B.

The boiler casings of the wellbore 2700 can be formed from standard carbon steel and offered in 20' or 40' lengths, varying diameters, and varying thicknesses. The boiler casing segments can be secured together by threaded interfaces or welded joints. The corrugations on the second boiler casing 2712 increase the area for heat exchange by up to about 57%. Corrugated boiler casing at the lower end of the wellbore 2700 increases the rate of heat exchange from the magma reservoir so that saturated steam can be converted to superheated steam. The superheated steam can be conveyed upwardly back to the surface via the portion of the fluid pathway in the first boiler casing 2710.

Figure 29:
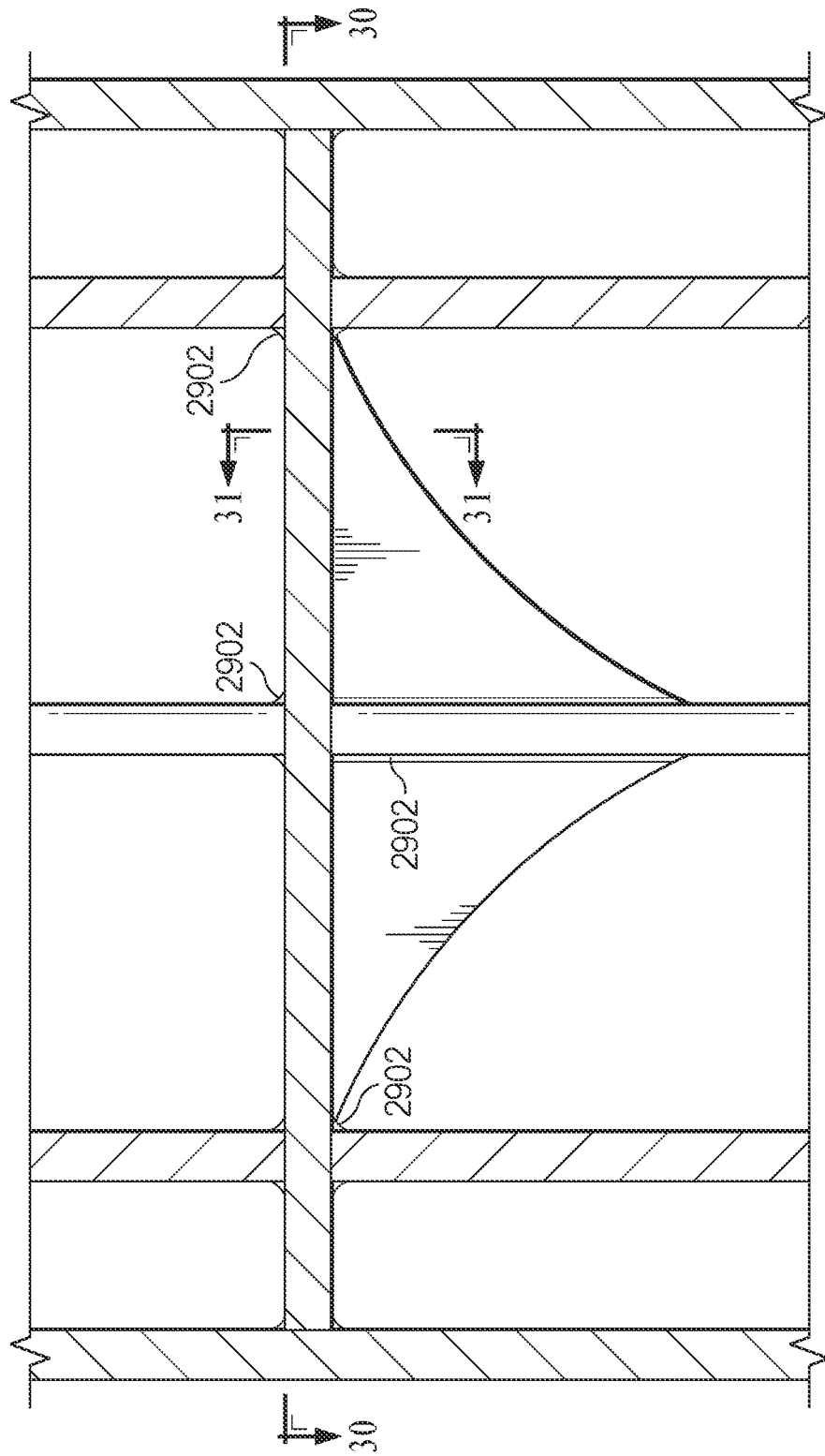
FIG. 29 provides a more detailed view of a casing plate installed in the upper portion of a wellbore according to an illustrative embodiment.
Figure 30:
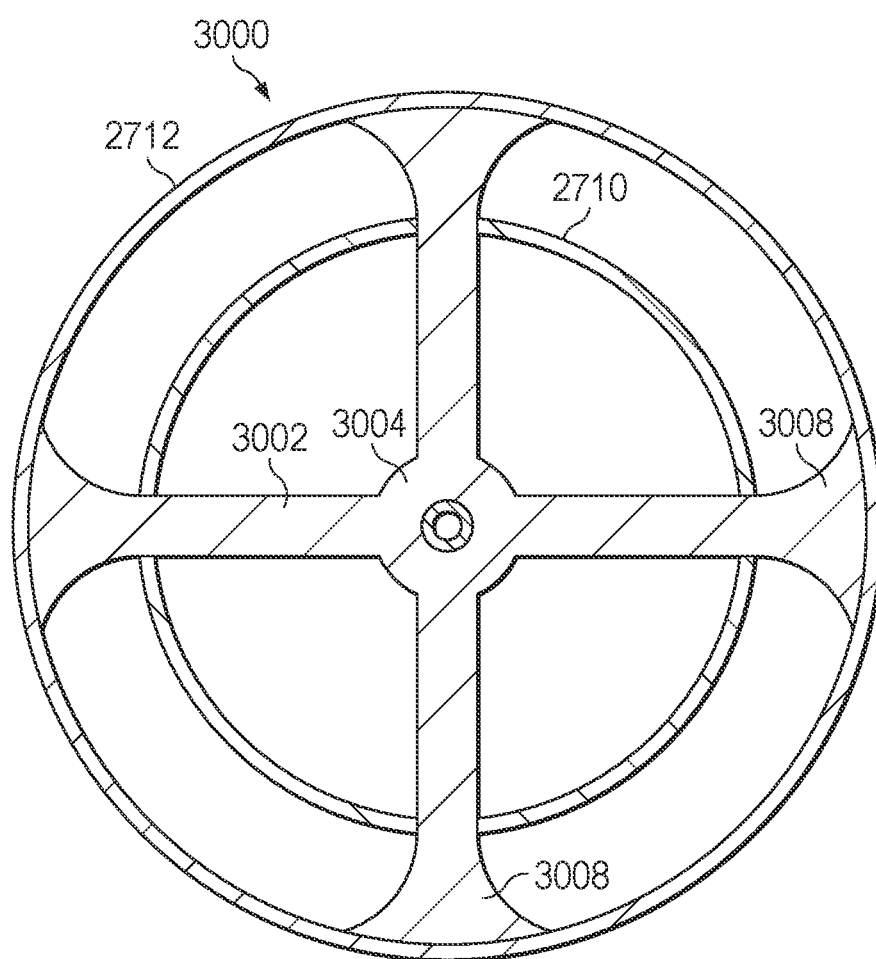
FIG. 30 shows a plan view of the casing plate of FIG. 29.

FIGS. 29 and 30 show differing views of a casing plate installed in the upper portion of a wellbore according to an illustrative embodiment. In particular, FIG. 29 depicts a more detailed view of the casing plate 3000 installed in the upper portion of the wellbore 2700 shown in FIG. 27 and FIG. 30 shows a plan view of the casing plate 3000 taken from line 30-30 in FIG. 29.

The exemplary casing plate 3000 has four arms 3002 extending from a central body region 3004. The central body region 3004 includes a bore that is configured to receive the drill stem 1500. The arms 3002 connect the first boiler casing 2710 with the second boiler casing 2712. The casing plate 3000 can be secured in the wellbore 2700 by conventional means, such as welding. Exemplary weld locations 2902 are identified in FIG. 29.

The shape of arms 3002 of the casing plate 3000 provide the necessary strength without obstructing the steam passing through the fluid pathway 2702. For example, each arm 3002 has a radial length that extends from the central body region 3004 to the second boiler casing 2712. The casing plate 3000 secures the drill stem 1500 with the first boiler casing 2710 and the second boiler casing 2712. A portion of each arm 3002 can have a generally pentagonal cross-sectional shape, as can be seen from FIG. 31, which is a cross-sectional view taken along line 31-31 from FIG. 29. The leading edge 3006 of each arm 3002 is shaped to reduce the amount of resistance to fluid flow past each arm 3002 by superheated steam. In this illustrative embodiment, cross-sectional area of the arm 3002 increases in size as the arm progresses from the inter boiler casing 2710 towards the drill stem 1500 to provide increased surface area for welds 2902 along the drill stem 1500. Likewise, each arm 3002 is terminated by a flared tip 3008 that provides increased surface area for welds 2902 against the second boiler casing 2712.

Figure 32:
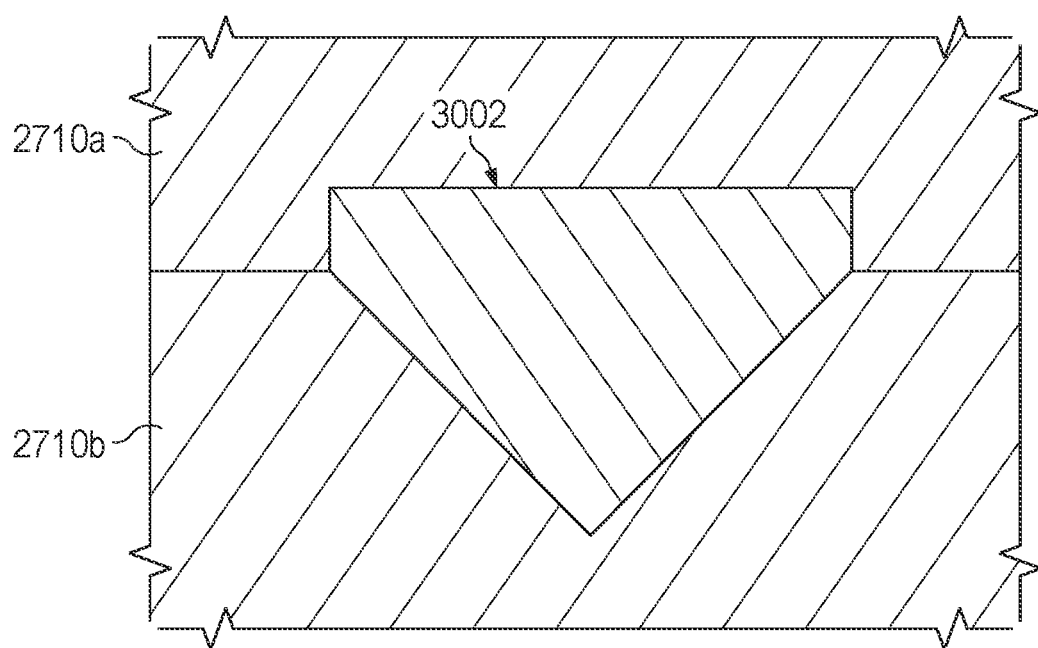
FIG. 32 is cross-sectional view of an arm of a casing plate installed between two segments of boiler casing according to an illustrative embodiment.

FIG. 32 is cross-sectional view of an arm of a casing plate installed between two segments of boiler casing according to an illustrative embodiment. In particular, the view is taken along line 32-32 of the wellbore 2700 in FIG. 27, showing arm 3002 passing through the first boiler casing 2710. The first boiler casing 2710 is formed from a plurality of boiler casing segments, two of which are shown in FIG. 32 as boiler casing segment 2710a and 2710b. Placement of the casing plate 3000 at the interface between two successive boiler casing segments reduces the number of separate welding steps that need to be undertaken to assemble the wellbore 2700 since the boiler casing segments 2710a and 2710b are welded together anyway. In this illustrative embodiment, welds 2902 are placed between the boiler casing segments 2710a and 2710b, and between casing plate arm 3002 and the boiler casing 2710.

To facilitate the installation process, each of the boiler casing segments 2710a and 2710b can be formed with void shapes corresponding to the cross-sectional shape of the casing plate arm 3002. For example, in the example in FIG. 32, the downstream boiler casing 2710b can have a triangular-shaped void shape and the upstream boiler casing 2710a can have a rectangular-shaped void shape, which can accommodate the casing plate arm 3002 when the boiler casing segments 2710a and 2710b are aligned.

Figure 33A:
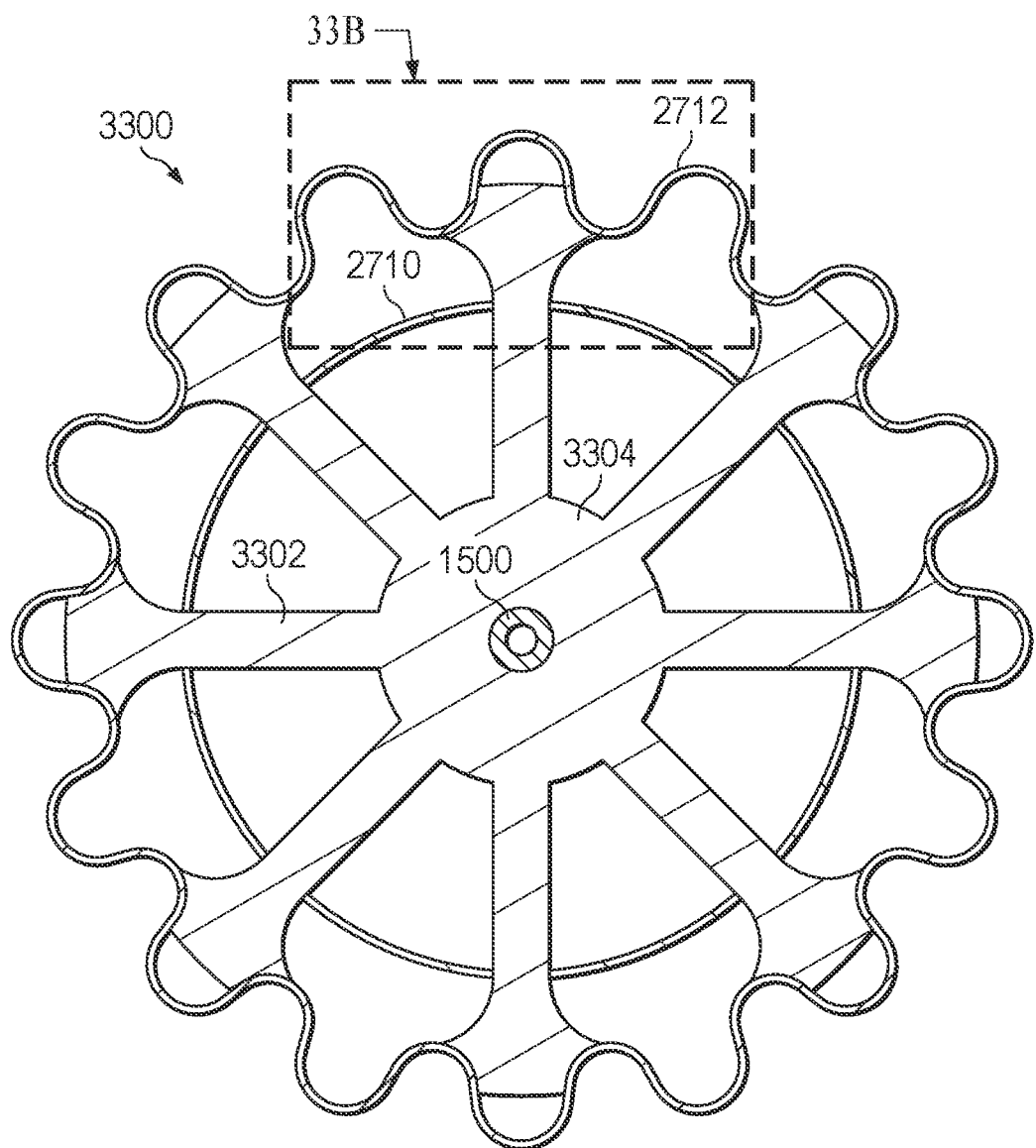

FIGS. 33A and 33B present a more detailed view of a casing plate in accordance with an illustrative embodiment. The casing plate 3300 can be installed in the lower end of the wellbore 2700. As previously described, the casing plate 3300 can have a plurality of arms 3302 that extend radially outward from the central body 3304. In this non-limiting embodiment, the casing plate 3300 has eight arms that are generally arranged regularly around the central body 3304. Each of the arms 3302 connects the first boiler casing 2710 with the second boiler casing 2712 to provide support and/or rigidity. The casing plate 3300 can be welded to the first boiler casing 2710 and the second boiler casing 2712 by welds 3302, as shown in more detail in FIG. 33B.

In this illustrative embodiment, a gap 3304 is maintained between the end of each of the casing plate arms 3302 and the second boiler casing 2712. The gap 3304 can allow for greater contact between saturated steam traveling through the annular region 2714 and the sidewalls of the second boiler casing 2712, which increases the amount of heat transfer.

Figure 31:
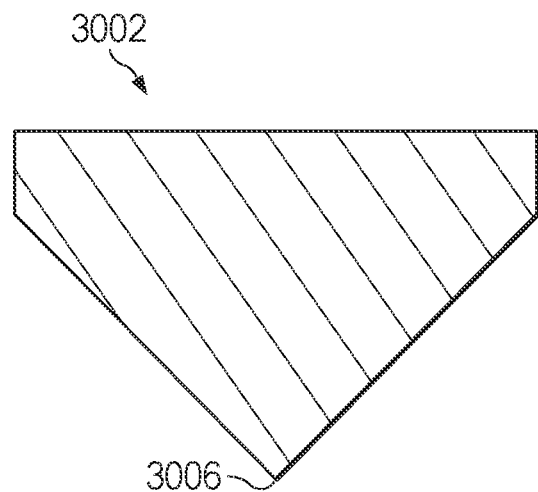
FIG. 31 is a cross-sectional view of a casing plate arm according to an illustrative embodiment.

In one embodiment, each arm 3302 of the casing plate 3300 has a cross-sectional shape similar to the casing plate arms 3002 shown in FIG. 31. Additionally, the cross-sectional area of each arm 3302 can decrease in cross-sectional area as its distance from the drill stem 1500 increases. As previously described, the casing plate 3300 can be installed at the interface between casing plate segments, as described in FIG. 32 above.

Figure 34:
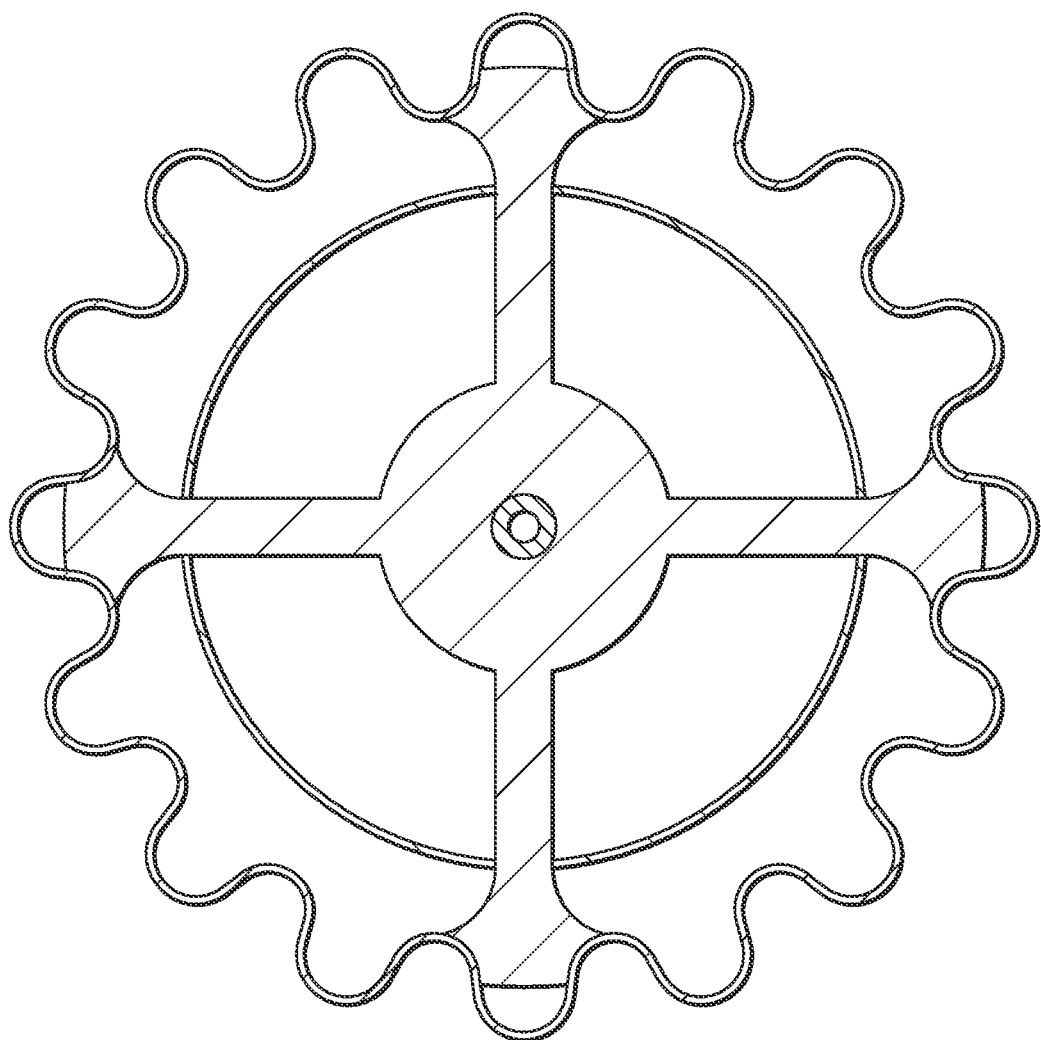
FIG. 34 is a casing plate according to another illustrative embodiment.

FIG. 34 is a casing plate according to another illustrative embodiment. The casing plate 3400 has four arms 3402 extending radially outwardly from the center body portion 3404. The casing plate arms 3400 can have dimensions similar to the casing plate arms 3300 in FIG. 33. In a nonlimiting embodiment, the distal ends of each of the arms 3402 extend entirely to the second boiler casing 2712 to eliminate the gap shown in FIG. 33.

Figure 35A:
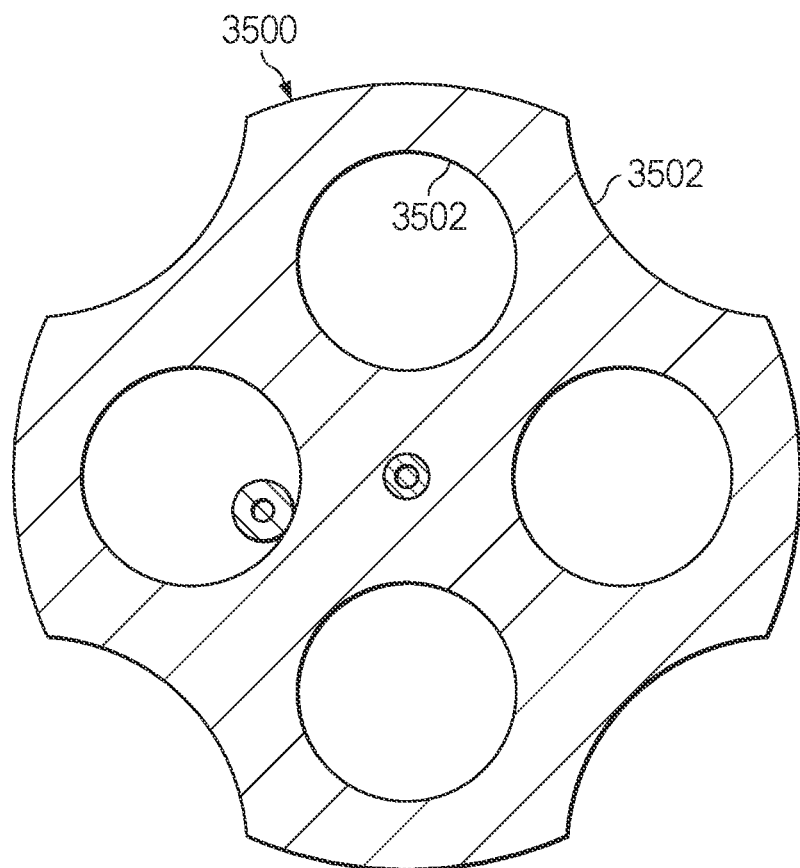
FIGS. 35A and 35B are various views of a casing plate according to yet another illustrative embodiment.
Figure 35B:

FIGS. 35A and 35B are various views of a casing plate according to yet another illustrative embodiment. FIG. 35A is a plan view of a casing plate 3500 that can be used in a cased wellbore, such as cased wellbore 600 in FIG. 9A as an alternative to casing plate 618. FIG. 35B is an elevation view of the casing plate 3500.

The casing plate 3500 can be arranged to allow the fluid conduit 800 to pass through one of the vents 3502. Additionally, the casing plate 3500 can be attached to the inner surface of the boiler casing 602 by welds along its outside perimeter and the casing plate 3500 can be attached to the drill stem 1500 by welds along the perimeter of a central aperture sized to receive the drill stem 1500. The casing plate 3500 can include a set of vents 3502 with a size and pattern selected to maximize fluid flow through the boiler casing 3500. In this illustrative embodiment, the pattern is selected for even axial loading.

Figure 36:
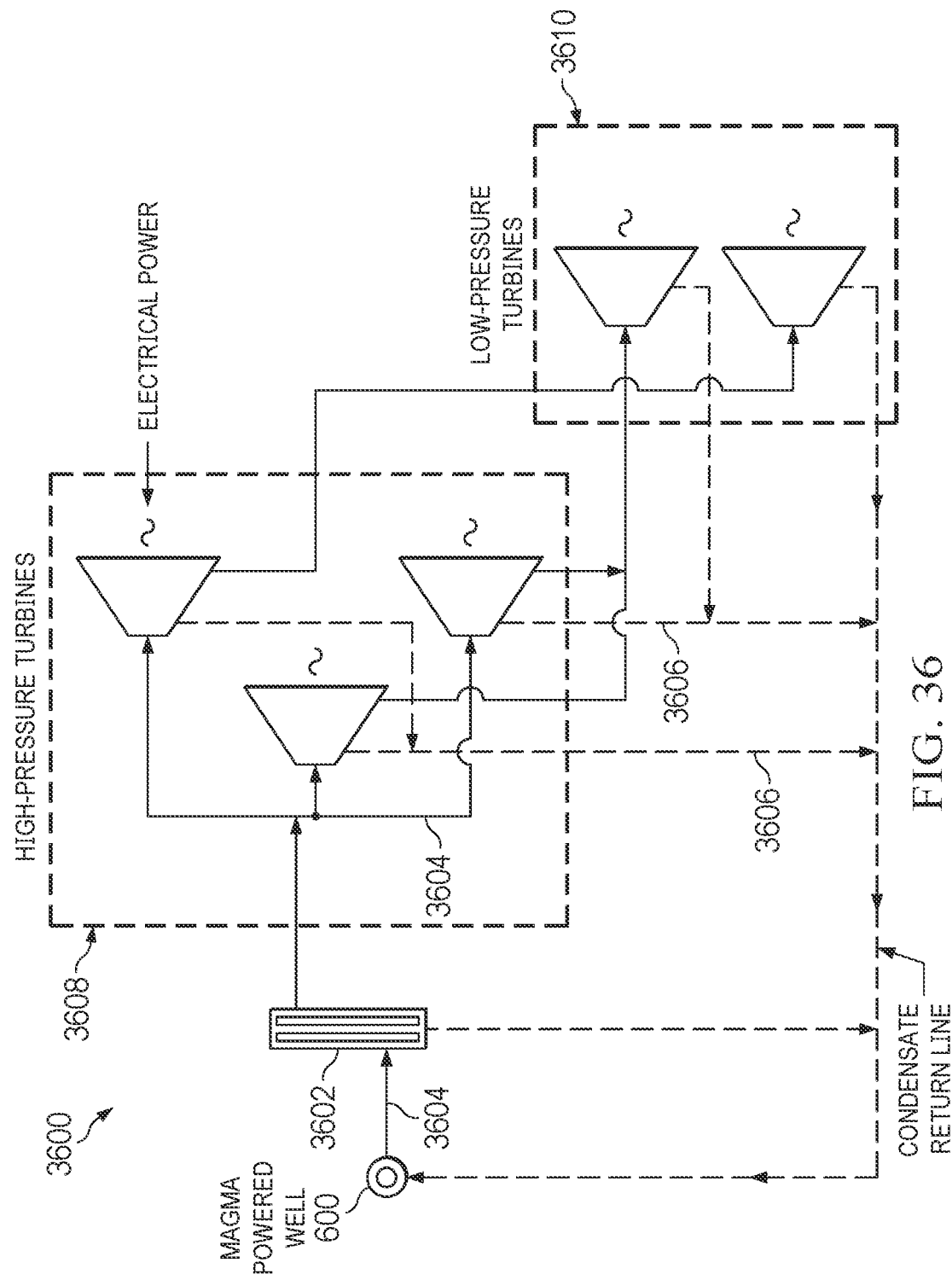
FIG. 36 is a simplified schematic diagram of another magma power system according to an illustrative embodiment.

FIG. 36 is a simplified schematic diagram of another magma power system according to an illustrative embodiment. The magma power system 3600 includes a steam separator 3602 connected directly to a cased wellbore 600 extending between a surface and the underground reservoir of magma. The steam separator 3602 separates a gas-phase fluid, i.e., steam, from condensate formed from the gas-phase fluid. Steam lines 3604 are shown as solid lines and condensate lines 3606 are shown as dashed lines.

A first set of turbines 3608, i.e., high-pressure turbines, is connected to the steam separator 3602 and is configured to generate electricity from the gas-phase fluid received from the steam separator 3602. Given the sufficiently high temperature and pressure of steam originating from the cased wellbore 600, a second set of steam turbines 3610, i.e., low-pressure turbines, can be arranged in series with the first set of steam turbines 3608 to generate electricity from the steam expelled from the first set of steam turbines 3608.

Although not shown, a condensate tank can be included in the magma power system 3600 and connected to the condensate lines 3606. The condensate can then be injected back to the cased wellbore 600 from the condensate tank for re-use.

Figure 37:
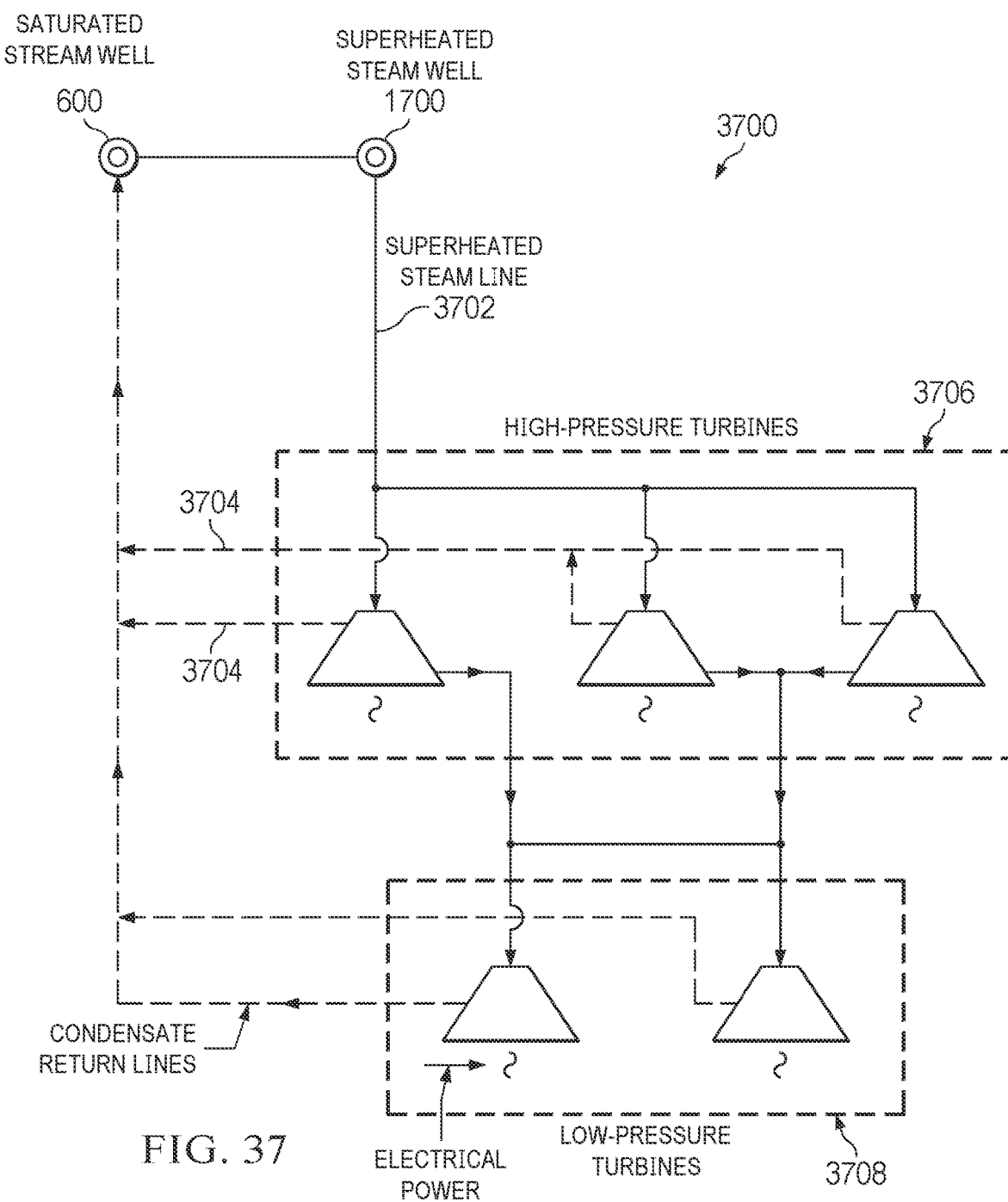
FIG. 37 is a schematic diagram of a superheated steam system according to an illustrative embodiment.

FIG. 37 is a schematic diagram of a superheated steam system according to an illustrative embodiment. The superheated steam system 3700 is a schematic diagram of superheated steam system 1600 in FIG. 16. The superheated system 3700 includes a cased wellbore 600 extending between a surface and the underground reservoir of magma. The cased wellbore 600 provides saturated steam to superheated steam well 1700. The saturated steam is transformed into superheated steam in the superheated steam well 1700 and the superheated steam is conveyed to a first set of turbines 3706 in a steam line 3702. Steam lines 3702 are depicted in solid lines and condensate lines 3704 are depicted in dashed lines.

The first set of turbines 3706 are high-pressure turbines configured to generate electricity from the gas-phase fluid received from superheated steam. Given the sufficiently high temperature and pressure of steam originating from the superheated steam well 1700, a second set of steam turbines 3708 can be arranged in series with the first set of steam turbines 3706 to generate electricity from the steam expelled from the first set of steam turbines 3706. As used herein, the second set of turbines 3708 may be referred to as low-pressure turbines given that they operate at lower pressures than the first set of turbines 3706.

Although not shown, the superheated steam system 3700 may include a condensate tank connected to the condensate lines 3704. The condensate can then be injected back to the cased wellbore 600 from the condensate tank for re-use.

Figure 38A:
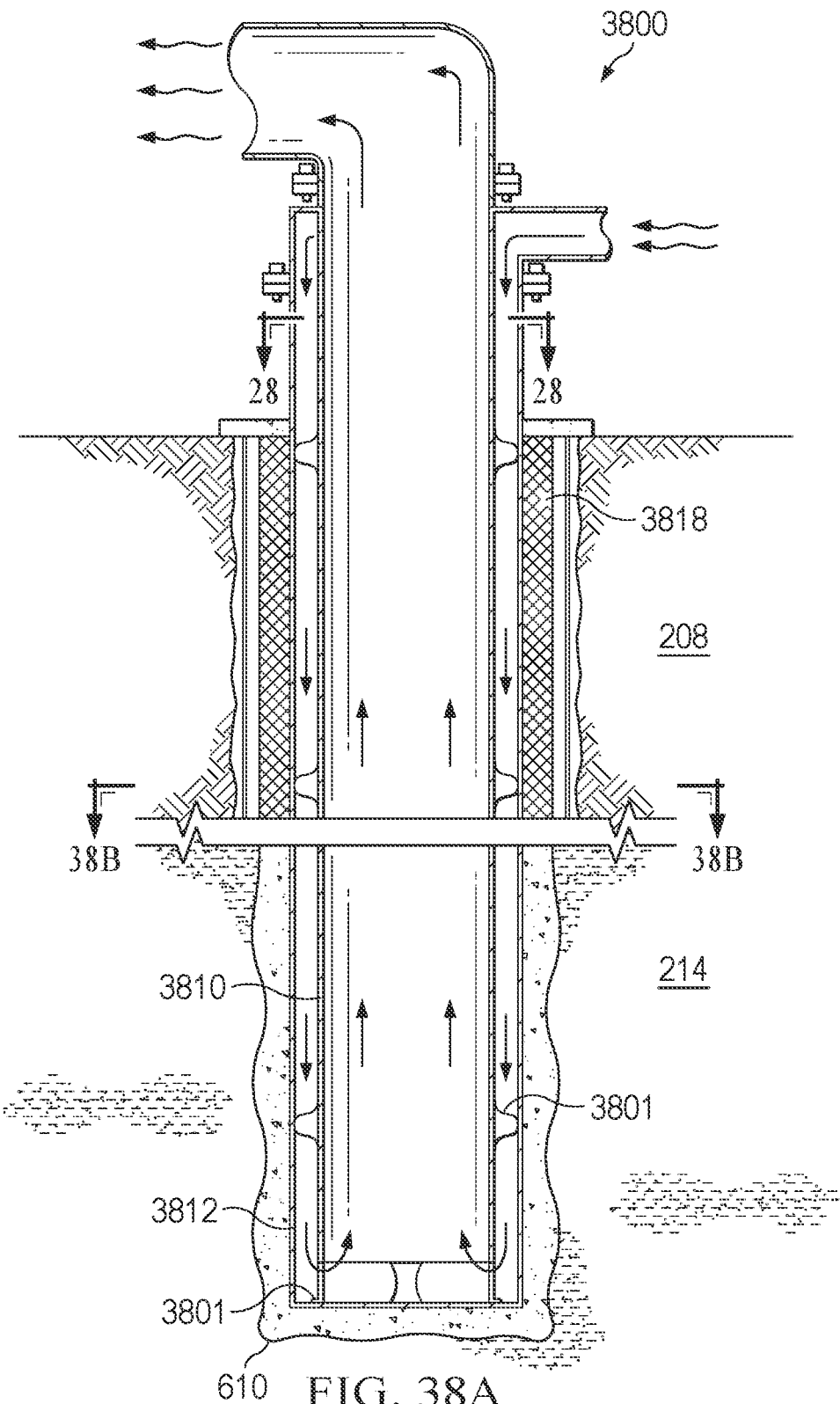
FIGS. 38A and 38B are sectional views of a wellbore for generating superheated steam according to another illustrative embodiment.
Figure 38B:
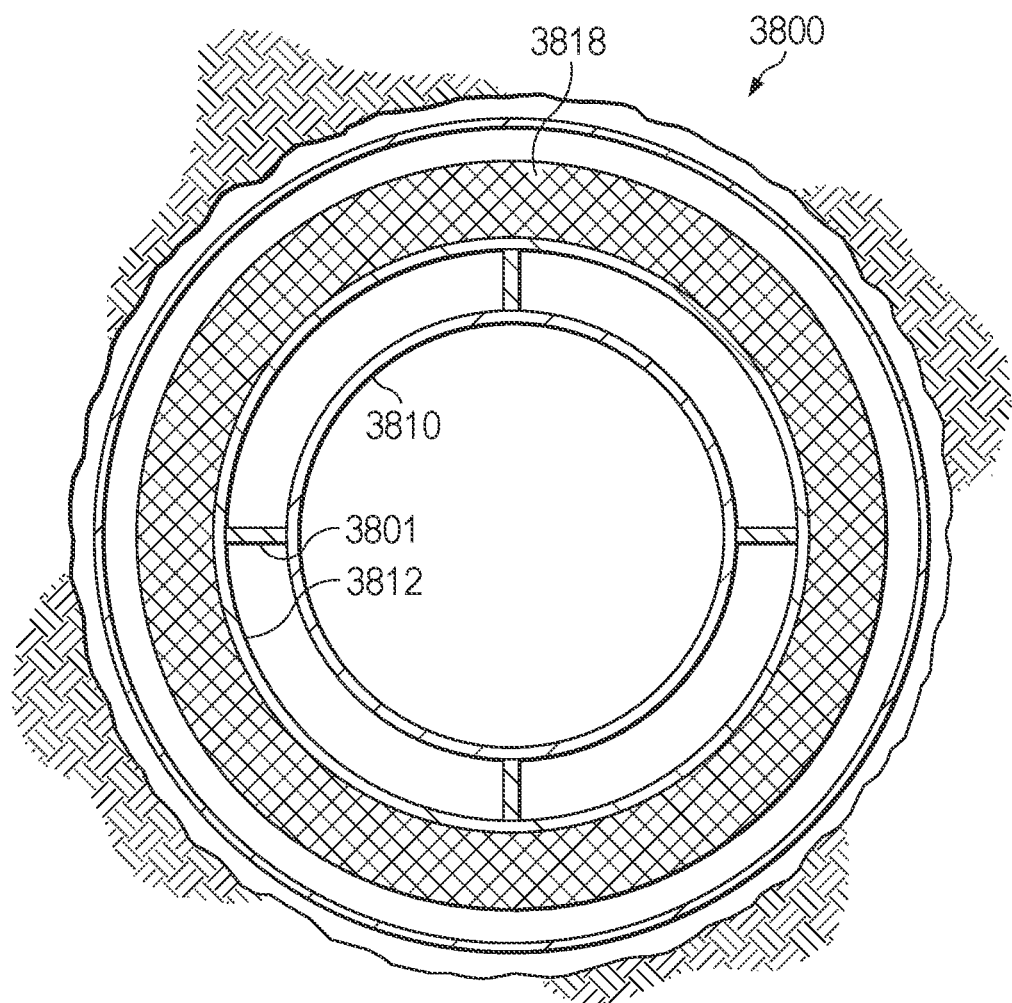

FIGS. 38A and 38B are sectional views of a wellbore for generating superheated steam according to another illustrative embodiment. In particular, FIG. 38A is a sectional elevation view of wellbore 3800, and FIG. 38B is a sectional view of the wellbore 3800 taken along line 38B-38B in FIG. 38A.

The wellbore 3800 is similar to wellbore 2700 in FIG. 27 except that the drill stem 1500 and the sacrificial bit are withdrawn after the borehole is drilled, and the casing plates 3000 are omitted in favor of a plurality of spacers 3801 disposed between the first boiler casing 3810 and the second boiler casing 3812. An insulation layer 3818 can be wrapped around the second casing 3812 to reduce heat loss. In one embodiment, each of the plurality of spacers 3801 are fin-shaped projections attached to the outer surface off the first boiler casing 3810 using conventional methods, such as friction fitting, bolting, or welding. In this illustrative embodiment in FIG. 38, the plurality of spacers 3801 are arranged circumferentially around the first boiler casing 3810 and at various depths of the wellbore 3800. The plurality of spacers 3801 can also be attached to the terminal end of the first boiler casing 3810 to maintain separation from the second boiler casing 3812.

In a particular embodiment, the plurality of spacers 3801 can be attached at the interface between two casing segments to provide enhanced structural rigidity. However, in an alternate embodiment, the plurality of spacers 3801 can be disposed around the exterior of the first boiler casing 3810 according to another predetermined pattern, such as a spiral pattern similar to threads of a screw.

Figure 39:
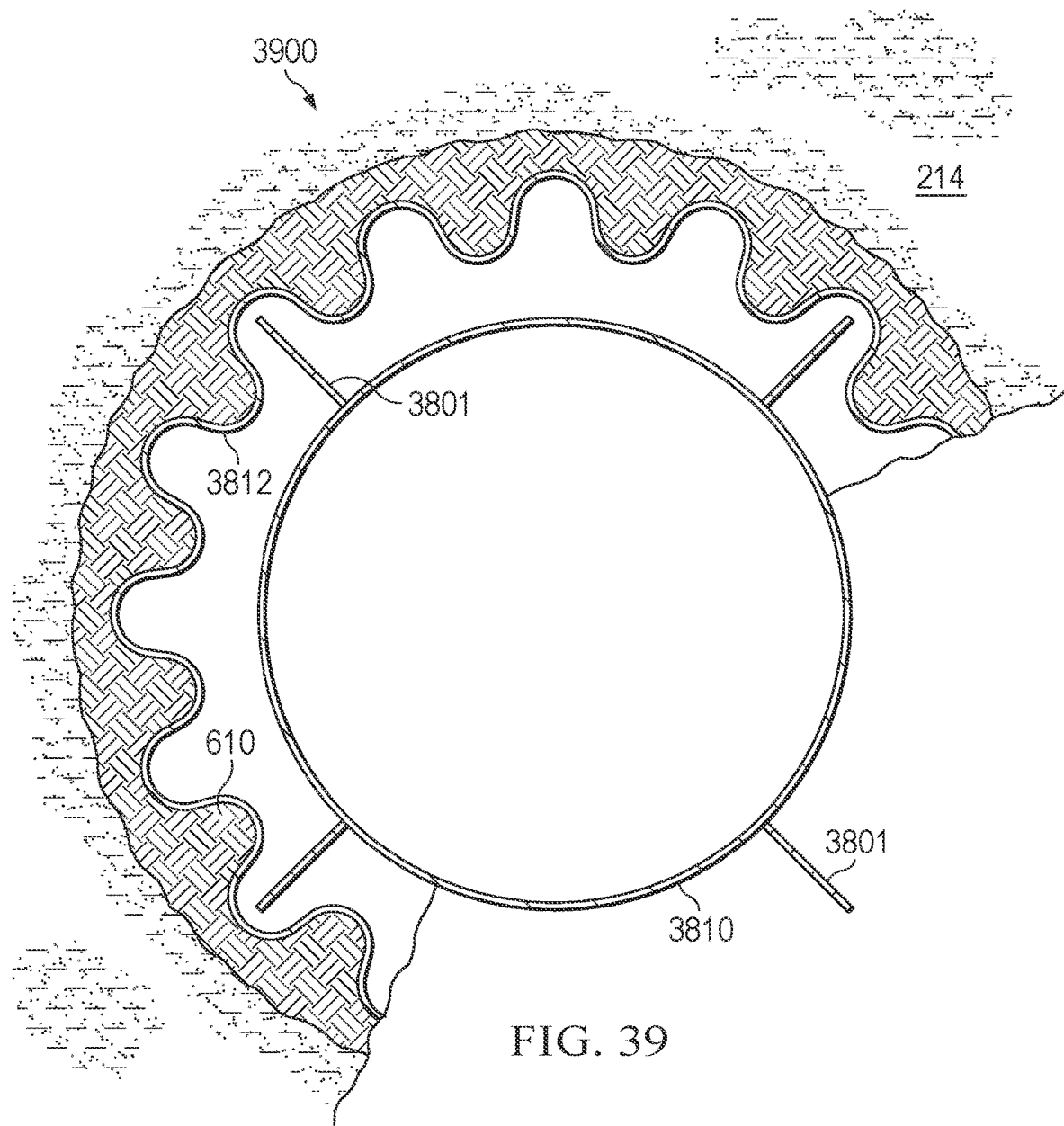
FIG. 39 depicts a sectional view of spacers implemented in a wellbore that has a corrugated second casing.

FIG. 38B depicts a sectional view of spacers 3801 implemented in a wellbore that has a smooth second casing 3812. FIG. 39 depicts a sectional view of spacers 3801 implemented in a wellbore 3900 that has a corrugated second casing 3812.

Although embodiments of the disclosure have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this disclosure has been particularly shown and described with reference to preferred embodiments, it will be understood by those skilled in the art that various changes in form and detail may be made therein without departing from the spirit and scope of the disclosure. The inventors expect skilled artisans to employ such variations as appropriate, and the inventors intend the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Additional Embodiments

The following descriptive embodiments are offered in further support of the one or more aspects of this disclosure.

In a first embodiment, aspects of the present disclosure are directed to a system for generating power from an underground reservoir of magma. The system includes a steam separator connected directly to a cased wellbore extending between a surface and the underground reservoir of magma. In some embodiments, the steam separator separates a gas-phase fluid from condensate formed from the gas-phase fluid. The system also includes a first set of turbines connected to the steam separator. The first set of turbines are configured to generate electricity from the gas-phase fluid received from the steam separator. The system further includes a condensate tank fluidically connected to the steam separator and the first set of turbines. The condensate tank is fluidically connected to a fluid conduit that supplies condensate to a terminal end of the cased wellbore.

In another aspect of the first embodiment of the system, the first set of turbines are high-pressure turbines.

In another aspect of the first embodiment of the system, each of the set of high-pressure turbines generates about 200 MW of power;

In another aspect of the first embodiment of the system, the first set of turbines includes at least two turbines. In yet another aspect of the first embodiment, the system further comprises a steam supply manifold connected to the steam separator and to each of the at least two turbines.

In another aspect of the first embodiment, the system includes a second set of turbines connected to in series to the first set of turbines.

In another aspect of the first embodiment of the system, the second set of turbines are low-pressure turbines operating at lower pressures than the first set of turbines;

In another aspect of the first embodiment, the system includes a set of heat-driven chillers configured to provide air conditioning from effluent from one or more turbines.

In another aspect of the first embodiment, the system includes one or more fluid conduits configured to convey effluent from one or more turbines to an effluent recycler.

In another aspect of the first embodiment, the effluent recycler comprises one or more of a water distillation system, a heat driven chilling apparatus, a residential heating system, an agriculture system, and an aquaculture system.

In a second embodiment, aspects of the present disclosure are directed to a method for generating power. The method includes the step of supplying a liquid-phase fluid to a cased wellbore extending from a surface to an underground reservoir of magma. The heat supplied from the magma causes the liquid-phase fluid to change into a gas-phase fluid conveyed up the cased wellbore and to the surface. The method further includes the step of separating the gas-phase fluid from condensate formed from the gas-phase fluid. The method also includes the steps of operating a set of turbines with the gas-phase fluid to generate electricity, accumulating at least some of the condensate formed from the gas-phase fluid, and supplying the accumulated condensate as the liquid-phase fluid to the cased wellbore.

In another aspect of the second embodiment, the set of turbines include at least two turbines arranged in series, and wherein operating the set of turbines with the gas-phase fluid further comprises the steps of operating an upstream turbine with the gas-phase fluid at a first pressure, operating a downstream turbine with the gas-phase fluid received from the upstream turbine, wherein the downstream turbine is operated at a second pressure that is less than the first pressure, and accumulating at least some condensate from the upstream turbine and the downstream turbine for supplying to the cased wellbore.

In another aspect of the second embodiment, the method includes the step of conveying the effluent from the set of turbines to a set of heat-driven chillers configured to provide air conditioning.

In another aspect of the second embodiment, the method includes the step of conveying the effluent from the set of turbines to an effluent recycler.

In another aspect of the second embodiment, the effluent recycler comprises one or more of a water distillation system, a heat driven chilling apparatus, a residential heating system, an agriculture system, a cooling tower, and an aquaculture system.

In a third embodiment, aspects of the present disclosure are directed to a cased wellbore. The cased wellbore includes a well casing suspended within a borehole that extends between a surface and an underground reservoir of magma, a boiler casing housed within the well casing and extending between the surface and the underground reservoir of magma, wherein the boiler casing has a first end and a terminal end opposite to the first end, wherein the terminal end of the boiler casing is submerged within the underground reservoir of magma, a fluid conduit housed within the boiler casing and configured to deliver a liquid-phase fluid to the terminal end of the boiler casing, wherein a temperature and a pressure at the terminal end of the boiler casing converts the liquid-phase fluid into a gas-phase fluid that travels through the boiler casing towards the surface, and a well head connected to the first end of the boiler casing.

In another aspect of the third embodiment, the well casing extends from the surface to a boundary layer between dry rock and intrusive rock.

In another aspect of the third embodiment, the boiler casing is aligned co-axially with the well casing. Furthermore, the inner surface of the well casing and the outer surface of the boiler casing define an annular void space.

In another aspect of the third embodiment, the cased wellbore further comprises an insulation layer in the annular void space which spans a predetermined length of the boiler casing, wherein the predetermined length includes the first end of the boiler casing.

In another aspect of the third embodiment, the boiler casing is formed from a plurality of boiler casing segments positioned end-to-end and welded together.

In another aspect of the third embodiment, the internal volume of the boiler casing is divided into a plurality of compartments by a set of casing plates.

In another aspect of the third embodiment, each of the set of casing plates includes a plurality of apertures, wherein the plurality of apertures includes a first aperture is sized to accommodate the fluid conduit, a second aperture sized to receive a drill stem, and a set of steam vents permitting the gas-phase fluid to travel through the plurality of compartments towards the surface.

In another aspect of the third embodiment, the cased wellbore further includes a drill stem extending through the boiler casing from the first end to the terminal end, and passing through the second aperture of each of the set of casing plates.

In another aspect of the third embodiment, an outer surface of the drill stem is welded to each of the set of casing plates along a circumference of the second aperture.

In another aspect of the third embodiment, the fluid conduit includes a pipe, an insulative layer surrounding the pipe, and an outer shell surrounding the insulative layer.

In another aspect of the third embodiment, the terminal end of the boiler casing is sealed by an end plate that includes an aperture sized to receive a drill stem.

In another aspect of the third embodiment, the well head seals the first end of the boiler casing, and the well head receives the fluid conduit and the drill stem.

In a fourth embodiment, aspects of the present disclosure are directed to a method of forming a cased wellbore extending from a surface to an underground reservoir of magma. The method includes the steps of drilling a wellbore from the surface towards the underground reservoir of magma, hanging a well casing in the wellbore, responsive to the wellbore reaching a target depth, hanging a boiler casing within the well casing; and resume drilling of the wellbore from the target depth to a final depth within the underground reservoir of magma, wherein the boiler casing extends from the surface to the final depth within the underground reservoir to form the cased wellbore.

In another aspect of the fourth embodiment, the wellbore is drilled from the surface to the target depth with a first drill bit connected to a drill stem, wherein the well casing is conveyed into the wellbore on an underreamer positioned at a terminal region of the drill stem, and wherein hanging the well casing further comprises conveying the well casing into the wellbore while advancing the drill bit towards the underground reservoir.

In another aspect of the fourth embodiment, the method includes the step of hanging the boiler casing within the well casing. The method further includes the steps of retracting the underreamer to release the well casing, withdrawing the drill stem and the first drill bit attached to a terminal end of the drill stem, and inserting the boiler casing into the well casing housed within the wellbore.

In another aspect of the fourth embodiment, the method includes the step of inserting the boiler casing into the well casing. The method further comprises sealing the terminal end of the boiler casing with an end plate having an aperture sized to receive a drill stem, welding the drill stem to the end plate around a circumference of the aperture, coupling a sacrificial bit to the drill stem, and conveying the terminal end of the boiler casing into the well casing.

In another aspect of the fourth embodiment, the method includes the step of conveying the terminal end of the boiler casing into the well casing. The method further comprises elongating the drill stem and the boiler casing as the terminal end of the boiler casing is conveying into the well casing, wherein the drill stem and the boiler casing are elongated from an opposite end of the boiler from the terminal end of the boiler casing.

In another aspect of the fourth embodiment, the elongated the boiler casing further includes aligning a new boiler casing segment with an end of the boiler casing and welding the new boiler casing segment to the end of the boiler casing.

In another aspect of the fourth embodiment, the method includes elongating the drill stem and the boiler casing further includes securing a set of casing plates to a sidewall of the boiler casing.

In another aspect of the fourth embodiment, the method includes securing the set of casing plates within the boiler casing further comprises welding an outer surface of the drill stem to each of the set of casing plates around a circumference of an aperture sized to receive the drill stem.

In another aspect of the fourth embodiment, the method includes conveying the terminal end of the boiler casing into the well casing further includes drilling, with the sacrificial bit, from the target depth to the final depth, wherein the sacrificial bit is submerged within the underground reservoir of magma at the final depth.

In another aspect of the fourth embodiment, the method includes conveying the well casing into the wellbore further comprises injecting a liquid-phase fluid into a terminal end of the boiler casing as the boiler casing is approaching the final depth.

In a fifth embodiment, aspects of the present disclosure are directed a cased wellbore for generating superheated steam. The cased wellbore includes a first end at a surface, a second end at an underground reservoir of magma, and a fluid pathway extending from an inlet at the first end to the second end and then from the second end to an outlet at the first end, wherein the fluid pathway is configured to receive saturated steam at the inlet and expel superheated steam from the outlet, and wherein the saturated steam is transformed into superheated steam in the fluid pathway at the second end of the cased wellbore.

In another aspect of the fifth embodiment, the cased wellbore further includes a well casing extending from the surface towards the underground reservoir of magma, wherein the fluid pathway is formed from a set of boiler casings extending through the well casing.

In another aspect of the fifth embodiment, the cased wellbore further includes a set of boiler casings. The boiler casings include a first boiler casing defining a first fluid conduit configured to convey the saturated steam from the first end of the cased wellbore to the second end of the cased wellbore, and wherein the set of boiler casings includes a second boiler casing defining a second fluid conduit configured to convey superheated steam from the second end of the cased wellbore to the first end of the cased wellbore.

In another aspect of the fifth embodiment, the first boiler casing has a first cross-sectional area, the second boiler casing has a second cross-sectional area that is less than the first cross-sectional area; and the second boiler casing is housed substantially co-extensively within the first boiler casing to form an elongated annular volume of space between an inner surface of a sidewall of the first boiler casing and an outer surface of a sidewall of the second boiler casing.

In another aspect of the fifth embodiment, the first fluid conduit is the elongated annular volume of space, and wherein the second fluid conduit is an elongated volume of space defined by the sidewall of the second boiler casing.

In another aspect of the fifth embodiment, the first boiler casing has a first cross-sectional area, the second boiler casing has a second cross-sectional area that is greater than the first cross-sectional area, and the first boiler casing is housed substantially co-extensively within the second boiler casing to form an elongated annular volume of space between an inner surface of a sidewall of the second boiler casing and an outer surface of a sidewall of the first boiler casing.

In another aspect of the fifth embodiment, the first fluid conduit is the elongated annular volume of space, and the second fluid conduit is an elongated volume of space defined by the sidewall of the first boiler casing.

In another aspect of the fifth embodiment, the cased wellbore further includes a wellhead that includes a first connector configured to fluidically connect the inlet of the fluid pathway to a source of the saturated steam and a second connector configured to fluidically connect the outlet of the fluid pathway to a system for generating power from superheated steam.

In another aspect of the fifth embodiment, the source of the saturated steam is an upstream wellbore extending from the surface to the underground reservoir of magma or another underground reservoir of magma.

In another aspect of the fifth embodiment, the cased wellbore further includes a sidewall of the inner boiler casing is not corrugated at an end closest to the second end of the cased wellbore.

In another aspect of the fifth embodiment, the sidewall of the inner boiler casing is non-corrugated at an end closest to the first end of the cased wellbore.

In another aspect of the fifth embodiment, the cased wellbore further includes an insulation layer around the outer boiler casing at the first end.

In a sixth embodiment, aspects of the present disclosure are directed to a system for power generation using superheated steam. The system includes a cased wellbore extending between a surface and an underground reservoir of magma. The cased wellbore includes a first end at a surface, a second end at an underground reservoir of magma, and a fluid pathway extending from an inlet at the first end to the second end and then from the second end to an outlet at the first end. The fluid pathway is configured to receive saturated steam at the inlet and expel superheated steam from the outlet. The saturated steam is transformed into superheated steam in the fluid pathway at the second end of the cased wellbore and a set of turbines is configured to generate electricity from the superheated steam provided from the cased wellbore.

In another aspect of the sixth embodiment of the system, the inlet of the fluid pathway receives the saturated steam from an upstream wellbore that extends from the surface to the underground reservoir of magma or another underground reservoir of magma.

In another aspect of the sixth embodiment of the system, the cased wellbore further comprises a well casing extending from the surface towards the underground reservoir of magma, wherein the fluid pathway is formed from a set of boiler casings extending through the well casing.

In another aspect of the sixth embodiment of the system, the set of boiler casings includes a first boiler casing defining a first fluid conduit configured to convey the saturated steam from the first end of the cased wellbore to the second end of the cased wellbore, and wherein the set of boiler casings includes a second boiler casing defining a second fluid conduit configured to convey superheated steam from the second end of the cased wellbore to the first end of the cased wellbore.

In another aspect of the sixth embodiment of the system, the first boiler casing has a first cross-sectional area, the second boiler casing has a second cross-sectional area that is less than the first cross-sectional area, and the second boiler casing is housed substantially co-extensively within the first boiler casing to form an elongated annular volume of space between an inner surface of a sidewall of the first boiler casing and an outer surface of a sidewall of the second boiler casing.

In another aspect of the sixth embodiment of the system, the first fluid conduit is an elongated annular volume of space, and wherein the second fluid conduit is an elongated volume of space defined by the sidewall of the second boiler casing.

In another aspect of the sixth embodiment of the system, the first boiler casing has a first cross-sectional area, the second boiler casing has a second cross-sectional area that is greater than the first cross-sectional area, and the first boiler casing is housed substantially co-extensively within the second boiler casing to form an elongated annular volume of space between an inner surface of a sidewall of the second boiler casing and an outer surface of a sidewall of the first boiler casing.

In another aspect of the sixth embodiment of the system, the first fluid conduit is the elongated annular volume of space, and wherein the second fluid conduit is an elongated volume of space defined by the sidewall of the first boiler casing In another aspect of the sixth embodiment, the system further includes a wellhead that includes a first connector configured to fluidically connect the inlet of the fluid pathway to a source of the saturated steam and a second connector configured to fluidically connect the outlet of the fluid pathway a system for generating power from superheated steam.

In a seventh embodiment, aspects of the present disclosure are directed to a method for generating superheated steam. The method includes the steps of receiving saturated steam from a steam source, conveying the saturated steam into a cased wellbore that extends from a surface to an underground reservoir of magma to expose the saturated steam to heat from the underground reservoir of magma, wherein the heat from the underground reservoir of magma converts the saturated steam to the superheated steam, and conveying the superheated steam back towards the surface.

In another aspect of the seventh embodiment, the conveying of the saturated steam into the wellbore further comprises conveying the saturated steam though an annular volume between an outer boiler casing and an inner boiler casing that is housed within the outer boiler casing. In another aspect of the seventh embodiment, the outer boiler casing is at least partially exposed to magma in the underground reservoir.

In another aspect of the seventh embodiment of the method, a portion of a sidewall of the inner boiler casing is not corrugated at an end closest to the underground reservoir of magma.

In another aspect of the seventh embodiment of the method, another portion of the sidewall of the inner boiler casing is non-corrugated at an end closest to the surface.

In another aspect of the seventh embodiment of the method, the steam source is an upstream wellbore extending from the surface to the underground reservoir of magma or another underground reservoir of magma.

In another aspect of the seventh embodiment of the method the superheated steam is provided to a set of turbines for generating electricity.

We claim:

1. A cased wellbore comprising:
   a well casing suspended within a borehole that extends between a surface and an underground reservoir of magma;
   a boiler casing housed within the well casing and extending between the surface and the underground reservoir of magma, wherein the boiler casing has a first end and a terminal end opposite to the first end, wherein the terminal end of the boiler casing is submerged within the underground reservoir of magma;
   a fluid conduit housed within the boiler casing and configured to deliver a liquid-phase fluid to the terminal end of the boiler casing, wherein a temperature and a pressure at the terminal end of the boiler casing converts the liquid-phase fluid into a gas-phase fluid that travels through the boiler casing towards the surface; and
   a well head connected to the first end of the boiler casing, wherein the well head seals the first end of the boiler casing, and wherein the well head receives the fluid conduit and a drill stem.

2. The cased wellbore of claim 1, wherein the well casing extends from the surface to a boundary layer between dry rock and intrusive rock.

3. The cased wellbore of claim 1, wherein the boiler casing is aligned co-axially with the well casing, and wherein an inner surface of the well casing and an outer surface of the boiler casing define an annular void space.

4. The cased wellbore of claim 3, further comprising:
   an insulation layer in the annular void space which spans a predetermined length of the boiler casing, wherein the predetermined length includes the first end of the boiler casing.

5. The cased wellbore of claim 1, wherein the boiler casing is formed from a plurality of boiler casing segments positioned end-to-end and welded together.

6. The cased wellbore of claim 1, wherein the internal volume of the boiler casing is divided into a plurality of compartments by a set of casing plates.

7. The cased wellbore of claim 6, wherein each of the set of casing plates includes a plurality of apertures, wherein the plurality of apertures includes a first aperture is sized to accommodate the fluid conduit, a second aperture sized to receive the drill stem, and a set of steam vents permitting the gas-phase fluid to travel through the plurality of compartments towards the surface.

8. The cased wellbore of claim 7, further comprising:
   the drill stem extending through the boiler casing from the first end to the terminal end, and passing through the second aperture of each of the set of casing plates.

9. The cased wellbore of claim 8, wherein an outer surface of the drill stem is welded to each of the set of casing plates along a circumference of the second aperture.

10. The cased wellbore of claim 1, wherein the fluid conduit further comprises:
    a pipe;
    an insulative layer surrounding the pipe; and
    an outer shell surrounding the insulative layer.

11. The cased wellbore of claim 1, wherein the terminal end of the boiler casing is sealed by an end plate that includes an aperture sized to receive the drill stem.

* * * * *